(12) United States Patent
Ponsiani

(10) Patent No.: US 11,065,797 B2
(45) Date of Patent: Jul. 20, 2021

(54) BLOWN-FILM EXTRUSION APPARATUS AND A METHOD FOR MANUFACTURING A BLOWN FILM

(71) Applicant: DOTECO S.p.A., Mirandola (IT)

(72) Inventor: Marco Ponsiani, Larciano (IT)

(73) Assignee: DOTECO S.p.A., Mirandola (IT)

( * ) Notice: Subject to any disclaimer, the term of this patent is extended or adjusted under 35 U.S.C. 154(b) by 362 days.

(21) Appl. No.: 15/576,515

(22) PCT Filed: May 27, 2016

(86) PCT No.: PCT/IB2016/053153
§ 371 (c)(1),
(2) Date: Nov. 22, 2017

(87) PCT Pub. No.: WO2016/189518
PCT Pub. Date: Dec. 1, 2016

(65) Prior Publication Data
US 2018/0126616 A1    May 10, 2018

(30) Foreign Application Priority Data
May 27, 2015    (IT) ........................ 102015000018447

(51) Int. Cl.
*B29C 48/10* (2019.01)
*B29C 48/00* (2019.01)
(Continued)

(52) U.S. Cl.
CPC .......... *B29C 48/10* (2019.02); *B29C 48/0018* (2019.02); *B29C 48/0023* (2019.02);
(Continued)

(58) Field of Classification Search
CPC ......... B29C 48/10; B29C 48/92; B29C 48/21; B29C 49/04; B29C 55/28
See application file for complete search history.

(56) References Cited

U.S. PATENT DOCUMENTS 3,809,515 A * 5/1974 Farrell .................... B29C 48/32
425/133.1
4,728,277 A * 3/1988 Planeta ................... B29C 48/10
425/72.1
(Continued)

FOREIGN PATENT DOCUMENTS

DE        26 58 518 A1    6/1978
DE        42 18 997 C1    1/1994
(Continued)

OTHER PUBLICATIONS

International Search Report dated Nov. 1, 2017, issued to International Application No. PCT/IB2016/053153.

*Primary Examiner* — Marc C Howell
*Assistant Examiner* — Debjani Roy
(74) *Attorney, Agent, or Firm* — Stein IP, LLC

(57) ABSTRACT

A blown-film extrusion apparatus for manufacturing a tubular polymer film comprises an extruder; a solidification ring for solidifying a tubular element produced by the extruder and for forming the film by delivering cooling air on the tubular element at a given cooling height, and a film conveyor for conveying the film upwards. The apparatus also comprises a delivery device for projecting correction air on the tubular element, in order to locally correct the thickness of the film, comprising a distribution chamber; a plurality of air delivery members with delivery channels whose delivery mouths are arranged about said axis of the apparatus for projecting correction air partial streams on respective angular correction positions, between the die and the cooling height; flow control elements between the distribution chamber, and the inlet of respective air delivery members, configured for adjusting the flowrate of the respective correction air stream according to an adjustment signal. According to an aspect of the invention, a plurality of separate radial ducts is provided defining respective delivery (Continued)

channels and spaced apart, at an own end portion, by separation spaces, so that the correction air partial streams, after hitting the tubular element in the respective angular correction positions, can flow away from the tubular element through said separation spaces. According to another aspect of the invention, the distribution chamber is defined by an upper ring and by a lower ring connected to each other by means of tight fixed joints with a first substantially cylindrical wall and with a second substantially cylindrical wall arranged around the first cylindrical wall, wherein possible separate radial ducts of the air delivery members protrude from the first cylindrical wall.

17 Claims, 22 Drawing Sheets

(51) Int. Cl.
*B29C 48/92* (2019.01)
*B29C 48/88* (2019.01)
*B29C 48/255* (2019.01)
*B29C 55/28* (2006.01)

(52) U.S. Cl.
CPC ........ *B29C 48/255* (2019.02); *B29C 48/2552* (2019.02); *B29C 48/913* (2019.02); *B29C 48/918* (2019.02); *B29C 48/92* (2019.02); *B29C 55/28* (2013.01); *B29C 2948/926* (2019.02); *B29C 2948/92647* (2019.02); *B29C 2948/92704* (2019.02); *B29C 2948/92971* (2019.02)

(56) References Cited

U.S. PATENT DOCUMENTS

2010/0288389 A1\* 11/2010 Hopper .................. F16K 47/08
138/43
2017/0015043 A1\* 1/2017 Shimizu ................. B29C 48/10

FOREIGN PATENT DOCUMENTS

| DE | 4218997 C1 \* | 1/1994 | ............ B29C 48/10 |
| DE | 44 28 212 A1 | 11/1995 | |
| JP | H 1-253420 A | 10/1989 | |
| JP | H 11-300827 A | 11/1999 | |
| JP | 2017-104983 A | 6/2017 | |

\* cited by examiner

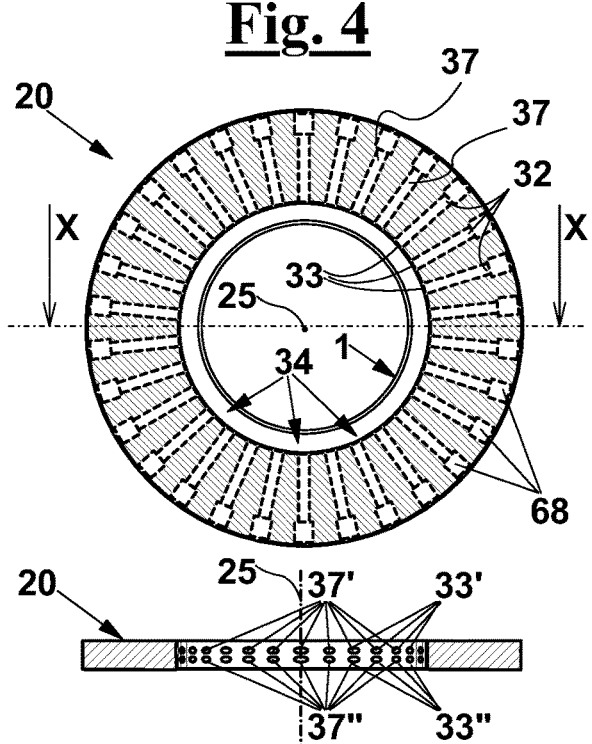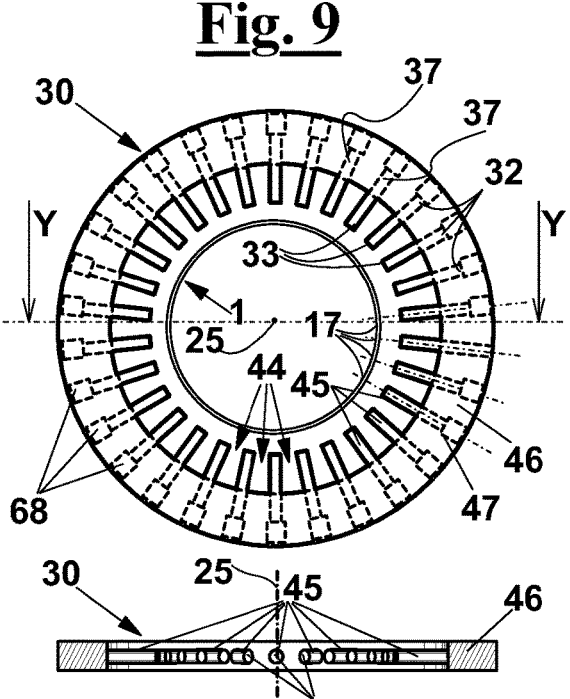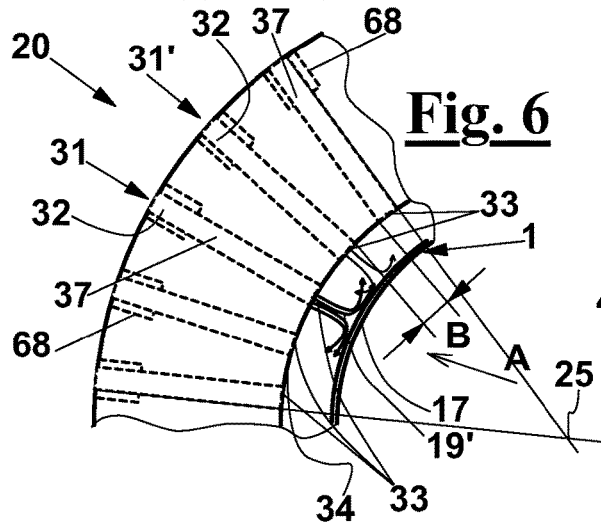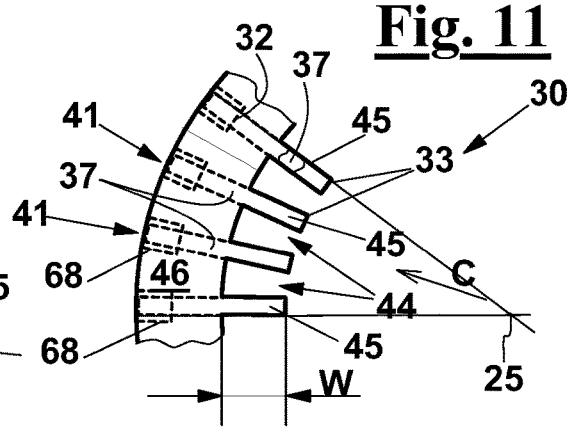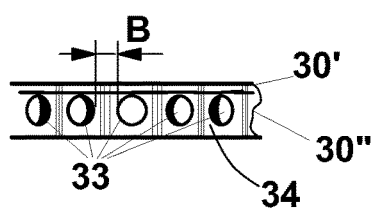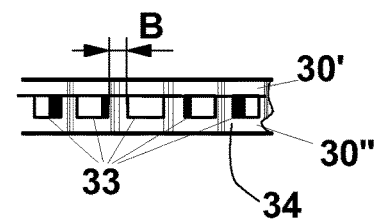

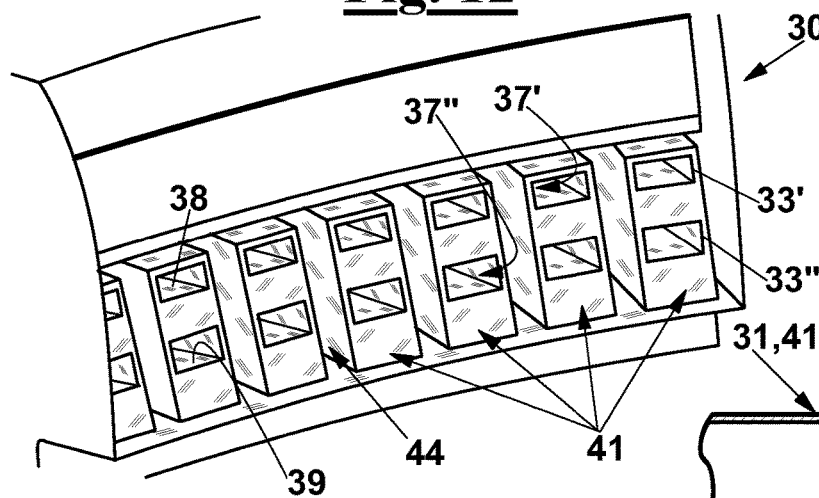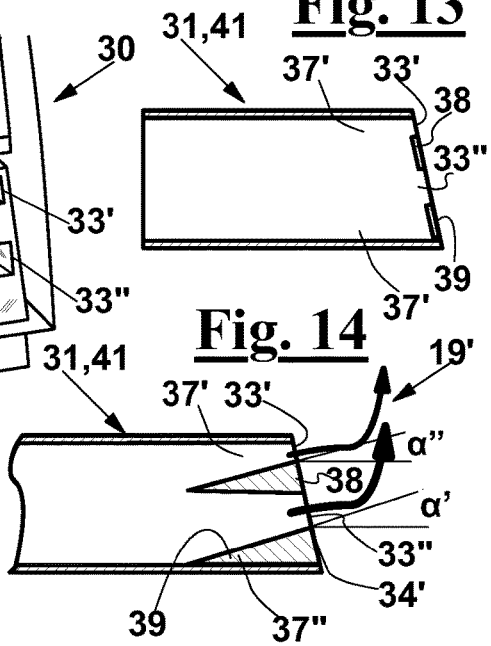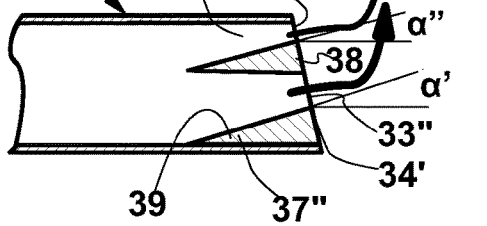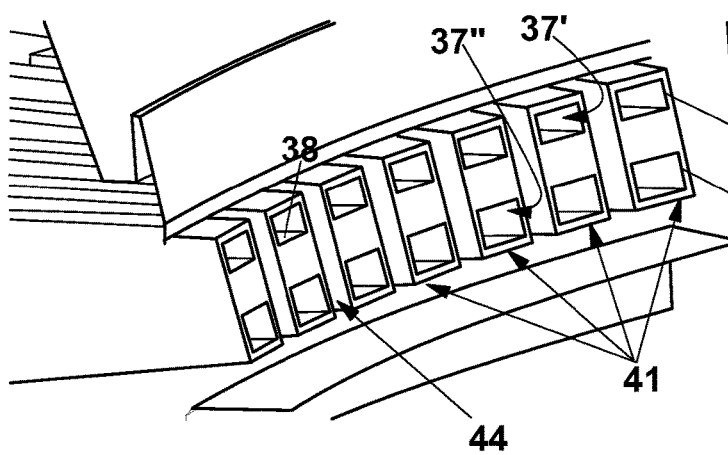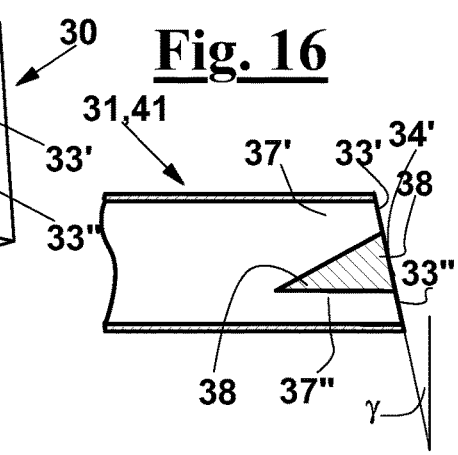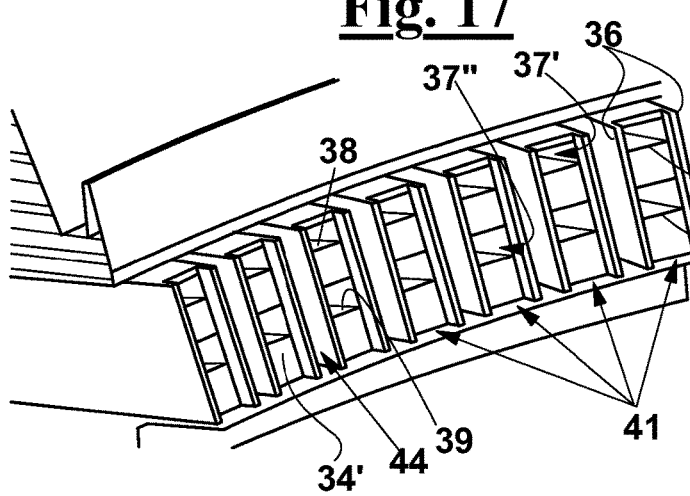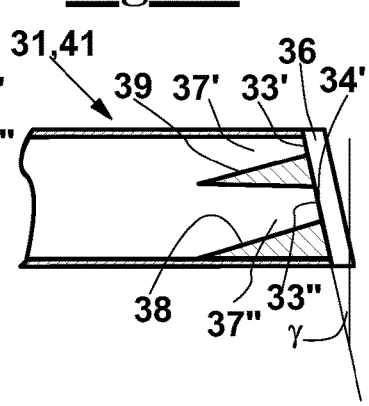

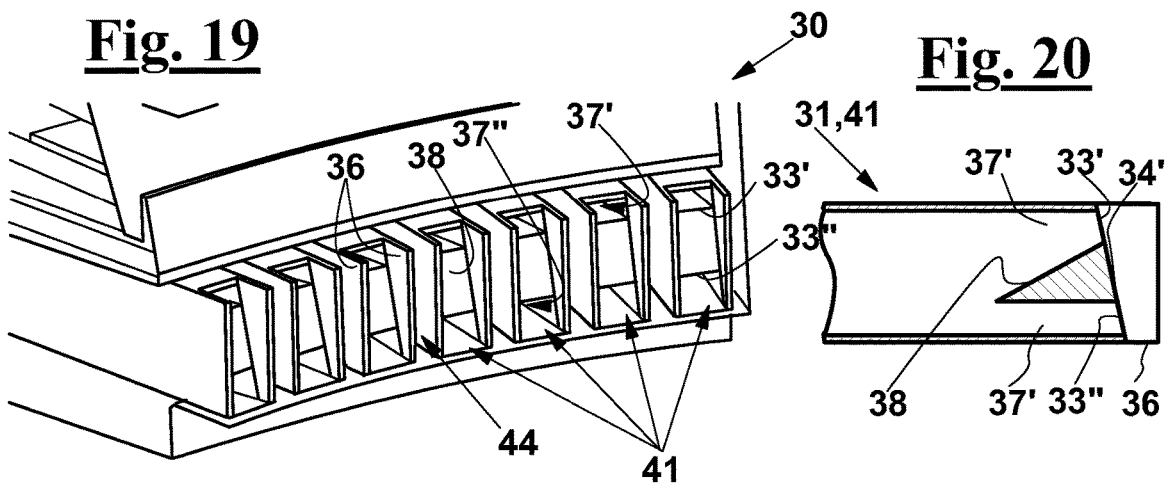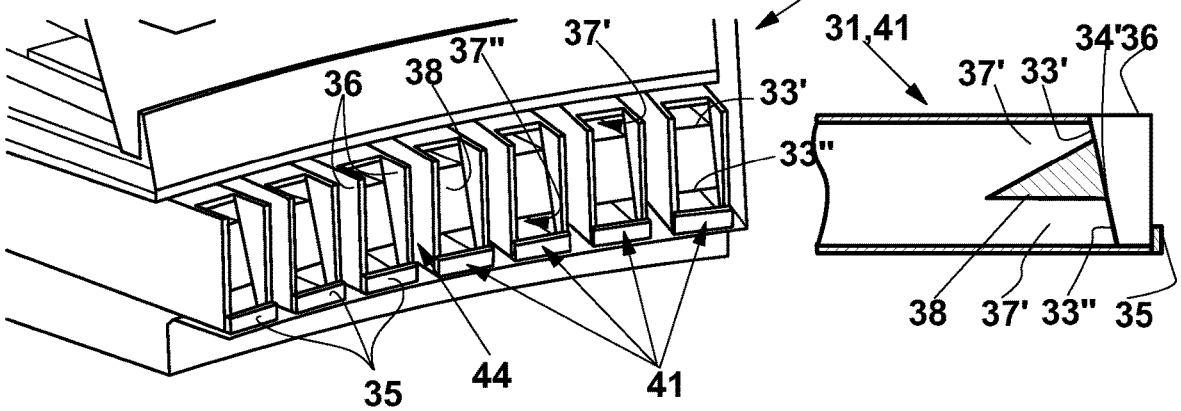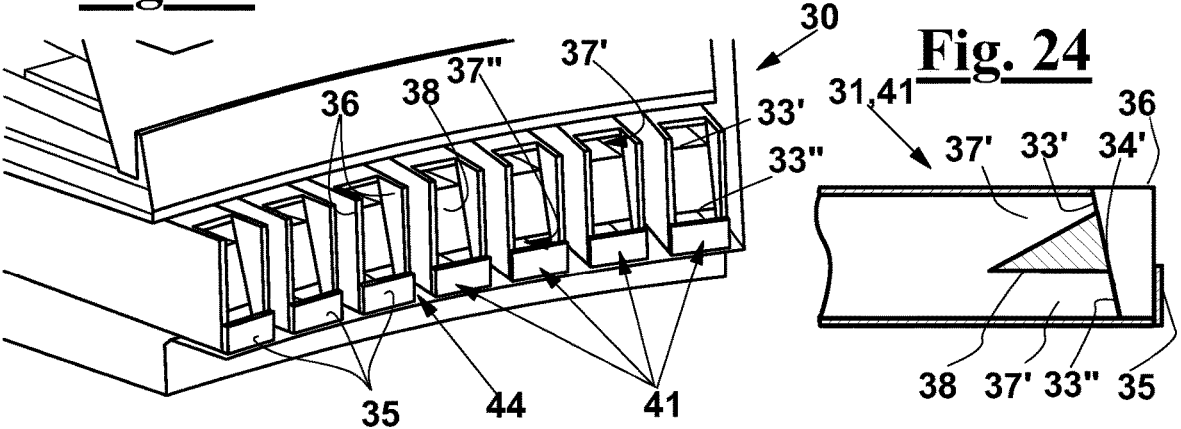

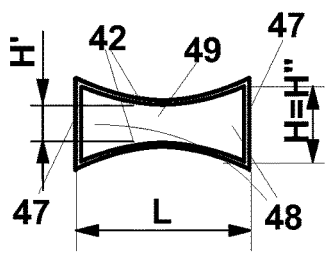
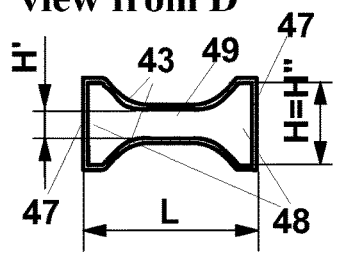
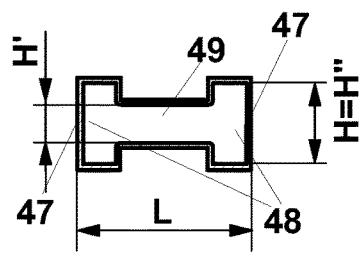
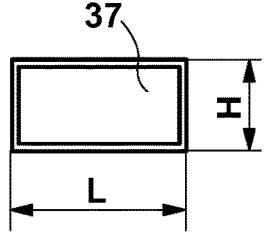
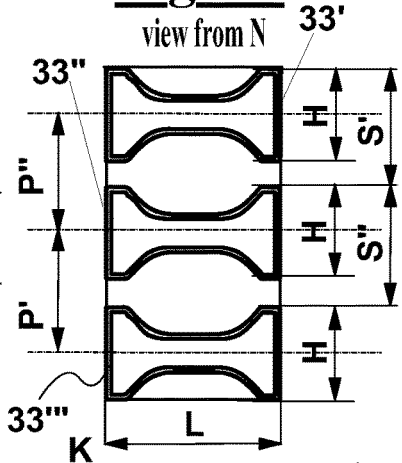
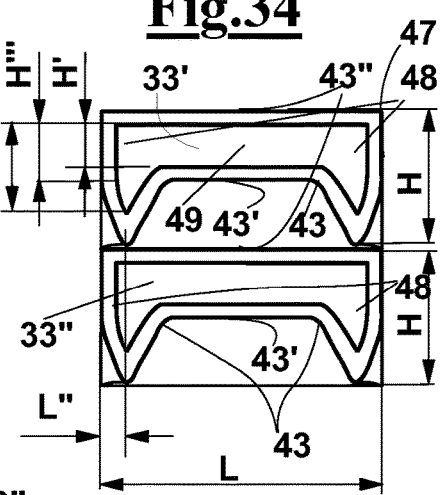
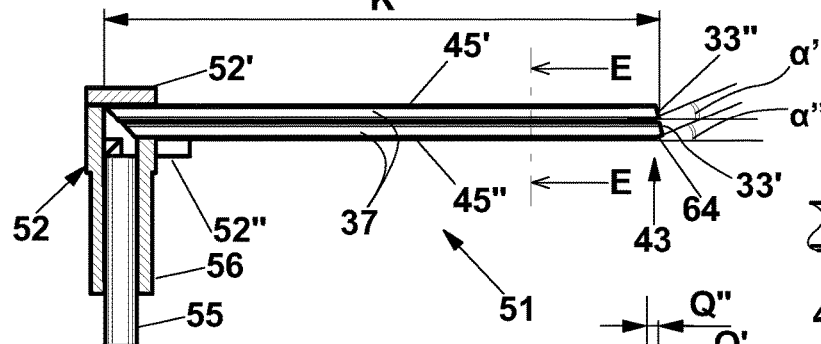
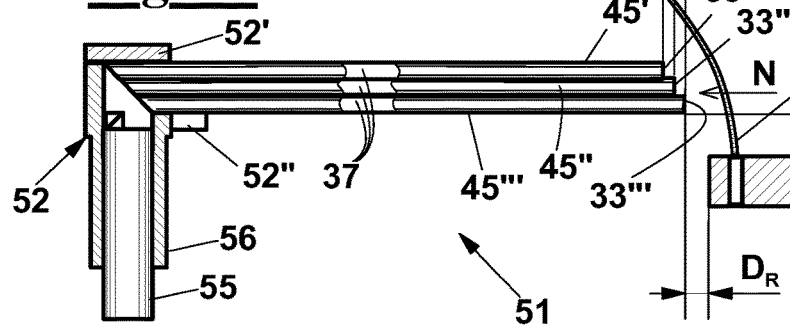
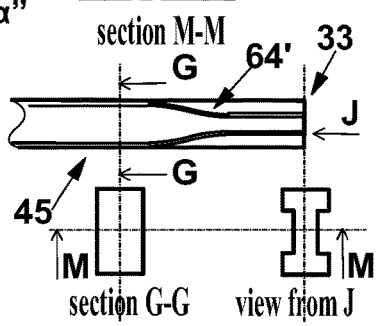
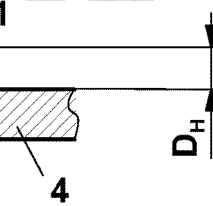

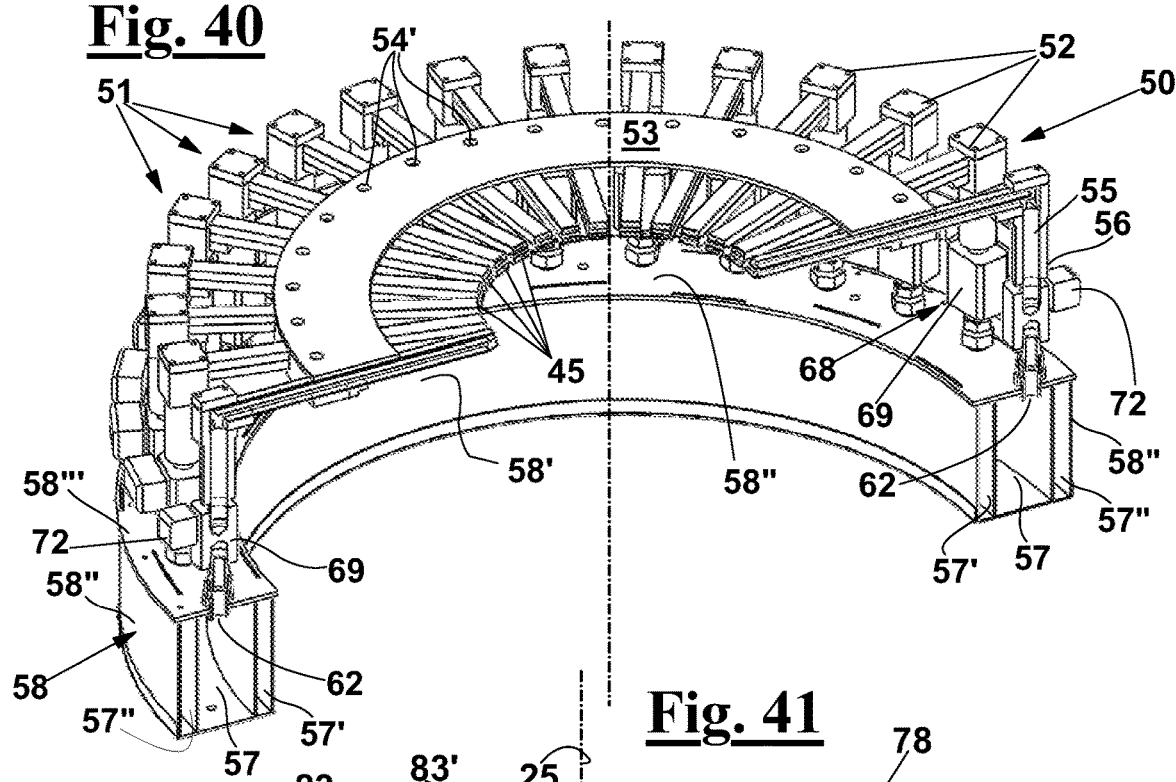
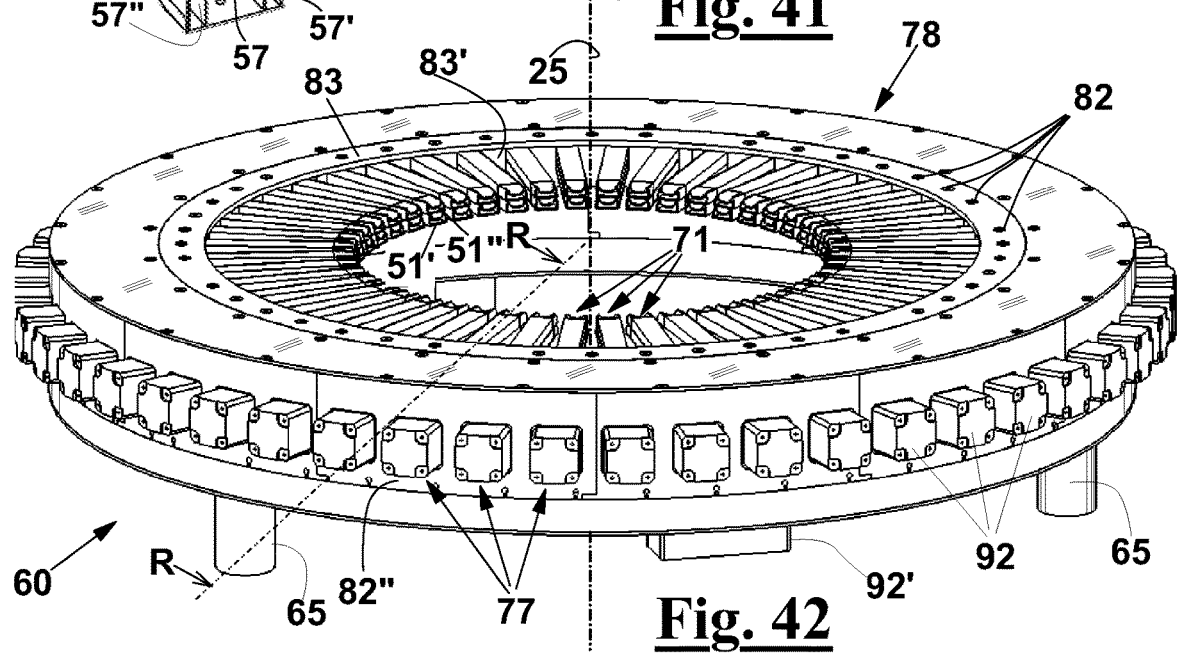
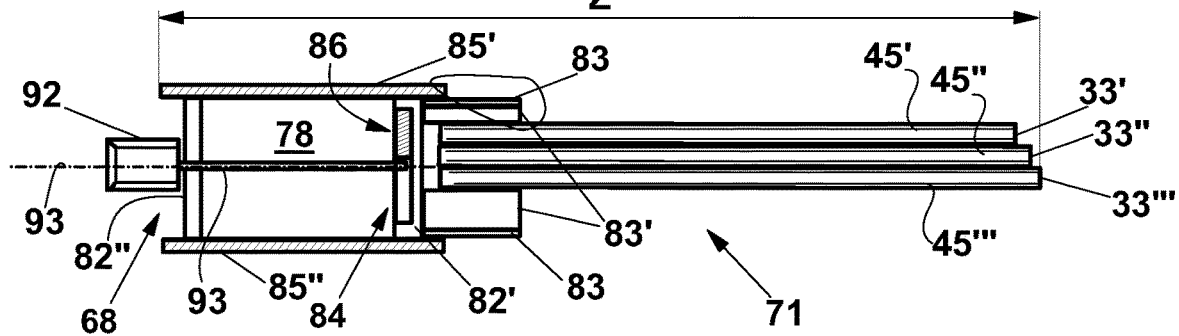

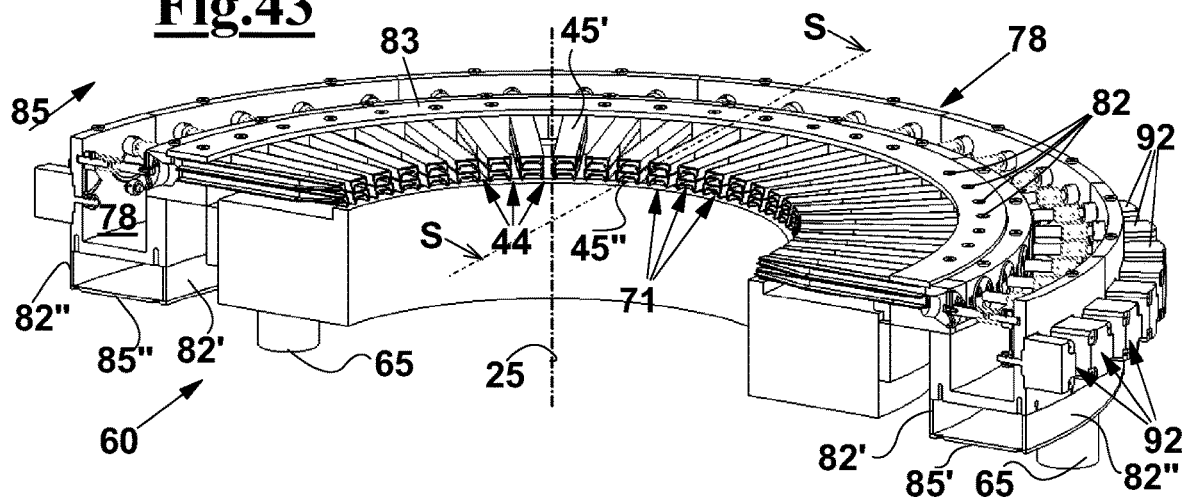
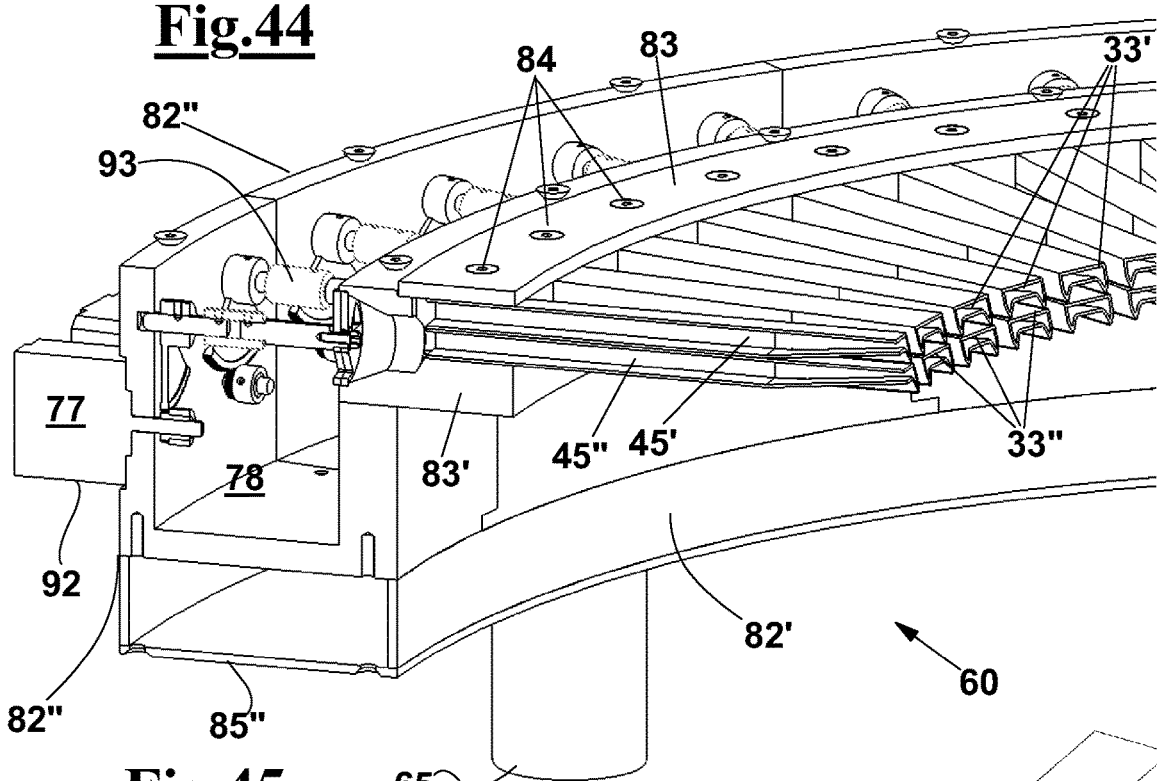
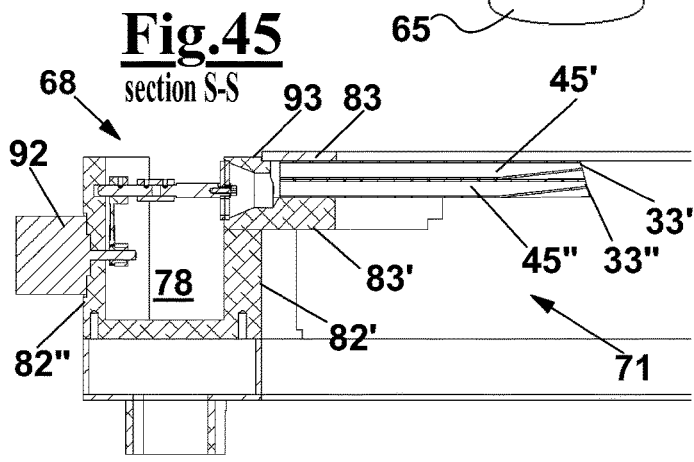
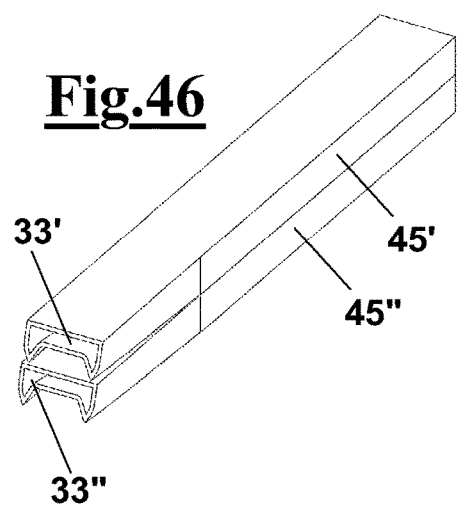

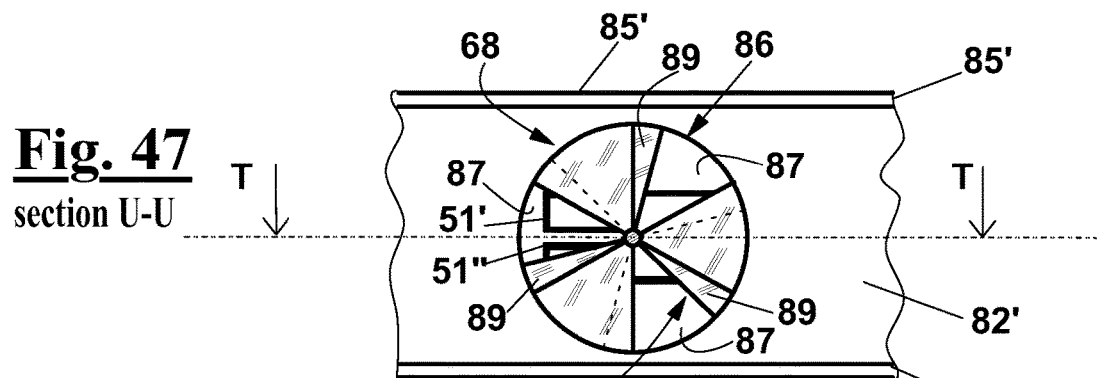
Fig. 47
section U-U
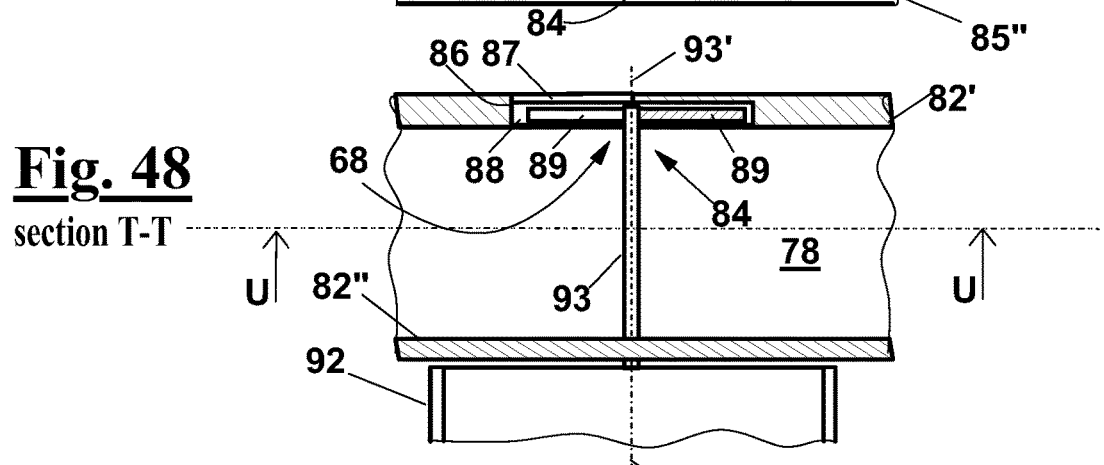
Fig. 48
section T-T
Fig. 49
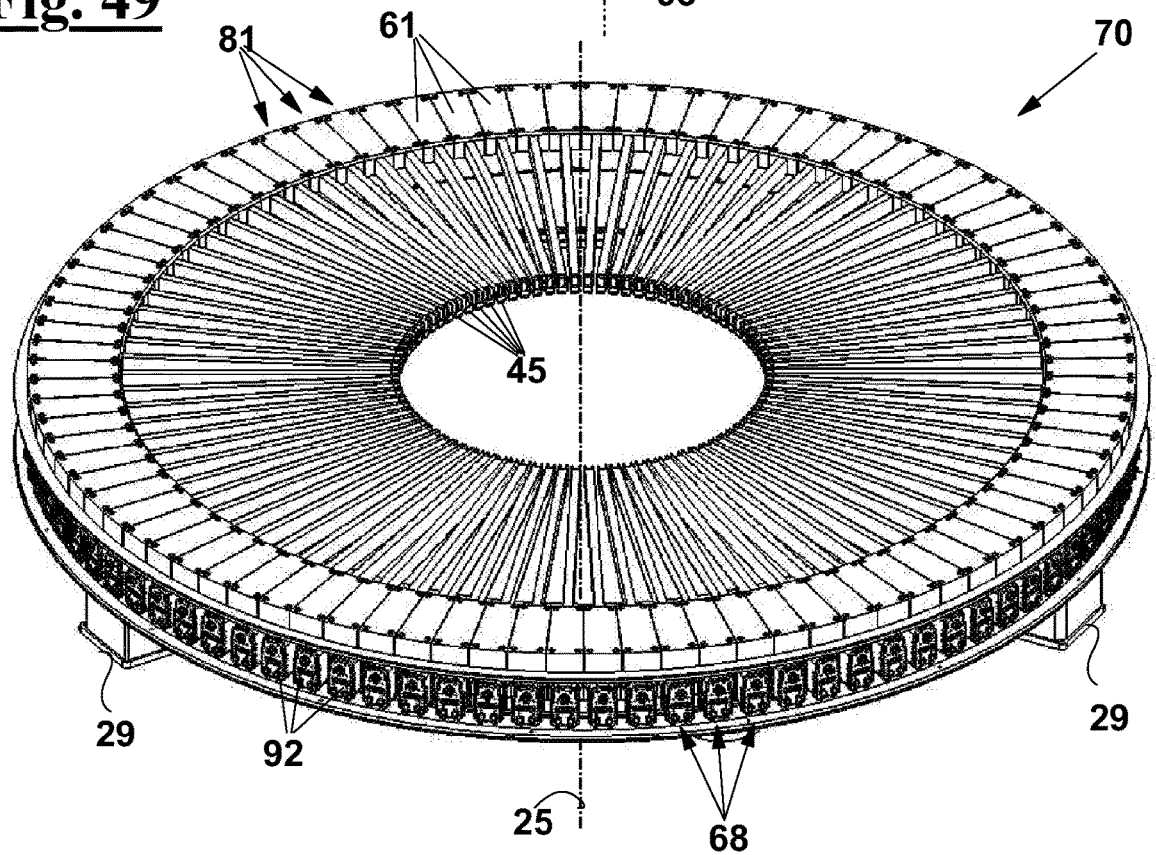

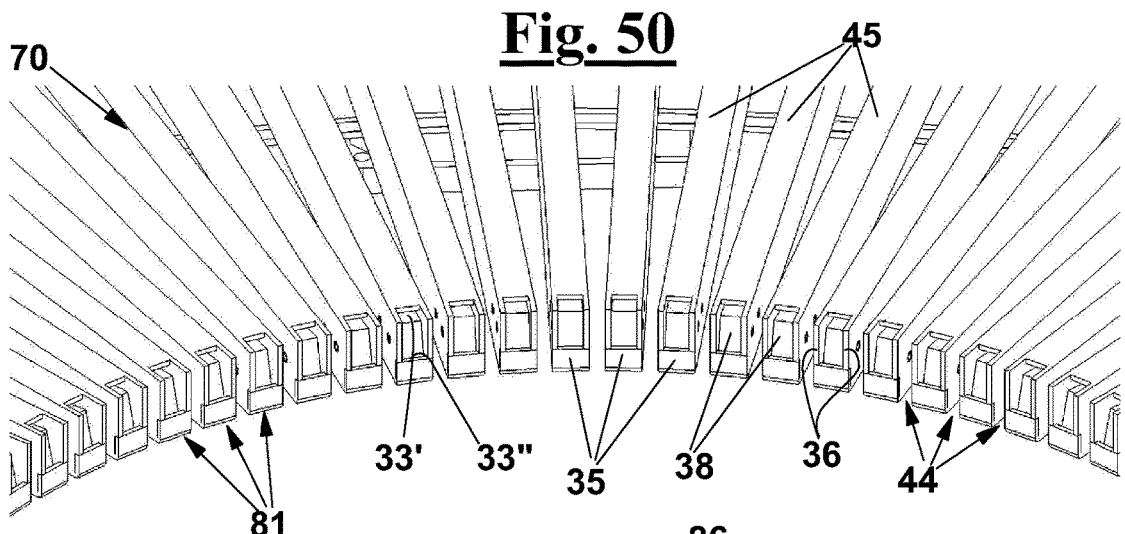
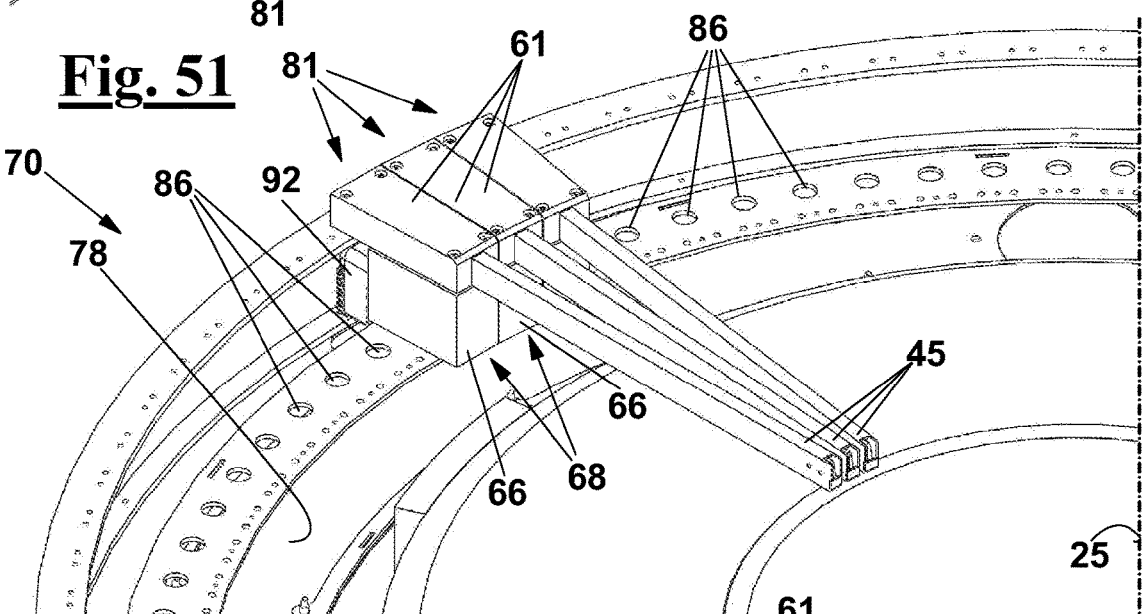
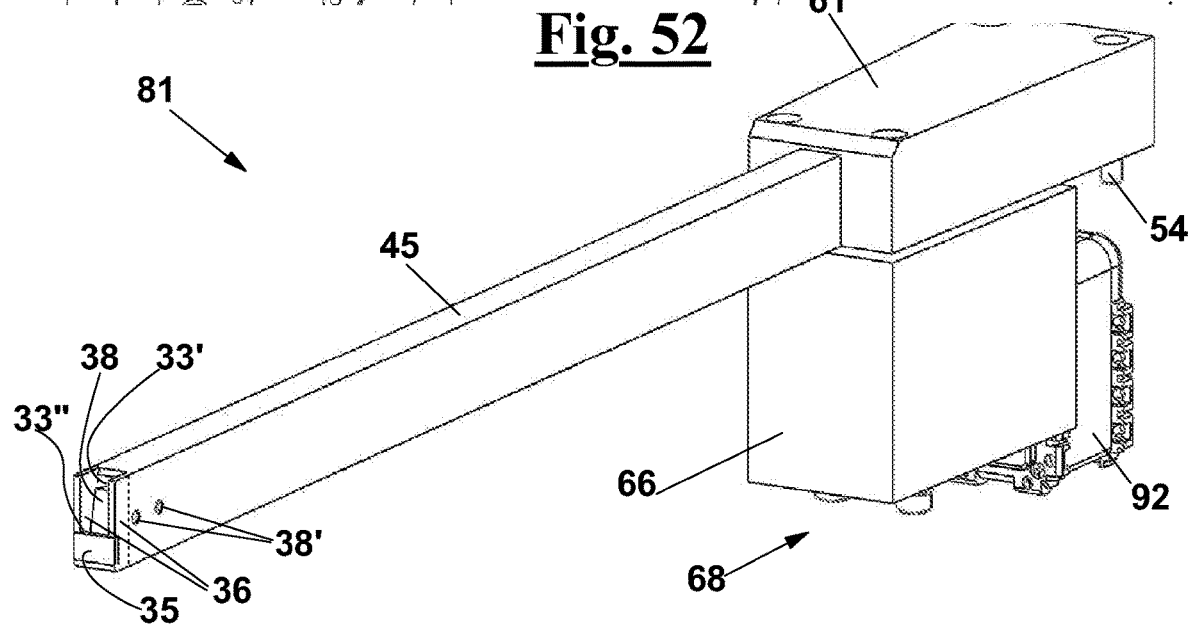

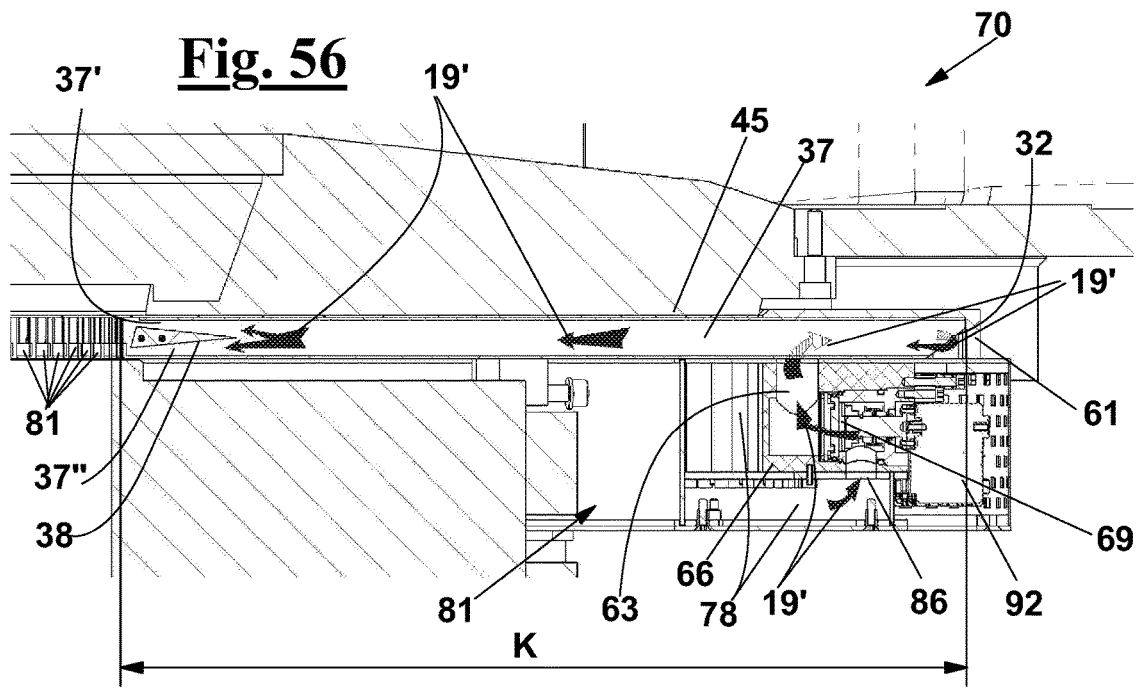
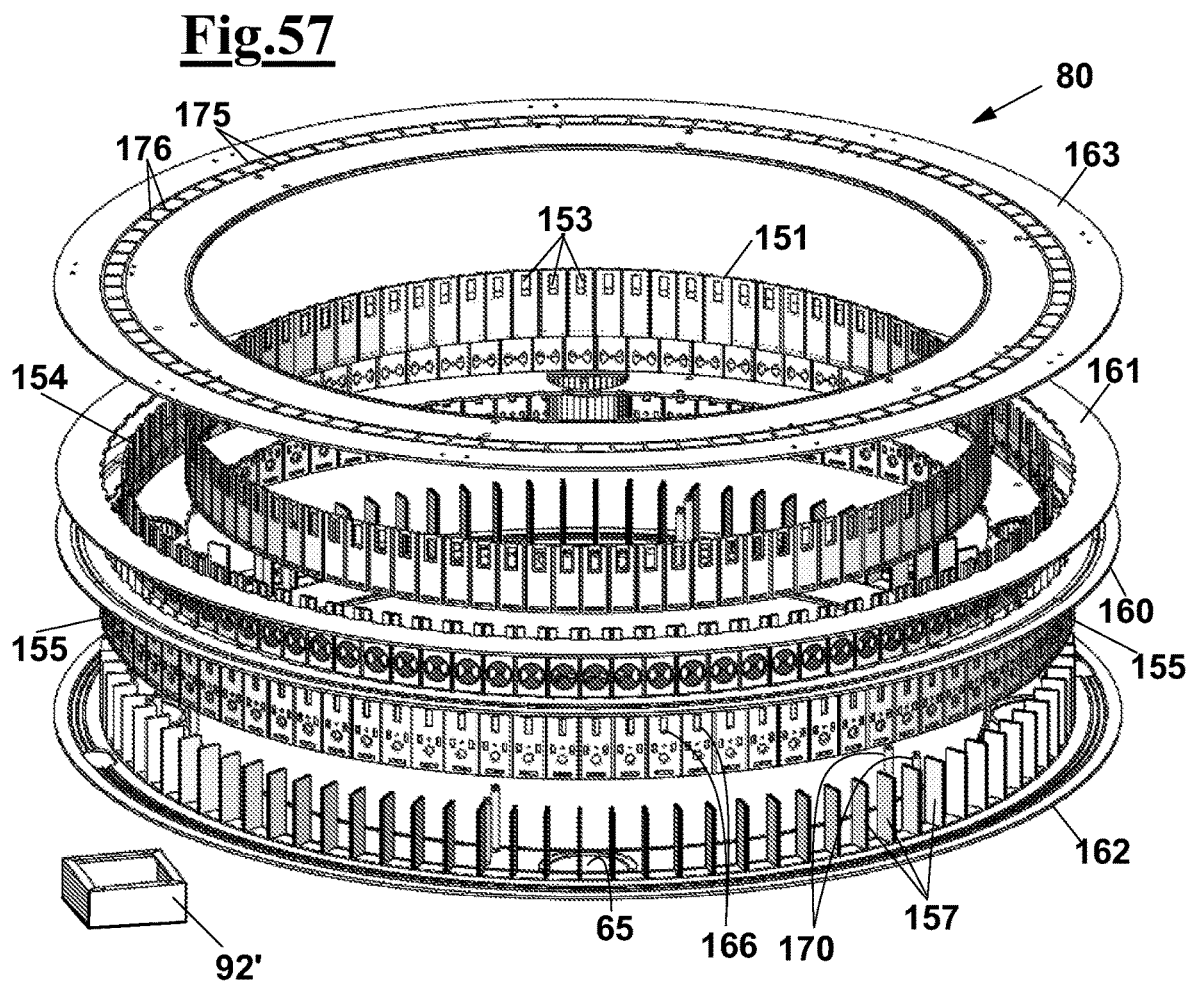

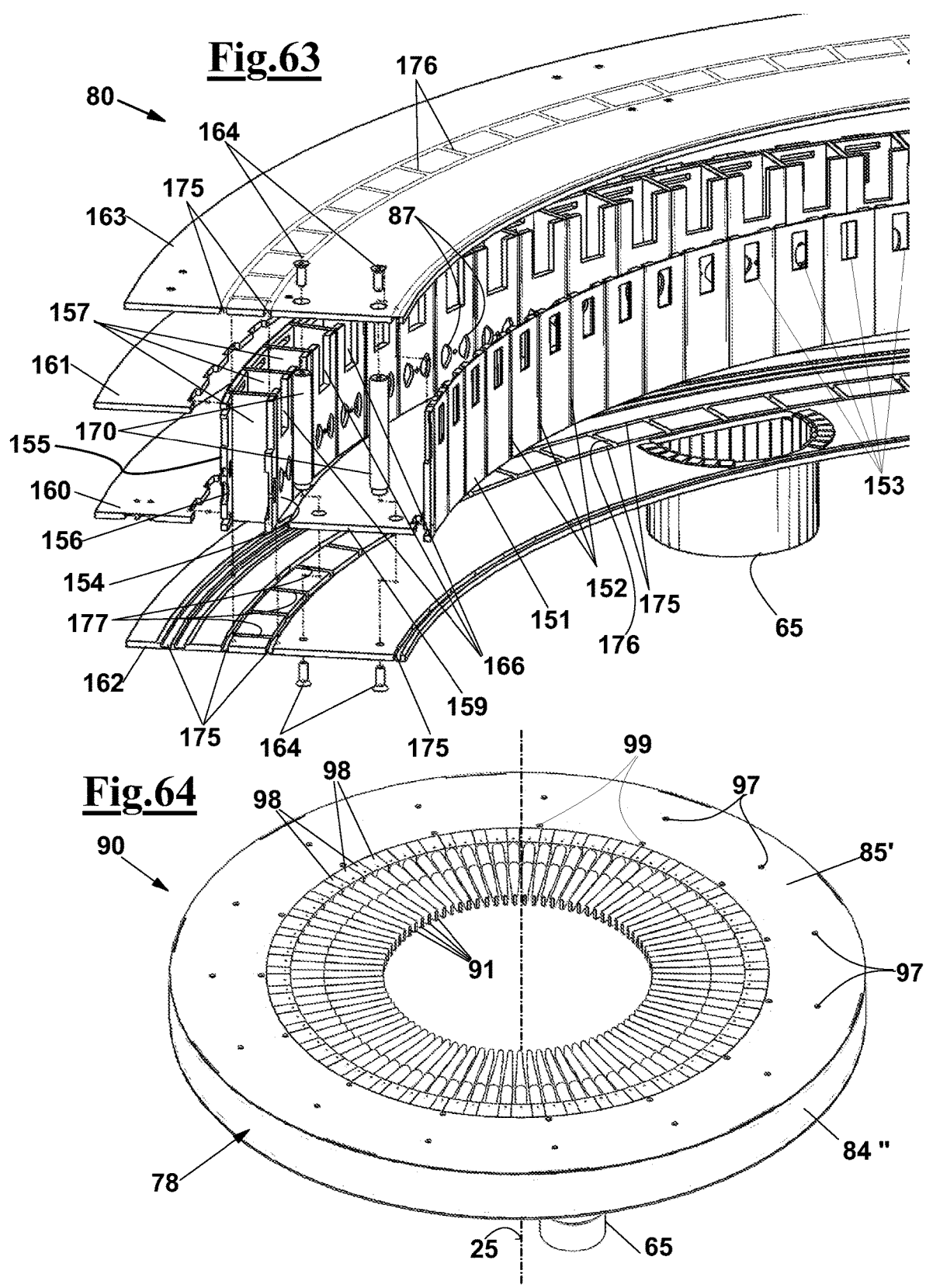

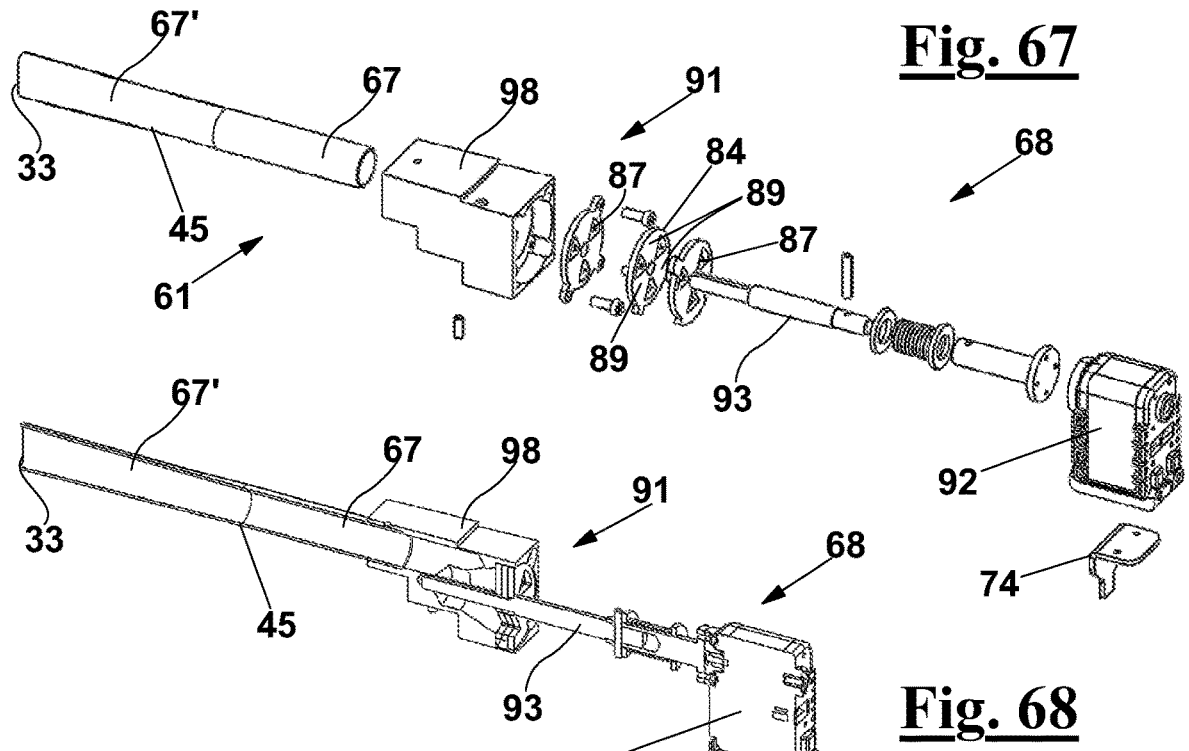
Fig. 67
Fig. 68
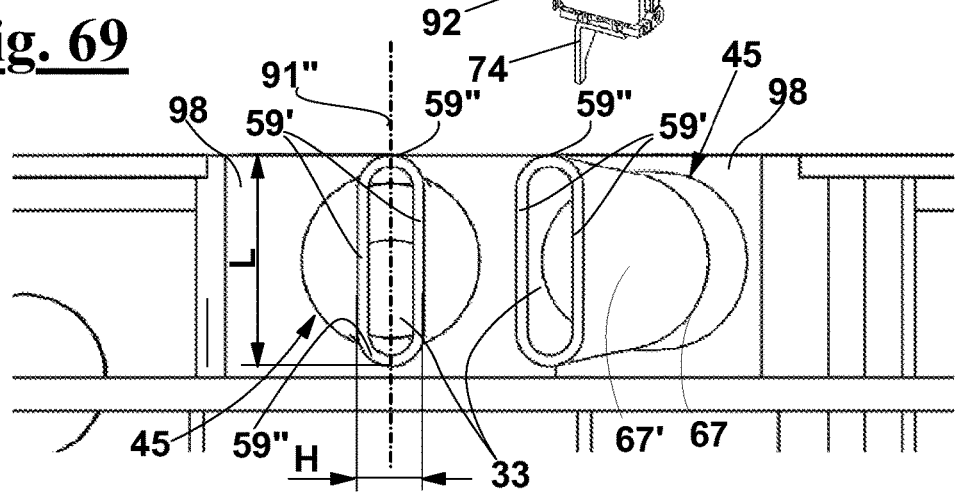
Fig. 69
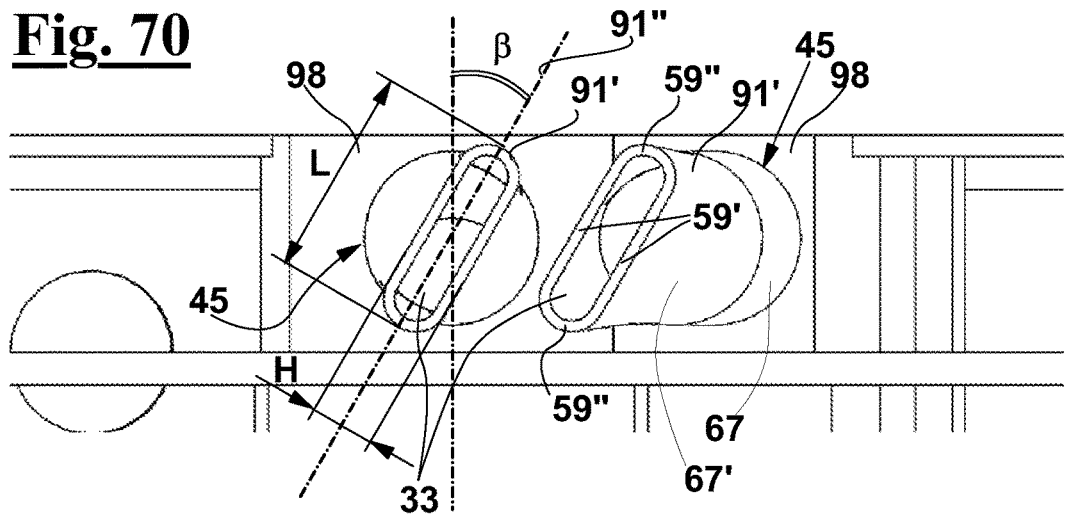
Fig. 70

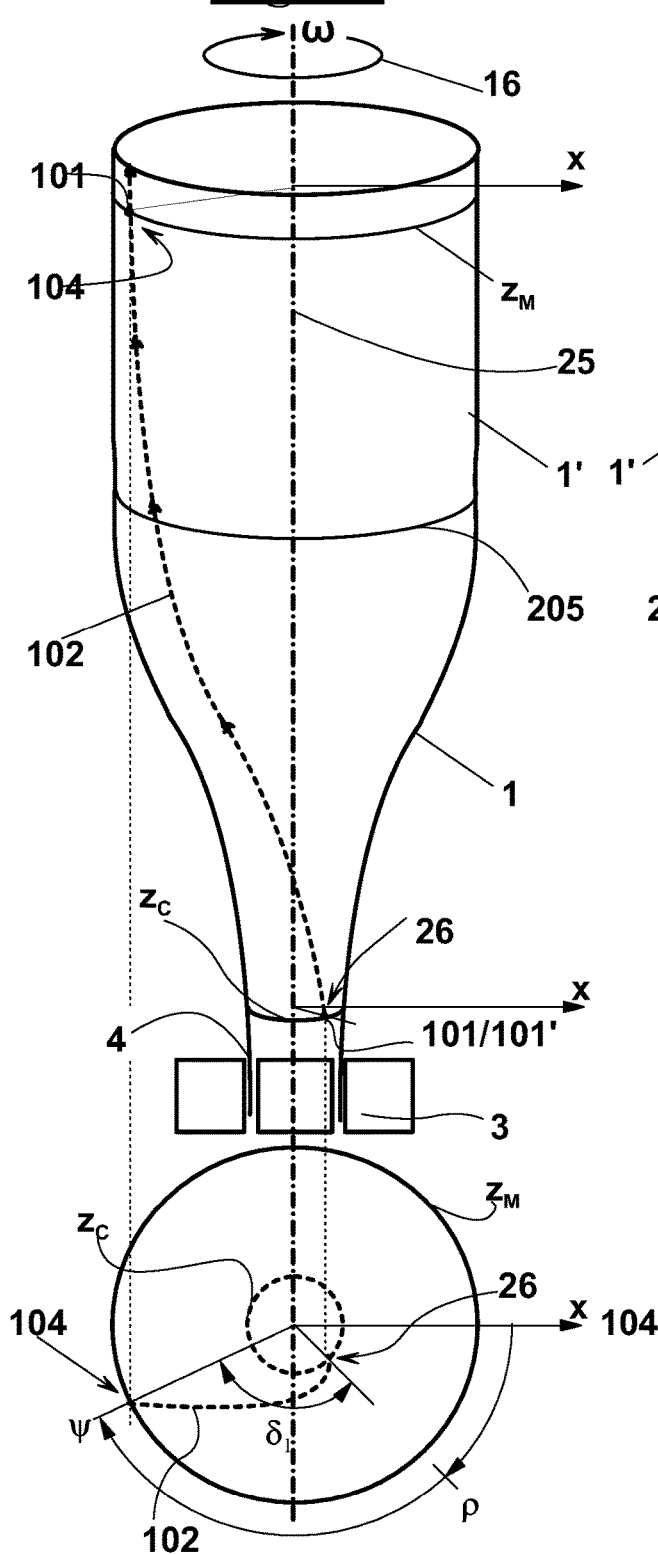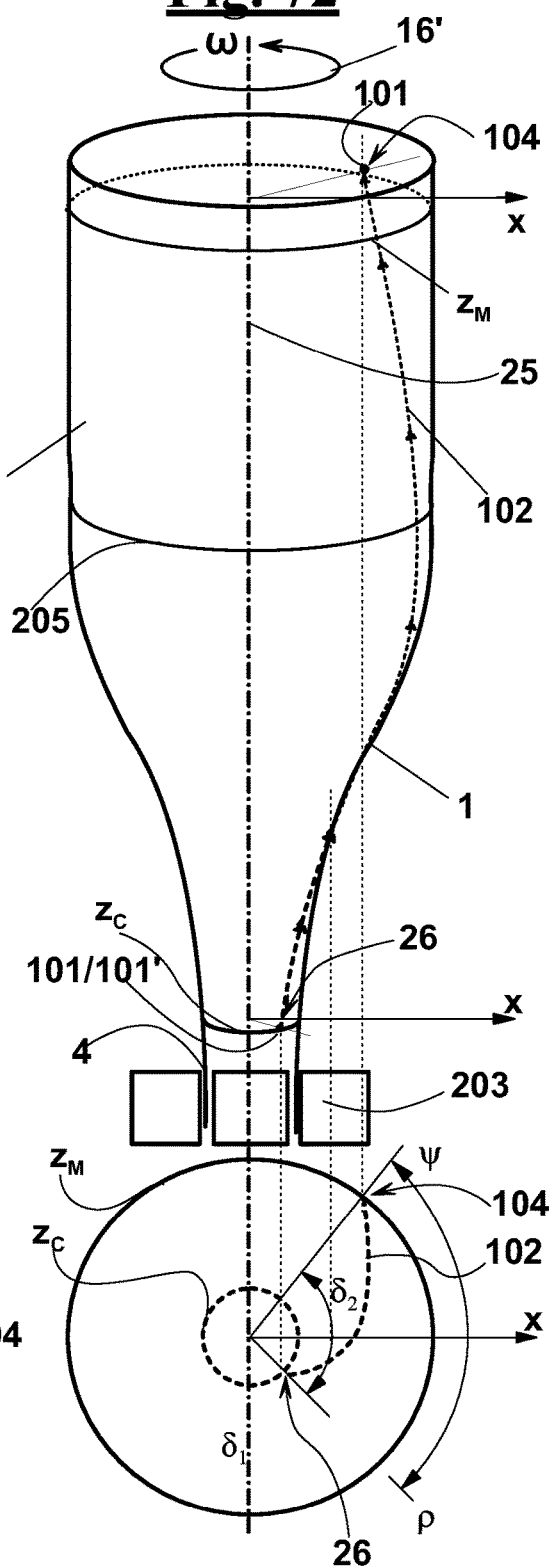

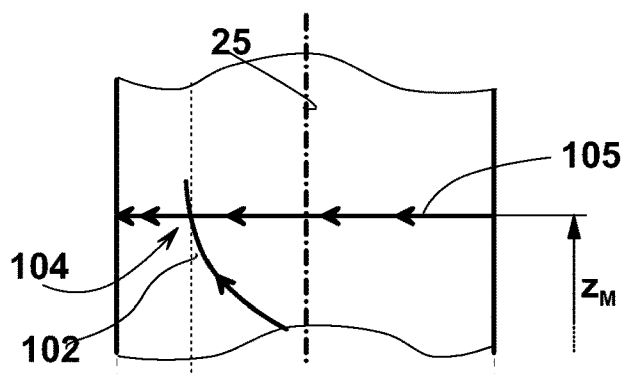
Fig. 74
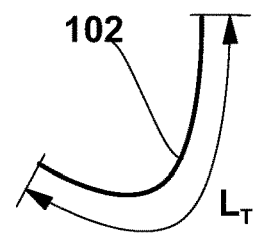
Fig. 75
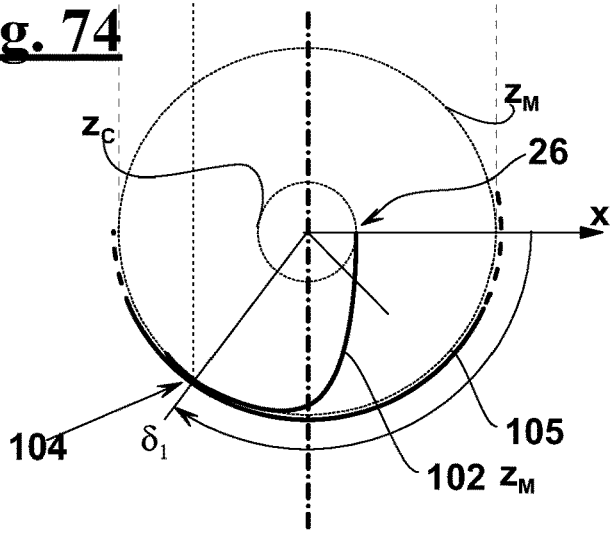
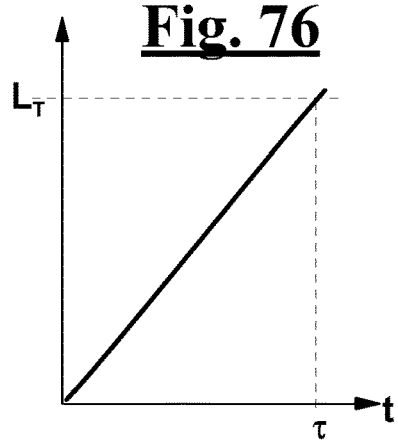
Fig. 76
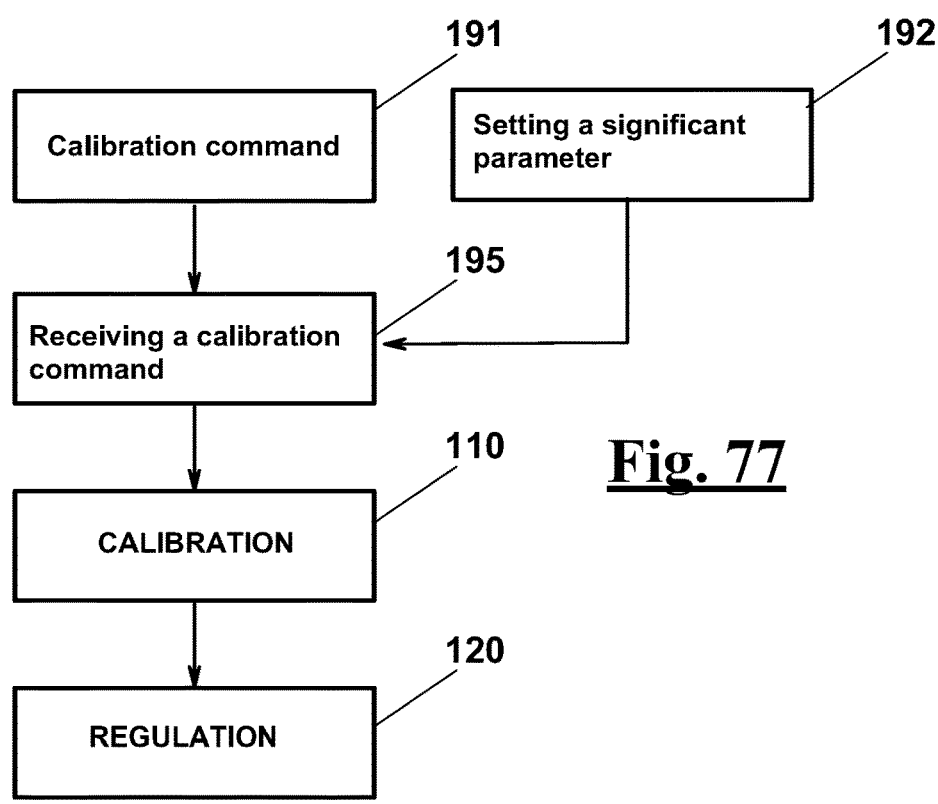
Fig. 77

BLOWN-FILM EXTRUSION APPARATUS AND A METHOD FOR MANUFACTURING A BLOWN FILM

CROSS-REFERENCE TO RELATED APPLICATIONS

This application is a national stage of International Application No. PCT/162016/053153 filed May 27, 2016, which claims the benefit of priority to Italian Application No. 102015000018447, filed May 28, 2015, in the Italian Patent Office, the disclosures of which are incorporated herein in their entireties by reference.

FIELD OF THE INVENTION

The present invention relates to a blown-film extrusion apparatus and a method for manufacturing a blown film having a device for correcting the thickness of the film by delivering correction air on said film being formed.

DESCRIPTION OF THE PRIOR ART

Blown-film extrusion apparatuses are known, for making tubular film suitable for manufacturing bags and other flexible packaging. FIG. 1 diagrammatically shows a conventional blown-film extrusion apparatus 100 for manufacturing a tubular film 1'. Apparatus 100 comprises an extruder 2 including an extrusion head 3 and an extrusion mouth, i.e. a die 4 for extruding a molten polymer in the form of a tubular element 1, at a predetermined temperature. Tubular element 1 is hardened into tubular film 1', which has an substantially vertical axis 25, under the effect of both a main cooling system 5 providing cooling air 5,' and a film drawing device 7. Film drawing device 7 comprises a couple of nip rollers 6, which pull tubular film 1', once the latter has collapsed between two upwards converging idle cylinders arrays 8, not shown in detail. Film drawing device 7 also comprises a takeoff device 7' which in turn comprises a plurality of stretching rollers 7" for stretching tubular film 1' at a predetermined stretching ratio, and a plurality of rollers 9 for conveying film 1' out of takeoff device 7', typically, to a bobbin storage device, not shown, before which a cutting section can be provided for longitudinally cutting the tubular film into two single films.

The thickness of film 1' should be as uniform as possible, as it is normally required by the product specifications. Moreover, thickness unevenness causes depressions and ribs to be formed on the bobbin surface, where plasticization may take place, which deteriorates mechanical, optical and other properties of the film product. The thickness unevenness, in a given cross section of tubular film 1', can be caused by the helical channels of extrusion head 3, by the distribution of molten polymer in extrusion head 3, by a poor homogeneity and/or homogenization of the raw material, by a non-uniform stretching of film 1', and the like. Therefore, in most cases thickness unevenness cannot be solved by adjusting the centring of die 4.

With reference to FIGS. 2 and 3, it is known the technique of blowing air out of film 1-1' being formed, at angular correction positions 17, usually immediately above die 4, in order to locally cool/heat the film, so as to correct too high/low thickness values at such angular correction positions 17.

To this purpose, apparatus 100 can comprise a ring device 10, as diagrammatically shown in FIGS. 2, 3, for delivering thickness correction air. Device 10 comprises a plurality of air delivery members 21, each having a delivery channel 27 defined between an inlet port 22 and a delivery mouth 23, and arranged radially, towards axis 25 of device 10. Each air delivery member 21 is therefore arranged to deliver correction air at a respective correction position or sector 17.

The correction is normally carried out on the basis of thickness measurements of film 1' made at a predetermined measurement height $z_M$ above the solidification line of the film being formed (FIG. 1). To this purpose, it is known the use of a thickness sensor 11, which is normally arranged to move about tubular film 1', for making these measurements at a plurality of angular predetermined measurement positions 12 at height $z_M$. A control unit 13 is configured for receiving measurements 12' from thickness sensor 11 and for generating a plurality of adjustment signals 12" for controlling device 10 in order to deliver thickness correction air at angular correction positions 17, each corresponding to one angular measurement position 12. Correction air is delivered responsive to measurements 12' provided by thickness sensor 11. At each angular correction position 17, the air temperature or flowrate depends on the possible thickness deviation detected at angular measurement position 12 corresponding to that angular correction position 17, so as to correct the thickness at some angular positions 12 where a deviation from a nominal reference value S* is detected higher than a predetermined maximum admissible value ΔS. In particular, the flowrate of a correction air partial stream is increased/decreased at an angular correction position according to whether a negative/positive deviation is detected, respectively, of the measured thickness from the nominal reference thickness S*, in the corresponding angular measurement position associated with that angular correction position.

Device 10 can be made, for example, by tightly connecting two annular discs previously positioned on one another, in which cavities have been prepared corresponding to channels 27. Each cavity is generally made by a milling operation at corresponding positions of both discs.

Inlet port 22 of each air delivery member 21 is pneumatically connected with a correction air source 28 (FIG. 1). Distribution device 10 can also comprise regulation valves, not shown, which are configured for increasing or decreasing their own opening degree, in order to increase or decrease the flowrate of the delivered air, causing a more or less intensive cooling, according to whether the thickness of tubular film 1' must be locally increased or reduced.

A surface 24 exposed by device 10 to the tubular polymer film being formed, i.e. to extruded tubular element 1, where delivery mouths 23 are formed. As diagrammatically shown in FIG. 3, delivery channels 27 are arranged with delivery mouths 23 at a very short mutual distance. Moreover, inner surface 24 of the annular disc prevents the correction air from flowing away after lapping on tubular film 1-1' being formed. Therefore, correction air partial streams delivered by two adjacent delivery channels 27 are affected by each other.

More in detail, still with reference to FIG. 3, if different correction air partial streams are delivered by a given air delivery member 21 and an adjacent air delivery member 21', the air flow projected by the air delivery member 21 conveying the higher flowrate air flow tends to lap also on the angular correction position 17' of the tubular film arranged in front of the delivery mouth of the adjacent air delivery member 21', which creates an adjustment interference, i.e. a correction more intensive than what actually needed at angular position 17'.

Therefore, the adjustment operation is not very effective, in particular the thickness profile of tubular film 1' is unstable, i.e. it can cyclically change in the time. Accordingly, the expected thickness uniformity cannot always be satisfactorily foreseen, or cannot be foreseen at all.

During the manufacturing process, the propagation of such a defect along bubble 1-1' occurs according to a propagation line that can be assimilated to a helix. The shape of this propagation line firstly depends on the rotation of takeoff device 7' about its axis 25, which creates a tangential component of the displacement of any material element of bubble 1-1', and also depends on the presence of helical channels in extrusion head 3, which causes the polymer to flow out of the die 4 at an angle with respect to the vertical.

Therefore, in order to make a correction, displacement angle must be known formed between angular coordinate 12, at height $z_M$, where a thickness defect or excess of tubular film 1' is detected, and the corresponding angular coordinate 17 at a lower height, where a correction action must be done to correcting such defect or excess. This complicates the process. In fact, the behaviour of the bubble being formed depends uneasily on a lot of machine parameters, firstly upon the speed of the nip rollers 6, on the speed of takeoff device 7', on the extrusion flowrate and on the cooling air temperature. Therefore, whenever the value of at least one of such significant parameters changes, the displacement angle must be updated. The same occur, naturally, if a property of the extruded polymeric material changes.

Moreover, in the prior art, takeoff device 7' cyclically reverses its own rotation direction 16,16' about its axis 25, i.e. it turns by a predetermined angle and then inverts its direction, after each rotation. This causes torsional components to be created in the tubular film 1,1' being formed, which also are cyclically inverted, with an asymmetrical effect on the torsion. Therefore, being equal all other conditions, at least two displacement angles must be known, one for each direction of rotation of takeoff device 7'.

The behaviour of bubble 1-1' depends also upon various external conditions of extrusion apparatus 100, such as the presence of neighbouring walls, more or less accidental draughts and the like.

JP H07 300827 A and DE 2658518 describe devices for maintaining uniform the thickness of a tubular film produced by a blown film extruder, projecting thickness correction air before the molten polymer is solidified. These devices comprise a plurality of air radial delivery members for delivering respective correction air partial streams, each member oriented, in use, for projecting an amount of correction air on a respective correction sector of the film being formed, i.e. of the molten polymer extruded by the die. Both devices use a sensor arranged for measuring the thickness along a cross sectional view of the film once it has been solidified, and arranged for generating thickness signals concerning respective measurement positions along such cross section. The thickness signals are received by a control unit that processes them into control signals for respective adjustment devices each arranged to modify the features of a single correction air stream to be projected on the respective circumferential sector of the film being formed, in order to correct its thickness.

The device of DE 2658518 is conceived to be installed above the main cooling ring of the blown film extruder. Each air delivery member has a flowrate regulation valve. A control unit is configured for issuing a control signal for the regulation valve of any delivery member, which is oriented towards a predetermined correction circumferential sector, wherein the control signal depends upon the deviation between value of the determined thickness of a measurement zone of the solidified film corresponding to that correction sector, and a predetermined thickness value. This device aims at cooling the polymer differently from one film zone to the adjacent one, by a higher/lower exposition to the cooling air, so as to compensate for local thickness defects/excesses, for different reasons, would be obtained only once a general cooling has been performed by the main cooling ring arranged therebelow.

However, the device of DE 2658518 would not able to correct a strong thickness unevenness, since correction air meets the polymeric material once the latter has already been treated by the air delivered by the main cooling system, i.e. when the polymer is in an early solidification state, and has a low molecular mobility.

The device of JP H07 300827 A is intended for installation between the die and the main cooling ring of an extruder. As indicated in paragraph [0024], each air delivery member contains a heating element for heating its own correction air stream before delivery, and a control unit comprises a computation unit to calculate the optimum correction air temperature of each air delivery member, based on the thickness signals. The control unit is configured for issuing control signals for the heating element of each air delivery member, so that the latter delivers correction air at the optimum temperature on the respective sector of the film being formed.

The device of JP H07 300827 has the drawback that a correction system based only on the air temperature has a large thermal inertia, therefore it cannot work promptly and precisely.

Other devices for controlling the thickness of a tubular film in a blown film extruder are described in WO 2006/039813 A1, JP H07 207259 A, U.S. Pat. Nos. 4,022,558, 3,976,732, FR 2 720 027, DE 41 19 385 A1, DE 44 32 513 A1.

SUMMARY OF THE INVENTION

It is therefore an object of the present invention to provide a blown film apparatus and method for manufacturing a tubular film that has a thickness more uniform than what is allowed by prior art devices, by projecting correction air streams on respective sectors of the film formed.

It is a particular object of the invention to provide a device that makes it possible to project the correction air streams on specific respective sectors of the film being formed, without affecting the adjacent sectors.

It is another particular object of the invention to provide such a device in which the correction air delivery mouths can be arranged at a lower distance from the extruded film than the prior art devices.

It is another particular object of the invention to provide such a device in which the correction air delivery mouths can be arranged at a lower height above the die, with respect to the prior art devices.

It is another particular object of the invention to provide such a device that is smaller in height than the prior art devices.

It is another particular object of the invention to provide such a device that is easy and cheap to manufacture.

It is also an object of the invention to provide a method and a device that make it possible to identify automatically, for each thickness measurement position of the film, the sector of the tubular film as extruded where a predetermined correction air flow must be delivered, i.e. to identify the displacement angle between the angular measurement position and the corresponding angular correction position, so as to perform a more accurate thickness adjustment.

It is a particular object of the invention to provide such a method and device that allow identifying the displacement angle automatically and promptly upon any significant change of an operating parameter, so as to reduce scrap production when such a variation occurs.

It is another particular object of the invention to provide such a method and device that allow identifying the displacement angle even when the rotation direction of the takeoff device is reverted.

These and other objects are achieved by a blown-film extrusion apparatus for making a tubular polymer film, comprising:
 an extruder having an extrusion mouth configured for extruding a molten polymer in the form of a tubular element at a predetermined temperature;
 a solidification ring arranged to harden the tubular element to form the tubular polymer film, and a film conveyor arranged for conveying the tubular polymer film and the tubular element upwards about a substantially vertical axis of the apparatus,
wherein the solidification ring is configured for delivering cooling air out of the tubular element about its axis at a predetermined cooling height above the extrusion mouth, the blown-film extrusion apparatus also comprising a delivery device arranged to deliver correction air to hit externally the tubular element, in order to locally modify the temperature and locally correct the thickness of the tubular polymer film,
the delivery device comprising:
 a distribution chamber having an inlet opening and a plurality of distribution outlet ports for the correction air;
 a plurality of correction air delivery members having respective inlet ports and respective delivery channels ending with respective delivery mouths downstream of the delivery channels, about its axis for delivering correction air partial streams, in order to hit the tubular element at respective angular correction positions,
 a plurality of flow control elements, typically comprising respective regulation valves, each pneumatically connected between:
  a respective distribution outlet port of the distribution outlet ports of the distribution chamber, and
  an inlet port of a respective air delivery member of the air delivery members,
wherein each flow control elements is configured for receiving a respective adjustment signal for modifying an own passageway for the correction air, typically changing the opening of a valve, responsive to the adjustment signal, in order to adjust the flowrate of a respective correction air partial stream of the flow partial of the correction air partial streams responsive to the respective adjustment signal.

According to one aspect of the invention, the delivery device comprises a plurality of separate radial ducts each defining a respective delivery channel and having a predetermined length, wherein the separate radial ducts are spaced apart from one another by separation spaces, and the delivery mouths channels of adjacent separate radial ducts are arranged at a mutual predetermined distance, so that the correction air partial streams, after hitting the tubular element at respective angular correction positions, can at least in part return backwards outside of the ducts flowing through the separation spaces,
furthermore, the delivery mouths of the delivery device are arranged at a correction height set between cooling height the solidification ring and the extrusion mouth.

This way, correction air is projected on the single correction sectors, with a flowrate that can be different from a correction sector to another, on the polymer substantially as it is extruded by the extrusion mouth, i.e. in the molten state. This makes it possible to prevent remarkable thickness unevenness. This would not be possible with the device of DE 2658518, since in that case correction air treats the film when the latter is in an early solidification condition.

Moreover, the void spaces left between the separate radial ducts, which have a predetermined size, provide an "escape" to the correction air stream immediately after the latter have lapped or hit the tubular film being formed, in respective correction sectors. This prevents distortion effects on the film from being formed, a problem that could arise if correction air partial streams were projected at very different flowrates from a sector to another.

JP H07 300827 A is not able of suggest a skilled person to combine a flowrate adjustment of the correction air streams and the provision of "escapes" between adjacent air delivery members. As a matter of fact, even if this document refers to correction air partial streams directed on a still substantially molten polymer, it suggests to use different temperatures between a partial stream and another, while it does not suggest to use different flowrates. In these conditions, the above-mentioned distortion technical problem does not arise.

Moreover, since the correction air of each partial stream flows quickly away from the tubular film being formed, immediately after the contact with the respective angular correction position of the tubular film being formed through the separation spaces left between the delivery channels end portions, each angular correction position is attained only by the correction air that is conveyed by the air delivery member located of front of that position, and is not attained by the air conveyed by the adjacent air delivery members. This prevents mutual interferences from occurring between adjacent air delivery members. Therefore, a finer and quicker thickness adjustment is possible, substantially without transitory effects consisting of oscillating thickness values. This leads to a better thickness uniformity and to a lower scrap production when the operating or surrounding conditions change.

Preferably, the length along which the separation space between the two adjacent air delivery member ducts extends is at least 7 mm, in particular it is at least 12 mm. This assists removing the correction air once the latter has hit the tubular film being formed, preventing the correction air partial streams released by adjacent air delivery members from significantly mixing.

Advantageously, the delivery channels linearly extend for a length longer than a minimum predetermined length value. In particular, this minimum length value is 330 mm, more in particular, the minimum length value is 350 mm, even more in particular, the minimum length value is 370 mm. This way, any turbulence effect at the delivery mouths is suppressed. This allows a more robust thickness regulation of the tubular polymer film being formed.

In a advantageous exemplary embodiment, the delivery ducts have a correction air inlet port arranged in a peripheral position of the correction air delivery device.

According to another aspect of the invention, the distribution chamber is defined by an upper ring and by a lower ring connected to each other by a first cylindrical wall and by a second cylindrical wall arranged externally with respect to the first cylindrical wall, the separate radial ducts of the air delivery members protruding from the first cylindrical wall.

This way, the structure of the delivery device is very easy, which remarkably reduces production time and costs.

In a preferred exemplary embodiment, the upper ring, the lower ring and the first and second cylindrical walls are made of a layered composite material comprising two metal external layers, in particular aluminium external layers, and an inner thermoplastic material layer, wherein fixed-joint grooves are made on one face of both the upper and the lower ring, said grooves arranged for receiving in a fixed joint opposite edges to the first and of the second cylindrical wall, the fixed-joint grooves containing a residue of thermoplastic material, so that, by inserting the opposite edges of the first and second cylindrical walls into the fixed-joint grooves, and by temporarily heating and/or pressing the first and the second cylindrical walls on the upper and/or lower ring, a local melting and a subsequent hardening and welding of the thermoplastic material to the edge of the first and of the second cylindrical walls occurs with the residue of plastic material present in the fixed-joint grooves, so as to cause the first and the second cylindrical wall integral to the upper ring and/or lower ring.

In a preferred exemplary embodiment, the second cylindrical wall has a passage windows that has a flow section configured for receiving a choke member of a flow control element, and the delivery device comprises a third substantially cylindrical wall, concentrically arranged about the second cylindrical wall and tightly connected between the lower ring and the upper ring, and two radial walls are tightly arranged between the second cylindrical wall and the third cylindrical wall, and at opposite sides with respect to the passage windows, said two walls defining, along with the second and the third cylindrical walls, a plurality of fluid-tight chambers, and a rear end portion of each radial ducts protrudes into a respective recess, and has the inlet port arranged in pneumatic connection with the respective recess. This way, an air flowrate of a respective correction air partial stream established responsive to the opening of the flow section can flow from the distribution chamber into each recess, and then from the latter into the delivery channel of the respective separated duct, through the inlet port thereof.

According to another aspect of the invention, a correction air delivery device for a blown-film extrusion apparatus has the features described above.

Advantageously, the predefined mutual distance between the delivery mouths of the delivery channels of the adjacent separate radial ducts is set between 0.1 mm and 8 mm, preferably between 0.5 mm and 6 mm, more preferably between 1 mm and 5 mm.

Advantageously, the air delivery members comprise generally respective flow deflection elements arranged at respective delivery mouths, configured for orienting the respective correction air partial streams delivered through the delivery mouths. In particular, the deflection elements are configured for orienting the respective partial streams upwards.

This way, in particular in the case of air delivery members having correction air delivery mouths arranged at different heights along the direction of the axis of the delivery device, an effect is enhanced in which the air supplied by an upper delivery mouth is conveyed upwards by correction air supplied by a lower delivery mouth, which assists evacuating the correction air from close to the tubular film being formed, once the correction air has hit the corresponding angular correction position. This makes even more robust the thickness regulation of the tubular polymer film being formed, further improving the thickness uniformity.

In an exemplary embodiment, the flow deflection elements can comprise a lower inner wall of a delivery channel that is arranged at a predetermined inclination angle with respect to the horizontal, in particular at an angle set between 10° and 40°, preferably set between 15° and 30°, even more preferably set between 18° and 15°, towards an upper inner wall of the respective delivery channel.

As an alternative, or in addition, the flow deflection elements can comprise front deflector shields arranged out of the delivery channels and in front of the delivery mouths, or at least in front of a lower portion thereof, forming shielded delivery mouths, at a predetermined distance therefrom, so that the front deflector shields are hit by the correction air supplied through the respective shielded delivery mouths.

In particular, each shielded delivery mouth is a lower delivery mouth of a plurality of delivery mouths of a same correction air delivery member that are arranged at different heights along the direction of the axis of the delivery device, in particular it is the lower mouth of a couple of higher and lower delivery mouths.

As an alternative, or in addition, the flow deflection elements can comprise each a couple of side deflectors arranged out of a respective delivery channel of such delivery channels and at opposite sides with respect to the delivery mouth of the respective delivery channel, extending for a predetermined length towards the axis of the delivery device. This further assists to keep the partial correction air streams supplied by the delivery mouths of adjacent air delivery members separate from each other.

According to another aspect of the invention, the air delivery members generally comprise a respective plurality of delivery mouths, for example two, which are arranged at different heights, above the die, along the direction of the axis of the delivery device. This way, the correction air supplied by a same air delivery member hits a portion of the tubular film that is taller in the case of the prior art correction air distribution devices.

The lower delivery mouth of any couple of adjacent delivery mouths of this plurality is closer to the axis of the delivery device than any higher delivery mouth of the same couple of adjacent delivery mouths. In other words, the delivery mouths that are located at a lower height are in a position more prominent towards the axis of the delivery device than the delivery mouths that are located at a higher height. For instance, the air delivery members may comprise, at least proximate to the delivery mouths, delivery ducts of different length, with the ducts adjacent to the lower delivery mouths longer than those adjacent to the upper delivery mouths. This arrangement allows taking into account the diverging outline of the film formed at the outlet of the die of the apparatus.

Moreover, the correction air supplied by a lower delivery mouth tends to deviate upwards the correction air supplied by an upper adjacent delivery mouth, therefore even in this case the removal of the correction air of each stream is promoted from close to the film being formed, in particular from the respective angular correction position, which improves the overall and local cooling efficiency to cool down the film being formed, and causes the above-described further advantages.

In a advantageous exemplary embodiment, an insertion flow-split member is arranged in the end portion of the delivery channels oriented towards the axis to divide a respective delivery channel into an upper delivery channel and a lower delivery channel. In particular, the insertion flow-split member may have a substantially triangular shape, seen from a side with respect to the delivery channel, and is arranged with one vertex pointing towards the inside of the delivery channel. Preferably, the sides of this substantially triangular shape are arranged to deviate the correction air upwards. Advantageously, the insertion flow-split member is configured to form two delivery mouths at a different distance from the axis of the delivery device, as described above.

In particular, the delivery mouths that are arranged at different heights along the direction of the axis of the delivery device are spaced apart by a predetermined pitch from each other, such that the ratio of the height of the delivery mouth to this pitch is set between 0.6 and 0.85, in particular the ratio is set between 0.65 and 0.75, even more in particular, this ratio is about 0.7.

The "height" is hereby measured along the axis of the delivery device, i.e. vertically. According to another point of view, the void space left between the delivery ducts arranged above each other has a height set between 2 mm and 6 mm, in particular between 3 mm and 5 mm.

In an exemplary embodiment, the delivery mouths generally have an elongated shape with a larger size at least double than a shorter size orthogonal to the larger size. This way, the turbulence of the correction air delivered by the delivery mouths Is low, and correction air partial streams are obtained that are more effective for adjusting the thickness.

Preferably, the delivery channels generally comprise respective internally curved portions immediately upstream of the delivery mouth having a cross section shape gradually changing to the above-described laterally enlarged shape, in order to further limit the turbulence of the correction air when the latter is delivered by the delivery mouths.

The radial ducts arranged above each other may have a substantially rectangular cross section. For instance, the rectangular cross section ducts can have a width set between 12 and 28 mm, in particular between 16 and 24 mm, and a height shorter than the width and set between 6 and 14 mm, in particular between 8 and 12 mm.

The "width" is hereby measured transversally with respect to the axis of the delivery device, i.e. substantially horizontally. According to another point of view, the void space left between the delivery ducts arranged above each other has a height set between 2 mm and 6 mm, in particular between 3 mm and 5 mm.

In particular, the ducts can be obtained from a rectangular section bar. This allows an easy and cheap construction of the delivery device according to the invention.

According to another aspect of the invention, the larger size of each delivery mouth is arranged substantially orthogonal to the axis of the delivery device whereby, in use, the larger size is arranged horizontally. Furthermore, the delivery mouths have a height increasing from a minimum height, at an own central region, to a maximum height at an own peripheral region. In other words, the delivery mouths have a height increasing from a central zone to a peripheral zone of such delivery mouths, and the height of the delivery mouth, at their sides or close to their sides, is higher than the height at their central portion. This makes it possible to deliver the correction air partial stream more uniformly on the outer surface of the extruded tubular element, at the respective angular correction position, than in the case, for instance, of a rectangular delivery mouth, by which the flow is more effective only in front of the central portion of the delivery mouth. This way, thickness uniformity is further improved.

In an exemplary embodiment, the larger size of the delivery mouth is arranged at an angle set between 0° and 45°, in particular set between 15° and 30°, with respect to the axis of the delivery device, whereby, in use, the larger size of all the delivery mouths is arranged at the same angle with respect to the vertical.

Advantageously, two ducts of two adjacent air delivery members are arranged with their delivery mouths at a distance shorter than 8 mm, preferably shorter than 6 mm. This arrangement provides a more uniform correction region about the tubular film being formed, while allowing the partial correction streams to flow from it, after hitting at the respective angular correction positions.

In particular, the ducts have a root portion of substantially circular cross section connected to the flow control element, and a connection portion between this root portion and the delivery mouth. This way, the ducts can be easily and cheaply provided starting from a common semi-finished tubular product, by simple plastic deformation operations, so as to form a delivery mouth having a predetermined shape, along with the connection portion.

In particular, the delivery mouths have a shape comprising two parallel sides and two opposite rounded end portions joining the two parallel sides. In particular, in this exemplary embodiment, the radial distance between a delivery mouth and the extrusion mouth is set between 3 and 8 mm, more in particular, between 4 and 7 mm and even more in particular, between 4.5 and 6 mm.

In particular, the height of the delivery mouth, or the lowest delivery mouth, from the extrusion mouth can be set between and mm, more in particular, between 3 and 7 mm and even more in particular, between 4 and 6 mm.

Advantageously, the flow control elements generally comprise turning-diaphragm choke members. The turning-diaphragm choke members may comprise, for example, a plurality of sheets having the shape of circle sectors, and a plurality of corresponding flow sections, defined by these sheets, which are opened/closed by rotating the choke member about a rotation axis perpendicular to the sheets. The turning-diaphragm choke member, in particular one having the above described structure, provides a relationship between the flowrate and the rotation of the shaft that by which a finer adjustment is possible than in the case of conventional three-dimensional choke members, such as ball choke members, that are present in the regulation valves commonly used in the prior art devices.

The delivery device according to the invention takes particular advantage of the fineness of a turning-diaphragm choke member. In other words, the higher precision of this kind of choke members allows a better film thickness uniformity, which could not be appreciated if interferences occur between adjacent correction air partial streams, as it is the case in the prior art devices.

In an exemplary embodiment, the distribution chamber is an annular chamber peripherally arranged with respect to the plurality of air delivery members. Preferably, the distribution chamber has a plurality of passage windows at one input end portion of respective air delivery members, and the turning-diaphragm choke members are arranged within respective housings of the passage windows, in particular they are arranged transversally to the respective air delivery member. This allows containing the height of the delivery device according to the invention. In fact, the delivery device may have the shape of a disc whose height is low, since it is defined by the height of the annular distribution chamber. Such a delivery device can be located with the delivery mouths at a lower height above the die, than in the case of the prior art devices. The correction can therefore take place more promptly and, accordingly, the thickness adjustment is more efficient.

Advantageously, the delivery channels generally extend straight from a respective inlet port arranged at a substantially peripheral position of the delivery device, up to a position at a longer distance from the axis than the distance of the outlet section of the respective flow control element. This way, the correction air partial streams can flow within the maximum linear-length channel that can be allowed by the size of the delivery device, therefore with the maximum turbulence reduction effect that can be allowed with such size.

In a advantageous exemplary embodiment, the actuators of the flow control elements can be servomotors, i.e. they can comprise a closed-loop position control and correction device.

As an alternative, the flow control elements can comprise actuators for choke members comprising a synchronous DC motor, such as a stepper motor.

If a turning-diaphragm choke member is used, the delivery device according to the invention can take particular advantage of the precision of a stepper motor, and of even more of the precision of a servomotor. In other words, the higher precision of these choke members allows a better film thickness uniformity, which could not be appreciated if interferences occur between adjacent correction air partial streams, as it is the case in the prior art devices.

Advantageously, the servomotors are configured to be operated and controlled by a serial communication protocol, so as to reduce the cables required for operating the motors.

Preferably, the actuators are arranged on an external circumferential surface of the annular distribution chamber, and comprise respective transmission shafts which radially protrude through the distribution chamber up to the respective turning-diaphragm choke members. This way, the actuators or the motors do not increase the height of the delivery device beyond the height of the annular distribution chamber. Accordingly, the delivery device can be arranged with the delivery mouths at a lower height above the die, than in the prior art devices. The correction can therefore take place more promptly and, accordingly, the thickness adjustment is more efficient.

According to a further aspect of the invention, the above indicated objects are achieved by a blown polymer film extrusion method, comprising the steps of:
  extruding a molten polymer at a predetermined temperature in the form of a tubular element through an extrusion mouth of an extruder;
  conveying the tubular element upwards concentrically to a substantially vertical axis, and delivering cooling air out of the tubular element about its axis at a predetermined cooling height above the extrusion mouth, in order to solidify the molten polymer and to form the tubular polymer film;
  measuring a thickness of the tubular polymer film in a plurality of angular measurement positions at a predetermined measurement height above the extrusion mouth, and generating a plurality of respective adjustment signals responsive to thickness measurements of the angular measurement positions;
  prearranging a plurality of delivery mouths about the axis at a correction height above the extrusion mouth;
wherein the correction height is set between cooling height and the extrusion mouth,
wherein the step of prearranging a plurality of delivery mouths comprises a step of arranging separate radial ducts of a plurality of correction air delivery members, the separate radial ducts having at least one predetermined length, wherein separation spaces are maintained between the separate radial ducts, and the delivery mouths are arranged at a mutual predetermined distance from each other;
  delivering correction air partial streams on respective angular correction positions of the tubular element, for correcting locally the thickness of the tubular polymer film,
wherein the step of delivering partial streams comprises a step of conveying the correction air partial streams away from the tubular element at least in part through the separation spaces, after hitting the tubular element at the respective angular correction positions;
  adjusting the flowrate of one or more of the correction air partial streams, responsive to a respective adjustment signal, and subsequently locally modifying the temperature of the tubular element at the respective angular correction positions, in order to reduce respective one or more thickness deviations, at respective angular measurement positions, with respect to a predetermined thickness reference value.

As already said, the projection of correction air on a polymer just extruded by the extruder allows preventing sensitive thickness unevenness, unlike the devices that provide the correction air projection on a polymer that is in an early solidification condition. Moreover, the void spaces left between the separate radial ducts allow any single correction air stream to flow away from the film being formed immediately after contacting it, which prevents any film distortion effect if the air flowrate is very different from a correction sector to another, and also prevents any mutual interference between adjacent air delivery members, which would decrease the thickness adjustment fineness.

Advantageously, the distance between adjacent delivery mouths is set between 0.1 mm and 8 mm, preferably between 0.5 mm and 6 mm, more preferably between 1 mm and 5 mm.

In an exemplary embodiment, the method provides a calibration step comprising the steps of:
  marking the tubular polymer film by locally modifying a value of a physical property of the tubular polymer film being formed starting from a predetermined angular mark position at a mark height proximate to the correction height, so that a trace is formed along the tubular polymer film while the latter is conveyed upwards, wherein the physical property keeps a modified value;
  detecting the trace proximate to the measurement height and detecting an angular detection position of the trace at the measurement height;
  identifying a displacement angle between the angular detection position and the angular mark position about the axis;
wherein each adjustment signal, according to which the step of adjusting the flowrate of correction air is performed at a respective angular correction position, is associated with a measurement made at a corresponding angular measurement position at an angle distance equal to the displacement angle from the respective angular correction position.

In particular, the step of adjusting the partial stream flowrate comprises a step of increasing or decreasing the flowrate according to whether the thickness deviation is negative or positive, respectively, in a respective angular measurement position angularly spaced by the displacement angle with respect to that angular correction position.

In particular, the calibration step provides a step of associating respective angular correction positions to the angular measurement positions, each of said correction angular position obtained by adding the displacement angle to each angular measurement position having opposite signs according to whether the trace extends on the film anticlockwise or clockwise.

In other words, the calibration is carried out before starting the step of adjusting the flowrate, i.e. the displacement angle is determined between the angular position where an abnormal thickness is measured, at the measurement height, and the angular position, at the correction height, where a correction must be taken to correcting the thickness abnormal condition, i.e. to bring that thickness back into the admissible value range.

The calibration is carried out by modifying a physical property of the polymer, for example one of the properties indicated hereinafter, starting from a predetermined angular mark position at a mark height preferably close to the correction height. Due to the drawing action exerted on the tubular film, and to the torsion effect caused by the rotation of the takeoff device of the blown-film extrusion apparatus, the property modification, caused by locally changing the temperature in the predetermined position, propagates along the tubular film as a trace or a line similar to a helix that extends anticlockwise or clockwise according to whether the takeoff device rotates in one direction or in the opposite direction. This trace is then detected by a detection device arranged at a height close to the height where the thickness of the tubular film is measured, generally above the solidification line of the tubular film. The angle formed about the axis of the tubular film between the detection position where the trace is detected and the mark position where the property modification is generated is retained as a displacement angle. This angle is used for associating each angular thickness measurement position with an angular thickness correction position, and vice-versa, where the temperature must be locally changed for correcting a possible thickness excess or defect, while the takeoff device rotates about its own rotation axis, in one of the two possible directions. The displacement angle is received by a specific program means, and used therein to select the angular position, where to take the corrective action when an abnormal thickness value is measured, at a given angular measurement position.

Obviously, when the takeoff device rotates in the opposite direction, a second displacement angle is determined, by the same procedure.

Advantageously, the step of detecting the trace comprises a scan measurement of the physical property about the tubular polymer film, and the calibration step also comprises a preliminary step of calculating a first trial duration of the step of marking the tubular film, in such a way that the trace, which is being made since a predetermined instant and during the first trial duration, is met during the scan measurement. This way, the length of the trace can be reduced to a minimum value. This allows performing frequent calibrations, in particular if a change occurs of a significant operating parameter of the extrusion apparatus, marking and therefore making unusable a minimum length of the film. Accordingly, an improved film thickness uniformity can be obtained while wasting a minimum product amount.

Preferably, if the trace is not met during the scan measurement, the calibration step also comprises a further step of computing a further trial duration of a step of marking, the further trial duration longer than the first trial duration, and after the further step of calculating the steps above indicated are repeated.

Advantageously, the calibration is carried out automatically if a calibration step actuation condition occurs selected from the group consisting of:
  a calibration step actuation command signal input by a user;
  a command signal of changing an operating parameter in said blown film extrusion process;
  a signal of a changed operating parameter in said blown film extrusion process.

In particular, the operating parameter of the process, according to a change or to a command signal of changing of which a calibration is required, is selected from the group consisting of:
  the upwards-conveying speed of the tubular polymer film/tubular element of the molten polymer;
  the rotation speed of a takeoff device of the tubular polymer film, which causes a torsion of the tubular polymer film about its own axis;
  the flowrate of molten polymer coming out from the extrusion mouth;
  the temperature of a cooling air for conveying and hardening the tubular element of the molten polymer.

Advantageously, the step of marking the polymer film is carried out by locally cooling/heating the molten polymer or the film formed at the angular mark position so as to make a trace that has a thickness different from the thickness of the tubular film, and the step of detecting the trace comprises a thickness measurement to the measurement height. This way, the measurements required for the calibration are of the same type as the thickness measurement of the process, and do not require further instruments for reading the properties of the film.

In particular, this cooling/local heating is obtained by projecting an air flow having a predetermined temperature against the tubular element, i.e. against the film being formed. In other words, the physical property modified by the marking step is the thickness of the tubular film, whose local modification can be obtained, in a simple way, by projecting an air jet at predetermined temperature and pressure on the film.

As an alternative, the property is an optical property, for example the gloss and the haze.

As an alternative, the features is an electrostatic property, in particular due to a concentration of electric charges along the trace.

In an exemplary embodiment of the invention, a blown-film extrusion apparatus, of the type described in the opening, comprises:
  a marking element arranged at a predetermined angular mark position close to a correction height where a plurality of delivery mouths is provided about the axis of the polymer film formed, each delivery mouth arranged to deliver a correction air partial stream on a respective angular correction positions of the tubular element, such marking element configured for modifying the value of a physical property of the tubular polymer film being formed, in order to form a trace on the tubular polymer film where the physical property maintains a modified value;
  a sensor of such physical property arranged close to a thickness measurement height of the tubular film being formed, said sensor configured for detecting the trace proximate to the measurement height;
wherein the control unit also comprises a calibration unit configured for:
  learning the angular mark position and an angular detection position where the trace is detected;

calculating a displacement angle between the angular detection position and the angular mark position;

associating to each angular correction position a corresponding angular measurement position according to the displacement angle having opposite signs according to whether the trace extends anticlockwise or clockwise on the film.

Advantageously, the sensor of the physical property is movably arranged about the tubular film, and the calibration unit is configured for calculating a first trial duration of the step of marking, in such a way that the trace, which is being made since a predetermined instant and during the first trial duration, is met during the scan measurement.

Advantageously, the control unit for the calibration is configured for:

receiving a calibration actuation command signal from a user and/or a signal of a changed operating parameter;

generating a calibration signal when upon receiving the calibration actuation command signal and/or the signal of a changed operating parameter, wherein the signal of a changed operating parameter is received when an operating parameter of the blown-film extrusion apparatus changes, said parameter selected, in particular, from the group consisting of:

the upwards-conveying speed of the tubular film;
the rotation speed of the takeoff device;
the extrusion flowrate;
the temperature of the cooling air supplied by the solidification ring, commanding to the calibration unit to update the displacement angle and receiving the displacement angle;

transferring the displacement angle to the control unit.

If no significant thickness deviations occurs at the associated angular measurement position, each pert and/or passageway having an adjustable flow section can be maintained at a normal open position, which allows a reference air flowrate.

BRIEF DESCRIPTION OF THE DRAWINGS

The invention will be now shown with the following description of its exemplary embodiments, exemplifying but not limitative, with reference to the attached drawings, in which components similar and/or having the same function are generally indicated, in the various exemplary embodiments, with a same reference number, and in which:

FIGS. 4,5 diagrammatically show a top plan view and an elevation side view of a delivery device according to an aspect of the invention;

FIG. 6 shows a detail of the view of FIG. 4;

FIGS. 7,8 diagrammatically show the front surface of the delivery device of FIGS. 4,5 facing the tubular film being formed, according to two different exemplary embodiments;

FIGS. 9,10 diagrammatically show a top plan view and an elevation side view of a delivery device according to another aspect of the present invention;

FIG. 11 shows a detail of the top plan view of FIG. 9;

FIG. 12 is a partial elevation front view of the air delivery members side of a delivery device according to an exemplary embodiment of the invention;

FIGS. 13 and 14 are partial longitudinal sectional views of an air delivery member of a delivery device according to the invention, for example of the air delivery member of FIG. 12;

FIGS. 15, 17, 19, 21, 23 are partial front views of the air delivery members side of devices according to respective exemplary embodiments of the invention;

FIGS. 16, 18, 20, 22, 24 are partial longitudinal sectional views of air delivery members of devices according to the invention, for example of the air delivery members of the devices of FIGS. 15, 17, 19, 21, 23, respectively;

FIG. 27 is a longitudinal sectional view of the air delivery member of FIG. 26;

FIG. 28 is a longitudinal sectional view of an air delivery member comprising three delivery ducts;

FIG. 29 is a cross sectional view of a duct of the air delivery member of FIG. 26, or of a rectangular delivery mouth;

FIGS. 30,31,32 are front views of ducts of air delivery members according to three exemplary embodiments of the delivery mouth;

FIG. 33 is an elevation front view of an air delivery member comprising three delivery ducts arranged above each other;

FIG. 34 is an elevation front view of an air delivery member comprising two delivery ducts arranged above each other, in an exemplary embodiment;

FIG. 35 is a partial longitudinal sectional view of a duct of the air delivery member of FIG. 26;

FIGS. 36,37 are cross sectional views of a duct of an air delivery member;

FIG. 40 is a perspective sectional view of the delivery device of FIG. 38;

FIG. 41 is a perspective view of a delivery device in an exemplary embodiment of the invention, in which the regulations elements comprise a rotatable diaphragm actuator;

FIG. 42 is a longitudinal sectional view of an air delivery member for a delivery device of the type shown in FIG. 41, according to a different exemplary embodiment;

FIG. 43 is a perspective sectional view of the delivery device of FIG. 41;

FIG. 44 is an enlarged view of a detail of FIG. 43;

FIG. 45 is a longitudinal sectional view of an air delivery member of the delivery device of FIG. 41,44,46;

FIG. 46 is a perspective view of the ducts of an air delivery member of the delivery device of FIGS. 41,44,46;

FIGS. 47 and 48 are cross and longitudinal sectional views, respectively, of a flow control element of the delivery device of FIG. 41;

FIG. 49 is a perspective view of a delivery device according to a further exemplary embodiment of the invention;

FIG. 50 is an enlarged view of a detail of the delivery device of FIG. 49;

FIG. 51 is a perspective view of the delivery device of FIGS. 49 and 50, in a partially mounted condition;

FIG. 52 is a perspective view of an air delivery member of the delivery device of FIGS. 49-51 with delivery mouths as shown in FIG. 24;

FIG. 56 is a partial cross sectional view of an exemplary embodiment of the delivery device of FIG. 49, showing the air path between the correction air distribution chamber and the delivery mouth of an air delivery member;

FIG. 57 is an exploded view of a delivery device according to a further exemplary embodiment of the invention, in a partially mounted condition;

FIG. 63 is a partial exploded sectional view of the delivery device of FIG. 57, without the terminal ducts;

FIG. 64 is a perspective view of a delivery device according to a further exemplary embodiment of the invention;

FIG. 67 is an exploded view of an air delivery member of the delivery device of FIGS. 64,65,66;

FIG. 68 is a longitudinal sectional view of the air delivery member of FIG. 67;

FIGS. 69 and 70 are front views of two air delivery members for the delivery device as in FIGS. 64,65,66, according to two exemplary embodiments;

FIGS. 71 and 72 diagrammatically show a tubular film, in particular there is shown the displacement of a material element from the die to a reference height in the solidified film;

FIGS. 74, 75 and 76 graphically show the step of calculating the duration of the step of marking in the calibration step;

FIG. 77 is a further block diagram that illustrates the actuation criteria of the method according to the invention;

FIG. 80 shows a table generated during the calibration step, which contains, for each angular measurement position, a couple of displacement angles which allows determining the corresponding angular correction position.

DESCRIPTION OF EXEMPLARY EMBODIMENTS

Figure 78:
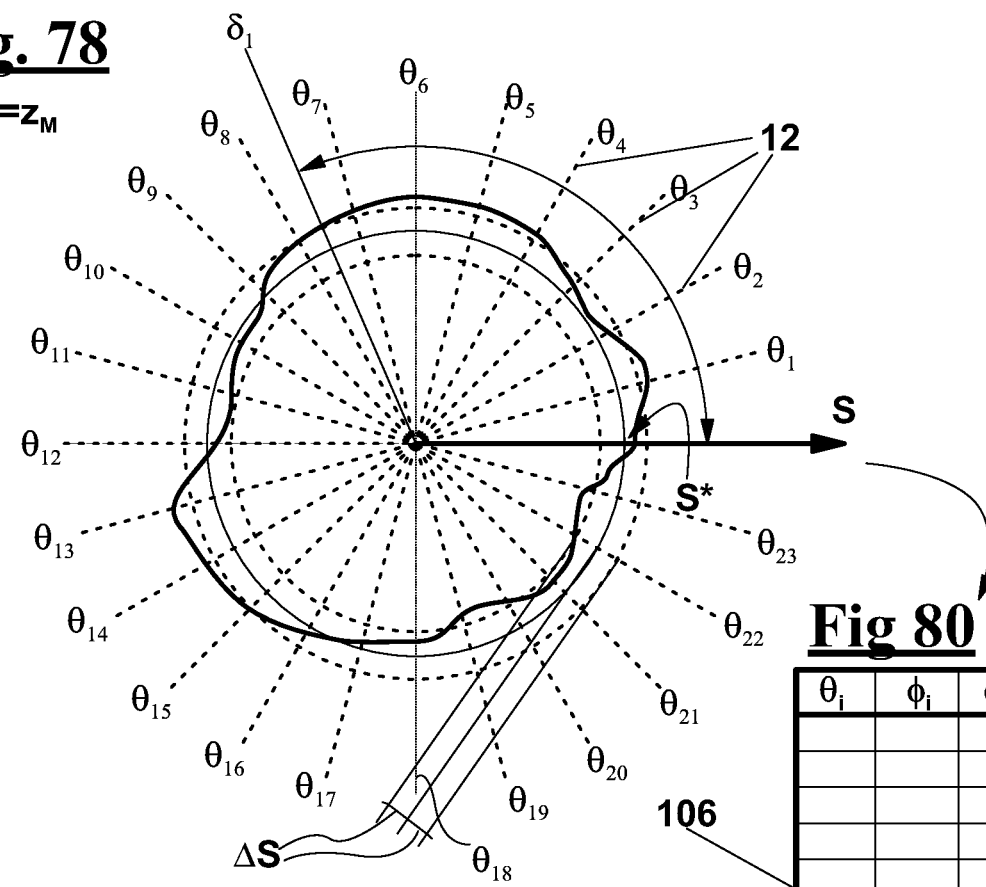
FIG. 78 shows a thickness profile of the polymer film at the measurement height.

FIGS. 4-8 and 9-11 show top plan views and diagrammatical diametrical sectional views of annular devices 20,30 according to two respective exemplary embodiments of the invention, for delivering correction air out of tubular element 1 extruded by die 4 of an extrusion plant 100 (FIG. 1), in order to locally correct the thickness of tubular polymer film 1' and in order to obtain a tubular film 1' having a substantially uniform thickness S, i.e. a thickness within a predetermined range ±ΔS about a nominal value S (FIG. 78).

Devices 20,30 have a plurality of correction air delivery members 31,41. Each air delivery member 31,41 comprises a delivery channel 37 defined between an inlet port 32 and a delivery mouth 33 oriented towards the inside of annular delivery device 20,30 and, accordingly, in use, oriented towards tubular element 1. More in detail, each delivery mouth 33 is arranged to deliver a correction air partial stream 19' at a respective angular correction position 17 on tubular element 1 (FIG. 6).

Devices 20,30 also comprise flow control elements 68, typically valves, each having a upstream portion in pneumatic connection with a correction air source through a duct 19 (FIG. 1) and a downstream portion in pneumatic connection with delivery mouth 33 of delivery channel 37 of a respective air delivery member 31,41.

Figure 1:
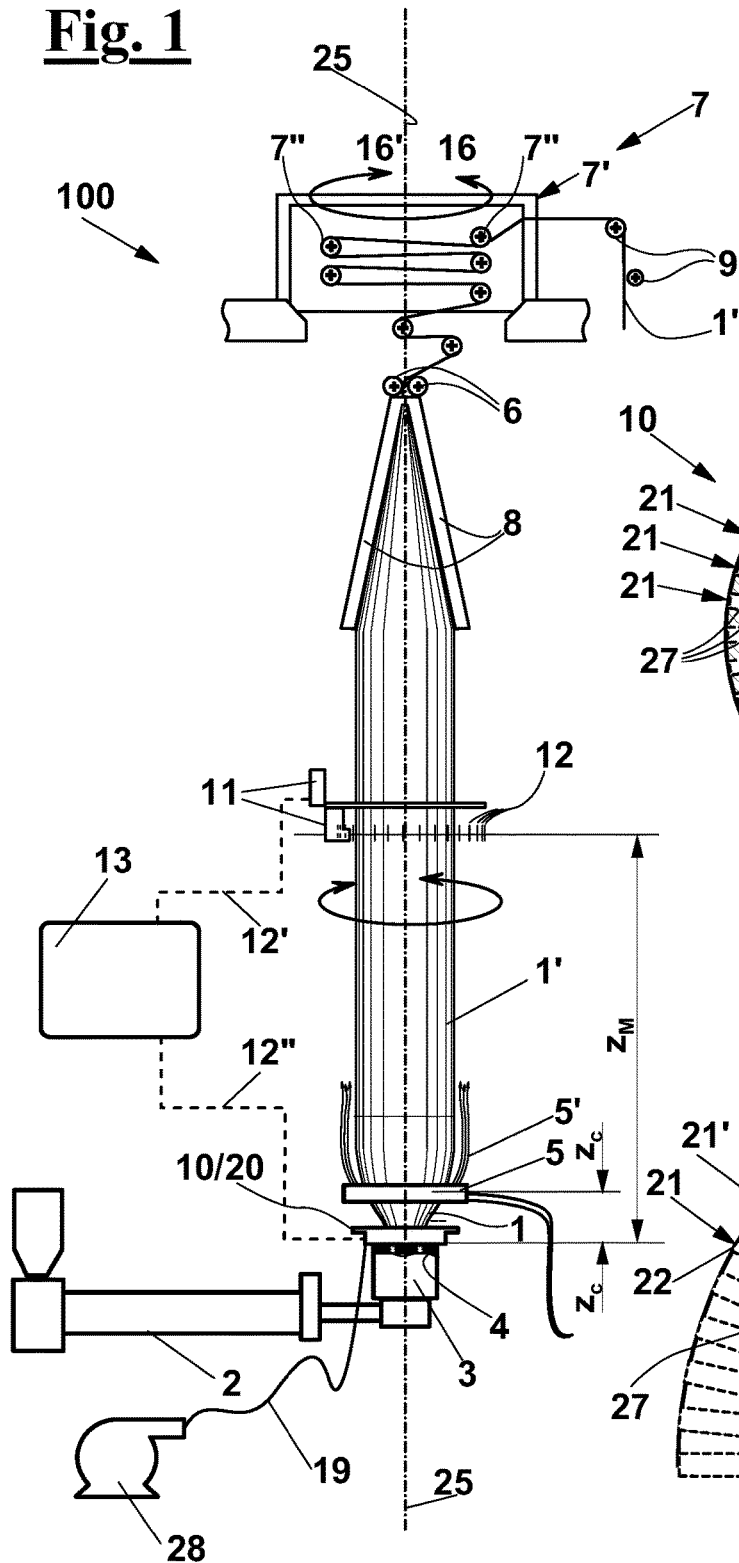
FIG. 1 diagrammatically shows a blown-film extrusion apparatus for manufacturing a tubular film, and a film during its production.
Figure 2:
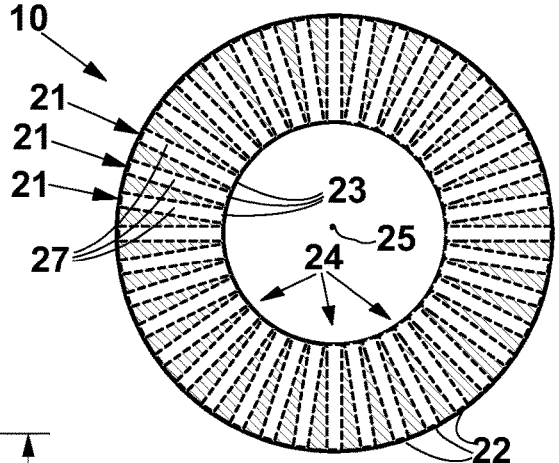
FIG. 2 is a diagrammatical top plan view of a conventional correction air delivery device.

Flow control elements 68 have an actuator, not shown, configured for receiving a respective adjustment signal 12" (FIG. 1) and for displacing the choke member of each flow control element 68 responsive to adjustment signal 12", in order to increase or to decrease the opening of a respective passageway and in order to increase or decrease, respectively, the flowrate of the correction air supplied by air delivery member 31,41 on angular correction position 17, locally obtaining a more or less intensive cooling, according to whether the thickness of tubular film 1' must be increased or decreased in an angular measurement position 12 (FIG. 1).

According to an aspect of the invention, delivery device 20 of FIGS. 4-5 can be made by tightly connecting two annular discs 30',30" previously positioned on one another, in which recesses are made corresponding to upper and lower portions of delivery ducts 37. In this case, delivery device 20 exposes to tubular polymer film 1 being formed a continuous front surface 34 where delivery mouths 33 of respective air delivery members 31 are opened.

Figure 3:
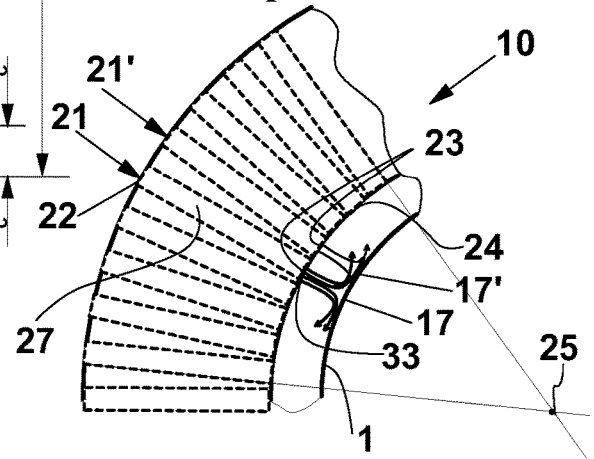
FIG. 3 shows a detail of the view of FIG. 2.

As shown in FIGS. 6-8, air delivery members 31 are arranged with delivery mouths 33 at a predetermined mutual distance B, larger than a predetermined minimum distance. By mutual distance between delivery mouths 33 it is meant the distance between the closest side portions of two adjacent delivery mouths 33, determined for example as shown in FIGS. 7 and 8, where delivery mouths 33 are viewed orthogonally to a line joining the respective centres. As shown in FIG. 6, such a mutual distance B allows correction air 19' to flow away, thus remarkably limiting or suppressing any adjustment interference between adjacent air delivery members (FIG. 3).

Advantageously, mutual distance B between adjacent delivery mouths 33 is set between 0.1 mm and 8 mm, preferably between 0.5 mm and 6 mm, more preferably between 1 mm and 5 mm.

According to another aspect of the invention, delivery device 30 of FIGS. 9-11 comprises a plurality of separate radial ducts 45 adjacent to delivery mouths 33 of at least a predetermined length W and separated from each other by separation spaces 44, in such a way that separate radial ducts 45 define respective portions at least at the end of delivery channels 37 of air delivery members 41. Through separation spaces 44, partial streams 19' of the correction air supplied by delivery mouths 33 can flow away from tubular element 1 extruded, after hitting it in the respective angular correction positions 17, limiting substantially or avoiding the phenomenon of interference of adjusting between adjacent air delivery members (FIG. 3).

Separate radial ducts 45 can be cantilevered to a ring block 46 where flow control elements 68 are enclosed. Delivery channels 37 can also comprise portions of channel 37' (FIG. 11) in ring block 46 pneumatically connected with radial ducts 45. Inner portions of channel 37' can be obtained by radially drilling ring block 46 or, as in the case of delivery device 20, by milling and then positioning two annular disc 30',30" upon each other to form ring block 46.

Separate radial ducts 45 can be made along with ring block 46 by machining, for instance, a plate or a sheet. As an alternative, they can consist of tubular elements that are arranged into corresponding housings made on the inner surface of ring block 46, for example they can be joined to ring block 46 by a screwed connection means, by welding or by any other well-known suitable connection technique.

According to another aspect of the invention, to which FIG. 5 relates, and as also shown in FIGS. 12-14, in an exemplary embodiment of delivery device 30, each air delivery member 41 of delivery device 30 comprises a plurality of delivery mouths, in this case two delivery mouths 33',33", which are arranged at different heights along the direction of axis 25 (FIG. 1). Delivery mouth 33", which is located at a lower height, can be arranged at a more advanced position, i.e. closer to axis 25, than corresponding delivery mouth 33', which is located at an upper height. This can be obtained, in the case of delivery device 20 of FIGS. 4-5, for instance, by making front surface 34 at a predetermined angle γ with respect to the vertical, preferably set between 10° and 20°, in particular close to 15°, i.e. it can be formed with a substantially conical shape of front surface 34. In the case of delivery device 30 of FIGS. 9-10, the same feature can be obtained as shown in FIGS. 12-18, i.e. by providing a single duct 45 in each air delivery member 41, with a front surface 34' at a predetermined angle γ where lower and upper delivery mouths 33',33" are opened. Other exemplary embodiments of the same type are shown in FIGS. 19-24. As an alternative, separate radial ducts 45',45", and preferably 45''', can be arranged above each other, as shown in FIGS. 27, 28, 42, 44, 45, and described hereinafter.

In the exemplary embodiment of FIG. 13, a flow-split element 38 is provided at the free end of delivery channel 37, in order to define two lower and upper delivery mouths 33',33", and wherein a lower deflection element 39 can be provided for orienting the portion of the correction air partial stream that is delivered by delivery mouth 33".

In the exemplary embodiment of FIG. 14, regardless of the inclination of front surface 34,34', at least one inner flow deflection element 38,39 can be arranged within delivery channel 37 i.e. within duct 45, in this case two upper and lower deflection elements 38,39, which are arranged to define two upper and lower branches 37',37" of delivery channel 37, comprising higher and lower delivery mouths 33',33", respectively, in order to split correction air partial stream 19' conveyed by delivery channel 37 into two parts, which are delivered by delivery channel 37 through higher and lower delivery mouths 33',33", respectively.

In particular, two inner deflection elements 38,39 may have a triangular longitudinal section, for example each with one base aligned along front surface 34'. Lower inner deflection element 39 can also have a side adjacent to lower inner wall of channel 37. In this case, two delivery mouths 33",33' are defined between two inner deflection elements 38,39 and between upper inner deflection element 38 and the upper wall of channel 37, respectively.

Even if the arrangement of the front portion of duct 37 has been described with reference to delivery device 30 of FIGS. 9 and 12, comprising ducts 45 separated by void spaces 44, the longitudinal sectional views of FIGS. 13 and 14 can also refer to delivery device 20, in which the delivery mouths are arranged on a continuous cylindrical inner front surface 34 of a ring element. Therefore, inner deflection element(s) 38,39 can also relate to such a delivery device, in which separated ducts 45 are not present. The same applies for longitudinal sections of FIGS. 16,18,20,22,24 and for the components depicted there, in particular side and front flow deflection elements 36,35.

In particular, in the exemplary embodiment of FIGS. 15 and 16, in duct 37 of each air delivery member 41, a single inner flow deflection element 38 is provided at a central position of the end of channel 37, and two delivery mouths 33',33" are defined between inner deflection element 38 and the upper and lower wall of channel 37, respectively.

In the exemplary embodiments of FIGS. 17-20, air delivery members 41 comprise a couple of side deflectors 36 that extend vertically at opposite sides with respect to delivery mouths 33',33" outside of delivery duct 37, extending towards the inside of annular delivery device 30 for a predetermined length N. In particular, as FIGS. 17 and 18 show, side deflectors 36 may have free end whose edge 36' is at angle γ with respect to the vertical, i.e. the same angle as inclination angle of front surface 34', or, like in FIGS. 19 and 20, side deflectors 36 have free end whose edge 36' is vertical.

In the exemplary embodiments of FIGS. 21-24, air delivery members 31 comprise a front deflection shield 35 arranged in front of a lower portion of a delivery mouth (FIGS. 21,22) or in front of the whole delivery mouth (FIGS. 23,24), according to the flow directions partial of correction air, in this case in front of lower delivery mouth 33" of two delivery mouths 33',33" arranged at different heights along the direction of axis 25 of delivery device 30. Deflection shield 35 extends at a predetermined distance M from at least partially shielded delivery mouth 33", in this case, substantially vertically.

In an exemplary embodiment of the invention, not shown in the drawings, air delivery members 31,41 comprise a front above described deflection shield 35, according to the exemplary embodiments and do not have side deflectors 36.

Even if in FIGS. 17-24 side deflectors elements 36 and preferably front deflector element 35 are always shown in combination with a flow-split element 38 arranged within a delivery channel 37, they can be present also in combination with different delivery ducts. As described, according to an exemplary embodiment, not shown, front and/or side flow deflection element 35,36 can be provided in combination with delivery device 20, without separated ducts 45, in which the delivery mouths are arranged on a continuous cylindrical inner front surface 34 of a ring element.

Figure 25:
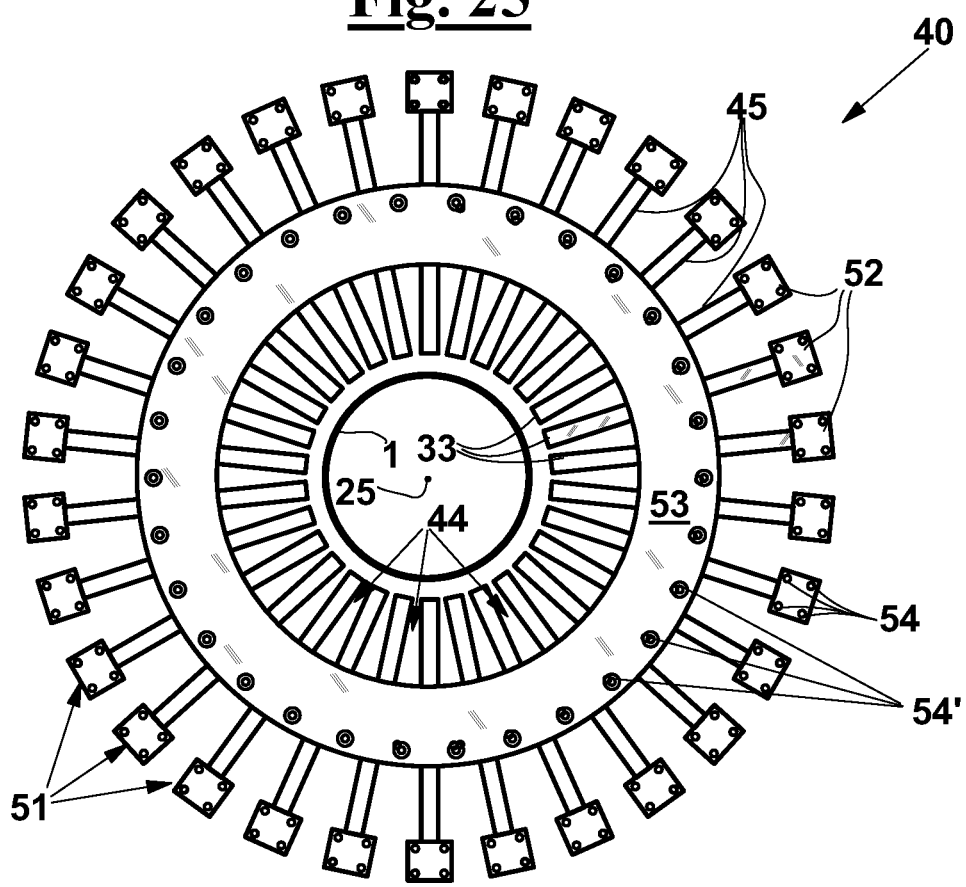
FIG. 25 is a diagrammatical top plan view of a delivery device according to an exemplary embodiment of the invention, in which the radial ducts extend starting from respective peripheral joints.

With reference to FIG. 25, an air delivery member device 40 is described according to an exemplary embodiment of the invention, which differs from delivery device 30 in that it comprises air delivery members 51, in which ducts 45 radially extend starting substantially from the periphery of delivery device 40, in particular starting from respective peripheral joints 52 arranged along a peripheral circumference of delivery device 40. Even in this case, ducts 45 are separated from each other by separation spaces 44, through which the correction air partial streams supplied through delivery mouths 33 or 33',33" (FIG. 26) can flow away from tubular element 1 extruded after hitting it, which causes the previously described advantages.

In particular, as shown in FIGS. 26-28 and 39, an air delivery member 51 of delivery device 40 can comprise a plurality of ducts 45',45",45''' having respective delivery mouths 33',33",33''' arranged at different heights along the direction of axis 25 of delivery device 40. For instance, air delivery member 51 can comprise two ducts 45',45" (FIGS. 26,27 and 39) or three ducts 45',45",45''' (FIG. 28), in this case arranged upon each other. Delivery mouths 33',33" of upper ducts 45',45" are preferably located at more withdrawn radial positions than delivery mouths 33",33''' of lower ducts 45",45''' (FIGS. 27 and 28), according to pitches Q', Q", not necessarily equal to each other (FIG. 28). For example, pitches Q', Q", can be set between 2 and 5 mm, more in particular, between 2.5 and 4 mm, even more in particular, pitches Q', Q" can be about 3 mm.

Channels 37 can comprise portions having rectangular cross sections, in particular such portions obtained from a rectangular section bar. Ducts 45',45",45''' of air delivery member 51 can be advantageously made from a conventional section bar, for example a substantially rectangular section bar with sides L,H (FIG. 29). For instance, such a rectangular section bar may have a size L×H equal to 20×10 mm;

FIGS. 29-34 are front views of air delivery members 31,41,51 of devices 20,30,40, in which the delivery mouths have a larger size L arranged horizontally and a smaller size H arranged vertically. For example, larger size L has a length at least twice smaller size H. For example, as shown in FIGS. 26-29, rectangular ducts 45,45',45",45''' are arranged with the longer side L horizontal and with the shorter side H vertical. Even in the case of ducts with a rectangular cross section, longer side L is preferably at least twice smaller size H.

Even if the tubular section bar shown have transverse sections of the same shape and of the same size, they can nevertheless be different in size and/or shape.

Figure 26:
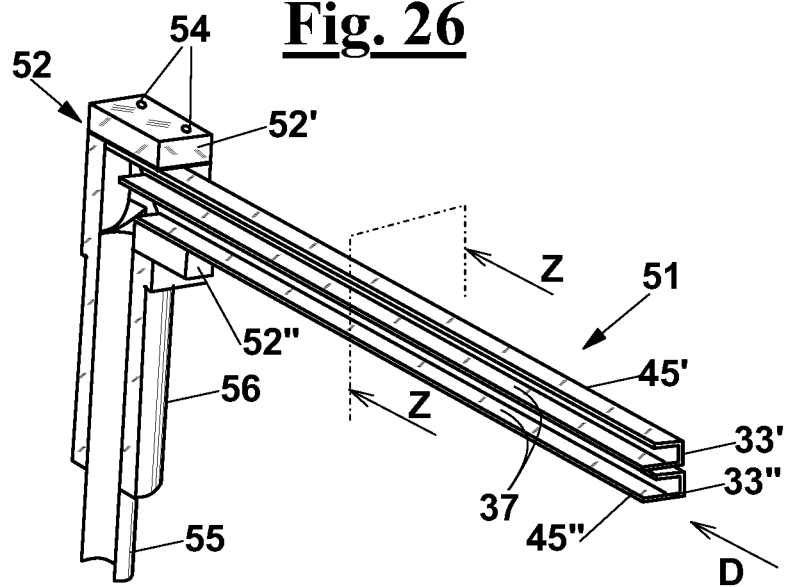
FIG. 26 is a perspective sectional view of an air delivery member comprising two ducts arranged above each other.

Sill with reference to air delivery members 51 of FIGS. 26-28, joint 52 of air delivery member 51 can comprise clamping elements 52',52" that cooperate to maintain ducts 45' and preferably 45",45''' at their radial position, and to maintain ducts 45',45", and preferably 45''', connected to one another, in the case of a plurality of ducts arranged above one another. In order to fix clamping elements 52' and 52" a conventional fixing means can be provided, such as screw-threaded holes and screws 54 (FIGS. 25 and 26).

For instance, delivery mouths 33,33',33",33''' of air delivery members 31,41,51, in an exemplary embodiment of devices 20,30,40 of FIGS. 4, 9 and 25 can have one of the shapes of FIGS. 30-34, where height H of the delivery mouth, in a peripheral zone 48, in particular close to the vertical sides 47, has a value H" higher than the value H' that central zone 49 of delivery mouth 33 has, i.e. height H increases proceeding from central zone 49 towards vertical sides 47, ranging from a first minimum height H' to a second maximum height H". In particular, the increase of height can be generalized to the whole delivery mouth 33 and can gradually become steeper in the longitudinal direction, following for instance a curved profile 42 (FIG. 30), or it can be concentrated at connection zone 43 between central zone 49 of lower height H' and peripheral zone 48 of higher height H" (FIGS. 31,33), or even the connection zone between central zone 49 of lower height H' and peripheral zone 48 of higher height H" can be missing (FIG. 32).

In the exemplary embodiment of FIG. 34, height H increases proceeding from central zone 49 towards vertical sides 47, changing from a first value H' to a second maximum value H" at a section at a predetermined distance L" from vertical sides 47, and then decreases again to a value H''', for example close to H'. The side of the delivery mouth including the portion 43' of the cross section defined between connection zones 43 can also be arranged above the opposite longer side 43".

As shown in FIG. 35, air delivery members 51 can comprise a longitudinal connection portion 64' between the body of duct 45, which can have for example a rectangular cross section (FIG. 36), and delivery mouth 33, which has a shape different from a rectangle, for instance one of the above described shapes, as shown in FIG. 32 (FIG. 37) or in other FIGS. 30-34.

The elevation front view of FIG. 33 shows three delivery mouths 33',33",33''' all having, for example, the shape of FIG. 31. Delivery mouths 33',33",33''' are located at distances P',P", not necessarily equal to each other, or equal at a common pitch P. The ratio between height H of delivery mouths 33',33",33''' and pitch or distance P,P',P" is preferably set between 10 mm and 18 mm, more in particular, between 12 mm and 16 mm, even more in particular, between 13 mm and 15 mm.

Figure 39:
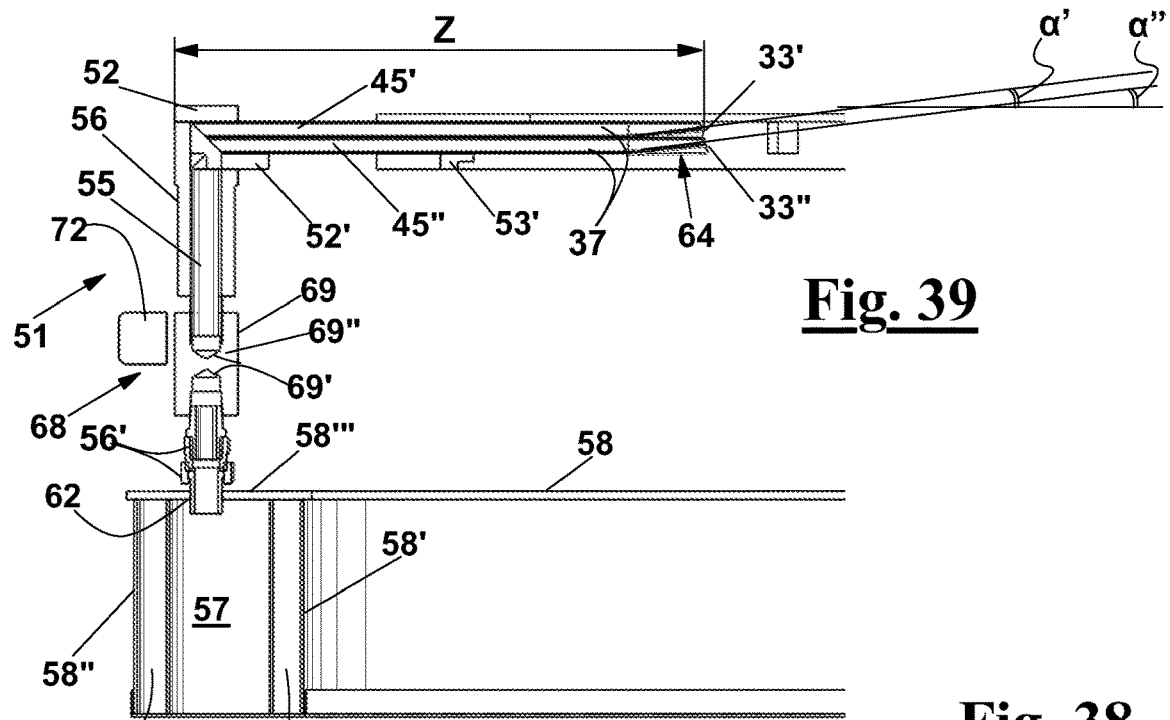
FIG. 39 is a longitudinal sectional view of an air delivery member of the delivery device of FIG. 38.

Sill with reference to FIGS. 27 and 39, air delivery member 51 comprises a flow deflection element 64 at each delivery mouth 33',33" for orienting correction air upwards. The flow deflection element comprises a lower inner wall 64 of delivery channel 37, i.e., in this case, of duct 45',45", at predetermined angles α',α", not necessarily equal to each other, towards an upper inner wall of delivery channel 37.

Figure 38:
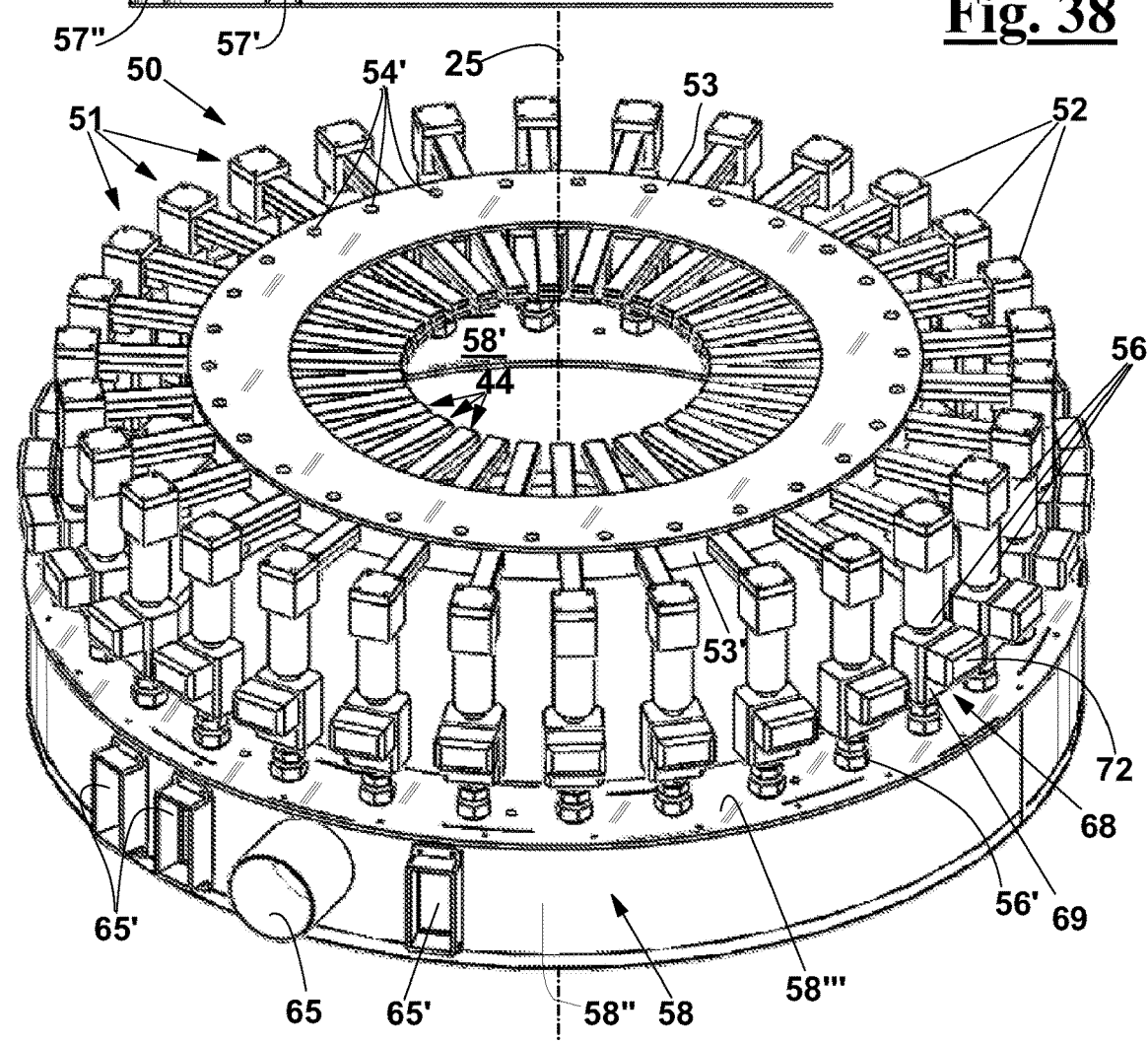
FIG. 38 is a perspective view of a delivery device according to an exemplary embodiment of the invention, comprising a plurality of air delivery members of the type shown in FIGS. 26 and 27, an annular distribution chamber and conventional regulation valves.

With reference to FIG. 28, delivery mouths 33',33" and, in this case, 33''' of ducts 37',37" and, in this case, also 37''' of the delivery device according to the invention, for example of devices 40, 50 and 60 of FIGS. 25, 38 and 41, are arranged at predetermined distances $D_R$, $D_H$ from die 4, measured in the radial and in the vertical direction, respectively, once delivery device 40,50,60 has been mounted to an extrusion apparatus like apparatus 100 of FIG. 1. Preferably, radial distance $D_R$ between delivery mouth 33 of lower duct 45 and die 4 is set between 3 and 8 mm, more in particular, it can be set between 4 and 7 mm, even more in particular, between 4.5 and 6 mm. Preferably, height $D_H$ of delivery mouth 33 above die 4 is set between 3 and 7 mm, in particular, it can be set between 5 and 6 mm, more in particular, between 4.5 and 5.5 mm.

With reference to FIGS. 38-40, an air delivery device 50 is described member as a specific alternative embodiment with respect to delivery device 40 (FIG. 25), comprising a plurality of air delivery members 51 of the type shown in FIG. 26, 27 or 39. For instance, delivery device 50 comprises 30 air delivery members at a distance from each other defined by an angular pitch of 12°. Each air delivery member 51 is connected to the outlet section 63 of a flow control element 68, comprising a valve element 69 and a modulating actuator 72 for increasing or decreasing the opening degree of valve element 69. This connection can comprise a preferably cylindrical duct 55, enclosed within a sleeve 56, as FIGS. 27, 28 and 39 show in detail. Separation spaces 44 between adjacent ducts 45 allow the correction air partial streams, supplied through delivery mouths 33',33", flowing away from the extruded tubular element after hitting it, which causes the previously described advantages.

With reference to FIG. 39, valve element 69 encloses a choke member 69' and a housing or valve body 69" for choke member 69', which cooperate to define an adjustable flow section for a respective correction air partial stream. Valve elements 69 can be selected among conventional valves for adjusting the air flowrate precisely enough, for instance they can be needle valves, or disc valves or V-ball valves. Modulating actuators 72 are preferably electrically driven actuators, in particular they can be servomotors, i.e. they can comprise a closed-loop position control and correction device. As an alternative, stepper motors can be provided.

Delivery device 50 also comprises a ring distribution chamber or collector 57, in the case shown a cylindrical annulus (FIGS. 38 and 39). Annular distribution chamber 57 can consist of an annular duct 58 defined by an inner cylindrical wall 58', an outer cylindrical wall 58", an upper annular disc 58''' and a lower annular disc 58''''. Annular duct 58 can contain a insulation layer 57' located between annular distribution chamber 57 and inner cylindrical wall 58', and/or a passage chamber 57" can be provided for electrical cables and data cables to supply signals to actuators 72, which are located between annular distribution chamber 57 and outer cylindrical wall 58". A nozzle 65 for a correction air feeding duct 19 (FIG. 1) is preferably provided, in this case a cylindrical one, along with openings 65', in this case three rectangular openings, for the cables, non shown, of actuators 72.

Upper annular disc 58''' of annular duct 58 has a plurality of correction air distribution outlet ports 62 (FIGS. 39 and 40), which are preferably arranged along a circumference and can be a plurality of circular holes with their centres arranged along the middle circumference of the flat upper surface 58''' of annular duct 58. Distribution outlet ports 62 are pneumatically connected with inlet sections of respective valve elements 69. In order to provide this connection, screw threaded joints 56' can be used comprising nuts and externally screw-threaded tube elements.

FIGS. 25 and 39 also show a layout where ducts 45',45" are fixed to one another by a junction fitting that can comprise an annular disc 53 and a plurality of spacers 53' connected to annular disc 53 by screws 54'.

In FIGS. 41-45 a delivery device 60 is shown according to an exemplary embodiment of the invention, comprising a plurality of air delivery members 71. Each air delivery members 71 comprises ducts 45',45" and preferably 45''' with delivery mouths 33',33" and preferably 33''' arranged at different heights along the direction of axis 25 of delivery device 60. Ducts 45',45",45''' are connected to an annular distribution chamber 78 by a connection element such as an annular disc 83, or two upper and lower annular discs 83, and a plurality of spacers 83' connected to annular disc 83 by screws 82. Separation spaces 44 between adjacent ducts 45 (FIG. 43) allow the correction air partial streams, supplied through delivery mouths 33',33", to flow away from tubular element 1 being extruded after hitting it, which causes the previously described advantages.

As FIGS. 44-46 show, ducts 45',45" of air delivery members 71 may have delivery mouths 33',33" like in FIG. 34 or, according to the represented exemplary embodiments, like in any of FIGS. 29-33. In an exemplary embodiment, ducts 45',45" have deflection elements 64 at each delivery mouth 33',33", comprising lower inner walls 64 of ducts 45',45" at predetermined angles α',α".

As shown in FIG. 42, annular distribution chamber 78, which in this case has the shape of a cylindrical annulus, is defined laterally by an inner cylindrical wall 82' and by an outer cylindrical wall 82", and is defined vertically by a upper flat closure element 85' and by a lower flat closure element 85".

Flow control elements 68 are arranged along inner cylindrical wall 82', as shown more in detail in FIGS. 42 and 45-48. In this exemplary embodiment, each flow control element 68 is associated with one distribution outlet port of distribution chamber 78, comprising a passage window 86 formed within cylindrical wall 82', between annular distribution chamber 78 and the inlet end portions of ducts 45',45" and preferably 45''' of each air delivery member 71. Passage windows 86 comprise flow sections 87 (FIG. 47) having the shape of circular sectors. Each flow control element 68 also comprises a turning-diaphragm choke member 84, rotatably arranged about an own rotation axis 93'. Choke member 84 is preferably configured for being slidingly received in a respective housing 88. Choke member 84 comprises thin plates 89 that also have the shape of circular sectors, configured for opening/closing flow sections 87 of passage windows 86 by rotating choke member 84 about its rotation axis 93'. In this exemplary embodiment, turning-diaphragm choke member 84 is shown in a partially open position, in which the thin plates protrude into flow sections 87 reducing the overall flow section with respect to all flow sections 87.

In order to rotate each turning-diaphragm choke member 84, each flow control element 68 comprises an actuator 92, cantilevered to outer cylindrical wall 82". Actuator 92 is mechanically connected to turning-diaphragm choke member 84 by a transmission shaft 93, which radially crosses distribution chamber 78, and is arranged along rotation axis 93'. The height of delivery device 60 of FIG. 41 is remarkably lower than the height of delivery device 50 of FIG. 38, since flow control elements 68 are configured so that distribution chamber 78 is arranged at a same height of air delivery members 71, so that no vertical connection elements are provided like connection elements 56,56' of delivery device 50 (FIGS. 38 and 39)

In FIGS. 49-51 a delivery device 70 is shown according to a further exemplary embodiment of the invention. In delivery device 70 are provided air delivery members 81 are provided, each comprising a terminal duct 45 with two delivery mouths 33',33" arranged at different heights along the direction of axis 25 of delivery device 70, as already described with reference to FIGS. 23,24. Separation spaces 44 between adjacent ducts 45 allow correction air partial streams, supplied through delivery mouths 33',33", flowing away from tubular element 1 being extruded after hitting it, which causes the previously described advantages. A plurality of feet 29 can also be provided for connecting delivery device 70 to extrusion head 3 of blown-film extrusion apparatus 100 (FIG. 1), which can also be provided in devices 60,80,90.

Delivery device 70 comprises flow control elements 68, which are in pneumatic connection between a respective duct 45 and a distribution outlet port 86 of a correction air distribution chamber 78. In this exemplary embodiment, distribution chamber 78 has a ring-like shape and is arranged below the plurality of flow control elements 68, with distribution outlet ports 86 aligned along a circumference.

Figure 53:
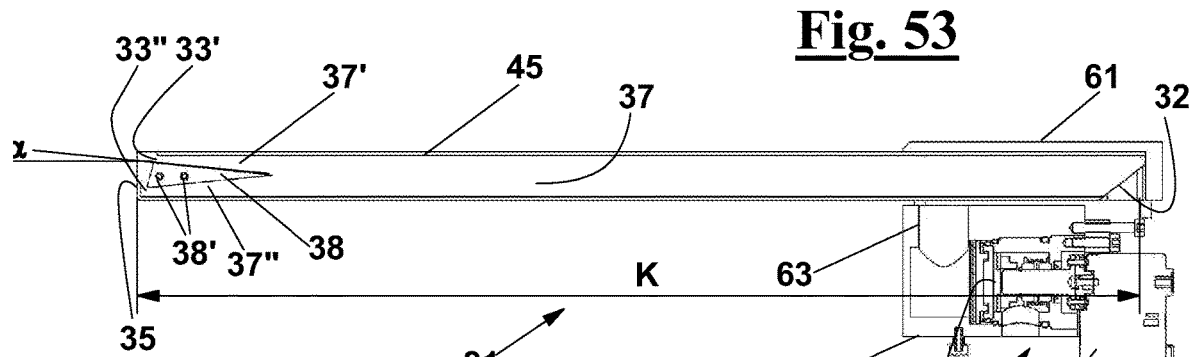
FIG. 53 is a longitudinal sectional view of the air delivery member of FIG. 50.
Figure 54:
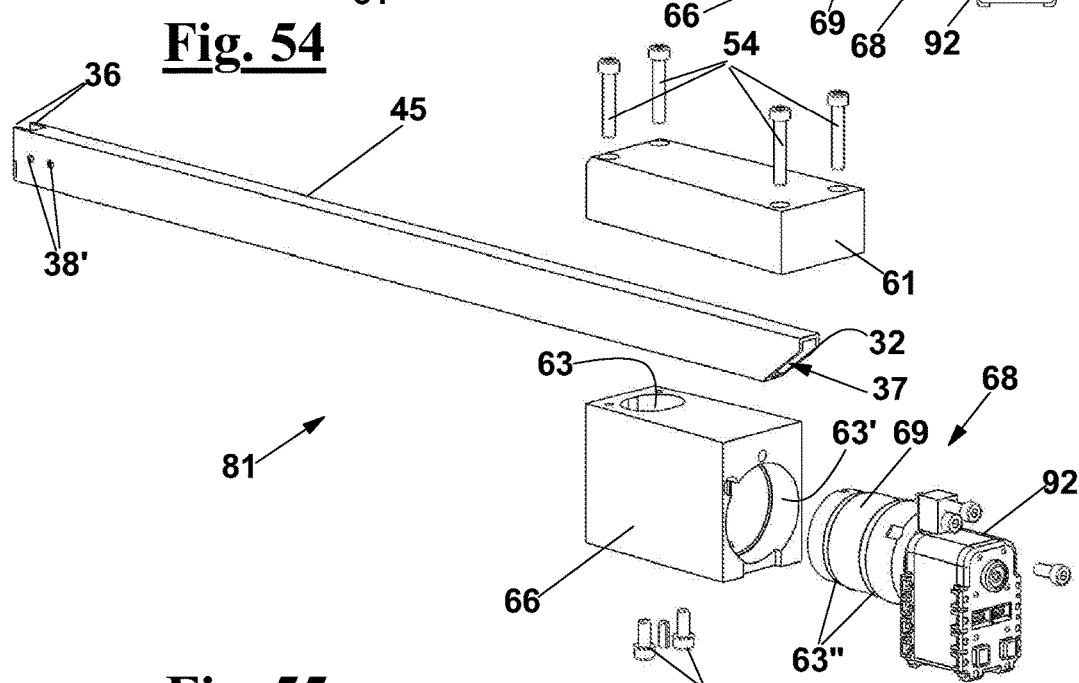
FIG. 54 is an exploded view of the air delivery member of FIGS. 52 and 53.

FIGS. 52-54 show more in detail air delivery member 81 and its own flow control element 68. In this exemplary embodiment, duct 45 of air delivery member 81 defines a delivery channel 37. At the end of delivery channel 37 oriented towards the axis of delivery device 70, in this case at the free end of duct 45, a deflection and flow-split member is arranged in the form of an insert 38. Flow deflection element 38 defines, along with the upper and lower inner walls of duct 45, two higher and lower delivery channels 37',37" as shown in FIG. 24, where delivery channel 37 is divided, which end with respective delivery mouths 33',33". Insert 38 preferably has a substantially triangular longitudinal cross section, and is arranged with a vertex oriented towards the inside of delivery channel 37. Flow deflection element 38 can be connected to duct 45 by conventional connection means 38' such as screws, in order to provide a sealing element between the side walls of duct 45 and the deflection and flow-split member 38. Duct 45 has side and front flow deflection elements 36 and 35 like in FIGS. 23,24, however it can have any of the forms shown in FIGS. 12-22.

Duct 45 has an overall length K (FIG. 53) longer than a predetermined value, defined between inlet port 32 and delivery mouths 33',33". Advantageously, as described more in detail hereinafter, inlet port 32 is arranged in a peripheral portion of delivery device 70, in particular farther from delivery mouths 33',33" than valve element 69 of flow control element 68. This arrangement maximizes length K of duct 45, which causes the previously described advantages.

Flow control element 68 comprises valve element 69 and modulating actuator 92. Air delivery member 81 also comprises a valve housing or seat 66 with a recess 63' configured for receiving valve element 69. Recess 63' and valve element 69 (FIG. 54) are configured to make an airtight connection on the outer surface of valve element 69, for example by at least one O-ring 63". Housing 66 also comprises a hole 63 for allowing correction air to flow out after travelling along valve element 69. A cover 61 is also provided that is configured for fixing valve housing 66 and duct 45 to each other, for example by screws 61'.

Figure 55:
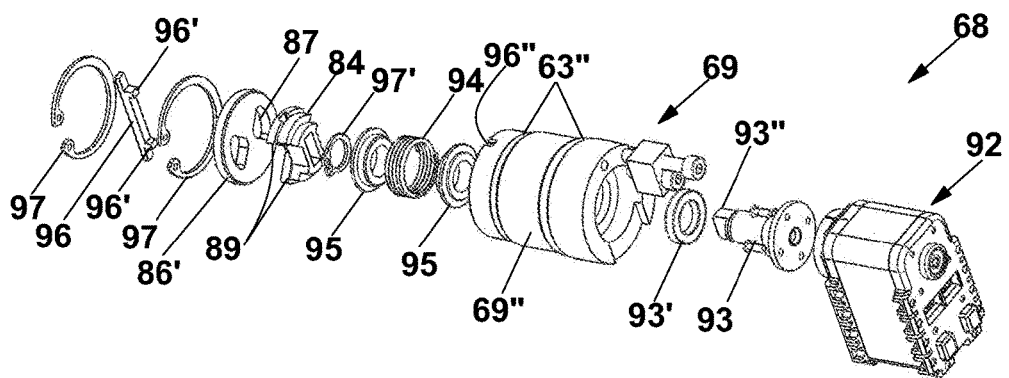
FIG. 55 is an exploded view of the flow control valve as shown in FIG. 54.
Figure 58:
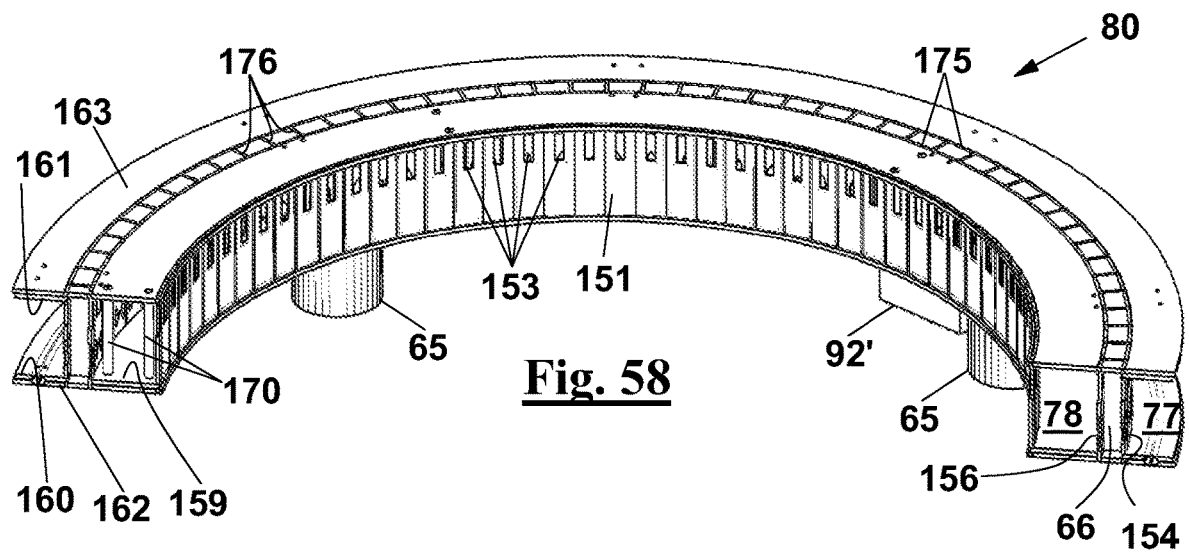
FIG. 58 is a perspective sectional view of the delivery device of FIG. 57, without the radial ducts.

In FIG. 55 a flow control element 68 is shown which has a valve element 69 suitable for delivery device 70 of FIGS. 49-51. Shaft 93 is coupled to actuator or motor 92, and comprises an end 93" configured for coupling with the movable portion 84 of the choke member. Movable portion 84 comprises two elements or thin plates 89 configured for closing/opening flow sections 87 of a fixed portion 86' of the choke member. Fixed and movable portions 86',84 of the choke member are tightly mounted to valve body 69" of valve element 69 by a contrast spring 94, comprising centring rings 95 and, on shaft 93 side, a sealing ring 93'. In order to assembly shaft 93 an outer Seeger ring 97' is provided, while two inner rings Seeger 97 are provided for mounting valve body 69". A anti-rotation locking element 96 for preventing the choke member-shaft-actuator assembly from turning with respect to valve body 69" and so with respect to delivery device 70, can comprise projections 96' arranged for engaging with respective end notches 96" of valve body 69".

In the exemplary embodiment of FIG. 56, delivery channels 37 linearly extend starting from an inlet port 32 arranged in a peripheral position of delivery device 70, at a distance from axis 25 of delivery device 70 (FIG. 51) longer than the distance of outlet section 63 of flow control element 68, so that correction air partial streams 19' can flow within a straight channel 37 that has the maximum possible length K within the limits of the diameter of delivery device 70.

More in detail, housing 66, cover 61 and duct 45 are arranged in such a way that the correction air partial stream conveyed by an air delivery member 81 follows the path indicated by the arrows 19' in FIG. 56, between distribution outlet port 86 of distribution chamber 78 and delivery mouths 33',33" of delivery duct 45, through valve element 69, hole 63, inlet port 32 and delivery channel 37, in order to use the maximum radial extension of delivery device 70 for conveying correction air 19' through delivery channel 37, i.e. for maximizing the length of delivery channel 37 within the limit of the radial size of delivery device 70.

In FIGS. 57-63 a delivery device 80 is shown, in which distribution chamber 78, valve element 68 and delivery channel 37 have substantially the same arrangement as in delivery device 70. According to another aspect of the invention, distribution chamber 78 is defined by an upper ring 161,163, by a lower ring 159,162 integrally and tightly connected to each other by a first substantially cylindrical wall 151 and by a second substantially cylindrical wall 154 located between the two discs, wherein first substantially cylindrical wall 151 is arranged concentrically to second substantially cylindrical wall 154.

Upper and lower rings 162,163 are joined to substantially cylindrical walls 151,154 by a fixed joint. To this purpose, on one face of each ring 162,163 grooves or recesses 175 are provided that are arranged for receiving the opposite edges of substantially cylindrical walls 151,154 in a fixed joint.

Advantageously, delivery device 80 also comprises a third substantially cylindrical wall 155 that is concentrically arranged about second substantially cylindrical wall 154, and is also tightly connected between lower ring 162 and upper ring 163 by the fixed joint connection method described above.

Device 80 comprises a plurality of air delivery members 81' at each of which, i.e. at each duct 45, second substantially cylindrical wall 154 has a passage windows 86 (FIG. 62) comprising flow sections 87 (FIG. 61-63) that have the shape of circular sectors. On its own outer face, which faces third substantially cylindrical wall 155, each window 86 advantageously has a housing 88 in the form of a recess configured for receiving a turning-diaphragm choke member 84 of a valve element 69 of a flow control element 68 (FIG. 59), rotatably arranged about a rotation axis 93'. Walls 157 (FIGS. 61 and 63), for example in the form of small plates, are tightly arranged between second and third substantially cylindrical walls 154,155, at each passage windows 86, and at opposite sides with respect to it. Walls 157 define, along with second and third substantially cylindrical walls 154, 155, a plurality of slots or chambers 66 tightly separated with respect to one another.

For instance, the walls can be fixedly jointed within respective housings or recesses 176 radially made on one surface of each lower and upper ring 162,163, and/or on one surface of second and of third substantially cylindrical wall 154,155, for example along folding lines 152.

In a preferred exemplary embodiment, ducts 45 of air delivery members 81' protrude from inner substantially cylindrical wall 151. In this case, always at each air delivery member 81', first and second substantially cylindrical wall 151,154 have of through holes 153,166 arranged for receiving a respective duct 45 of an air delivery member 81 so that this is arranged radially and parallel with respect to rings 162,163, and that one rear end portion of each terminal duct 45 protrudes into a respective chamber 66. Third wall 155 can have a fixed joint support seat 169 for rear end portion of each duct 45, in particular a through hole 169 configured for tightly engaging about this rear portion.

Figure 60:
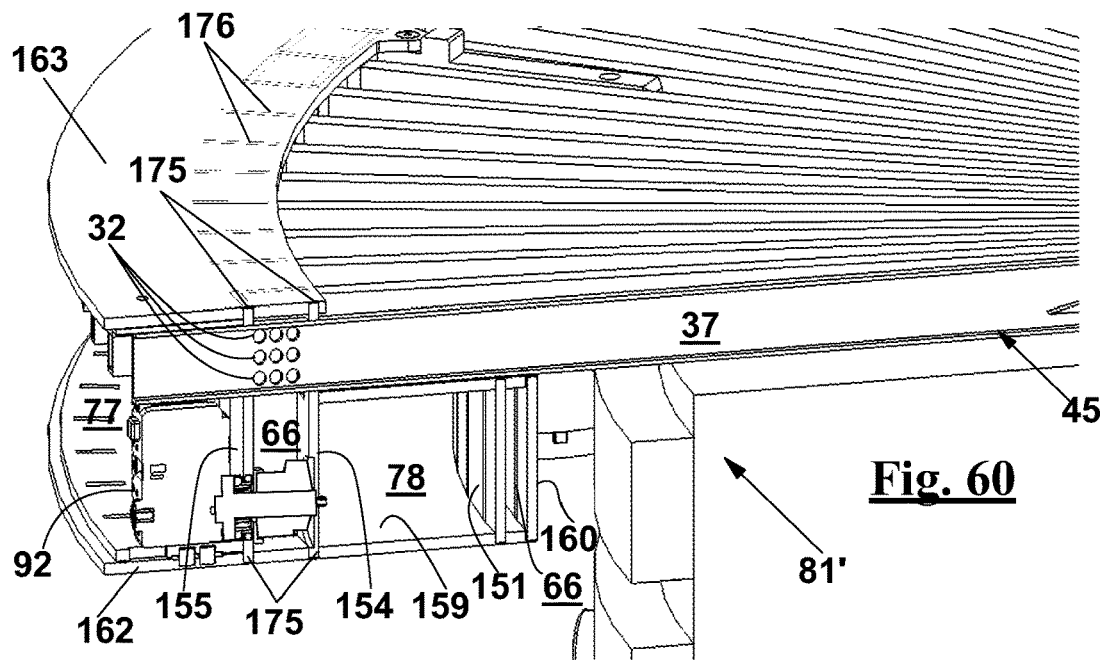
FIG. 60 is a partial perspective sectional view of the delivery device of FIG. 57, according to a modified construction.
Figure 61:
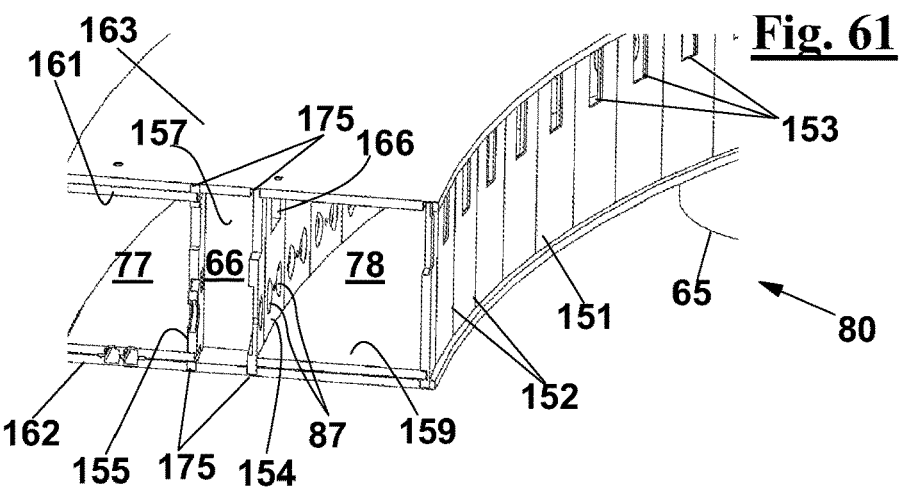
FIGS. 61 and 62 are partial perspective sectional views of the delivery device of FIG. 57, without the terminal ducts.
Figure 62:
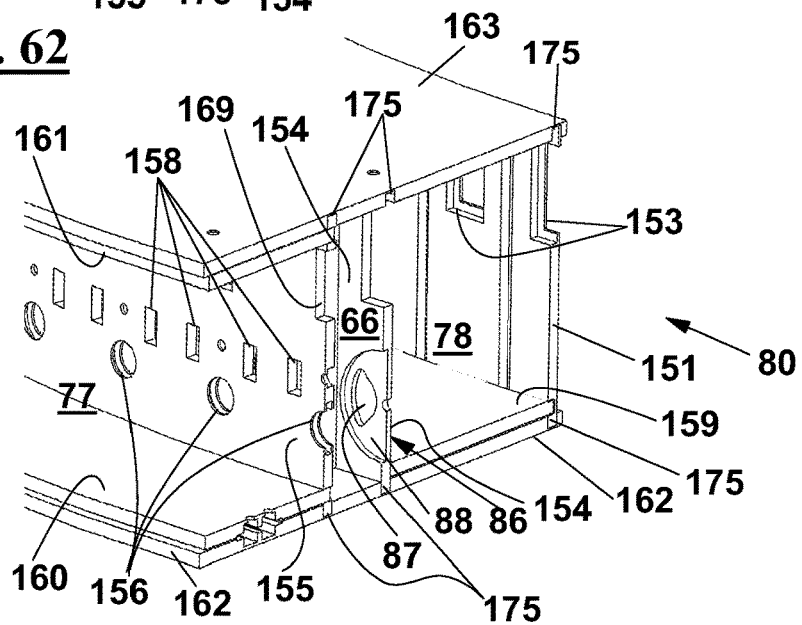

In the exemplary embodiment of FIG. 60, each terminal duct 45 extends beyond third wall 155 and protrude into a open recess 77 of actuators 92, above respective actuator 92. This way, each duct 45 can be extracted and replaced without disassembling or removing device 80 from the apparatus, and so without stopping the blown film production. This is useful for making scheduled or extraordinary inspections, and for repairing ad replacing the ducts with minimum impact on the production. In the same figure, a further inner cylindrical wall 160' is also provided that defines, along with first cylindrical wall 151 and lower and upper rings 162,163, a further annular chamber 66' configured for receiving an insulation material layer. In an exemplary embodiment, not shown, a chamber for an insulation material can be provided below lower ring 159.

Figure 59:
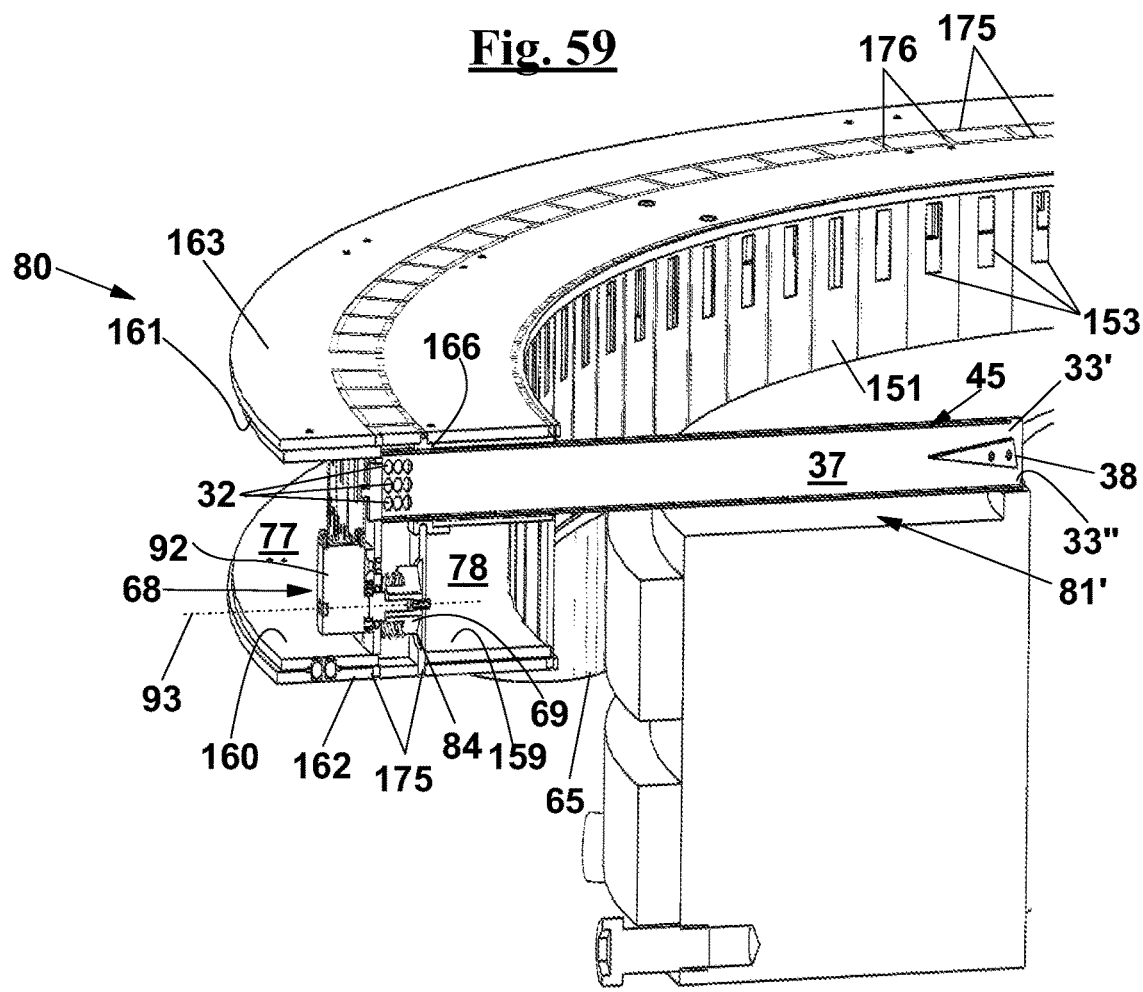
FIG. 59 is a partial perspective sectional view of the delivery device of FIG. 57.

Each duct 45 has, preferably at its own end rear portion, at least one inlet port, for example in the form of a plurality of flow sections 32, preferably made laterally, i.e. through side walls of duct 45 (FIGS. 59,60).

Still at each air delivery member 81', third substantially cylindrical wall 155 has through holes 156 for the passage of the shafts, not shown, of valve elements 69, which are arranged along axes 93', and has also a couple of fastening seats 158 in the form of recesses for an actuator 92 of flow control element 68 (see also FIG. 59). A plurality of flow control elements 68 is therefore arranged with respective actuators 92 on the outer face of third substantially cylindrical wall 155, with respective valve elements 69 in valve housing 66 and with turning-diaphragm choke member 84 tightly arranged within housing or recess 88 of window 86, so as to allow a respective correction air partial stream 19' to flow at an air flowrate responsive to a predetermined opening degree the of corresponding flow sections 87 between distribution chamber 78 and each valve housing 66, and between here and delivery channel 37 of respective duct 45, through inlet ports 32 (FIG. 60).

Lower and upper rings 162,163 and substantially cylindrical walls 151,154,155 are advantageously made from a semi-finished flat product comprising a layer composite material, i.e. a sandwich material, comprising two metal external layers, for example stainless steel or, preferably, aluminium, and an inner layer of a plastic material, preferably a thermoplastic material such as polyethylene, in particular high density polyethylene.

In this case, the recesses or grooves or fixed-joint seats 175,176 of rings 162,163 are preferably made, for example, by a milling process, removing a portion of an outer layer of metal along a predetermined line, such as a circumference of the same diameter as one or both substantially cylindrical walls 154,155, for mounting substantially cylindrical walls 154,155, respectively, or as a radial segment arranged between these circumferences, at each valve housing 66, for mounting walls 157, or as a generatrix or vertical line on the outer face and on the inner face of second and of third substantially cylindrical wall 154,155, respectively, for example at folding lines of substantially cylindrical walls 154,155, still for mounting walls 157. Preferably, on the bottom of recesses 175,176 a layer of plastic material of the composite is left.

lower and upper rings 162, 163, substantially cylindrical walls 151,154,155 and walls 157 are preferably mounted by mutually compressing and/or temporarily heating the joined parts, so as to plasticize or melt the plastic material, and by subsequently hardening the plastic material again, which causes the joined parts to be welded to one another.

Device 80 is advantageously equipped with a multiplicity of pluralities of separate radial ducts 45 that are interchangeable and have different lengths W,W', whose respective delivery mouths have a width L different from one another, in particular the shorter the length W, the larger the width, and vice-versa, in such a way that, by replacing said first ducts with said seconds ducts, which can occur when a tubular film of a different diameter must be treated after extruding it by a die of a different diameter, mutual distance B between the adjacent delivery mouths remains substantially unchanged. In particular, device 90 can be provided in a predetermined number of sizes, defined for instance by a diameter of the distribution chamber, each comprising a multiplicity of pluralities of radial ducts, each multiplicity to be used in combination with a different die diameter.

Figure 65:
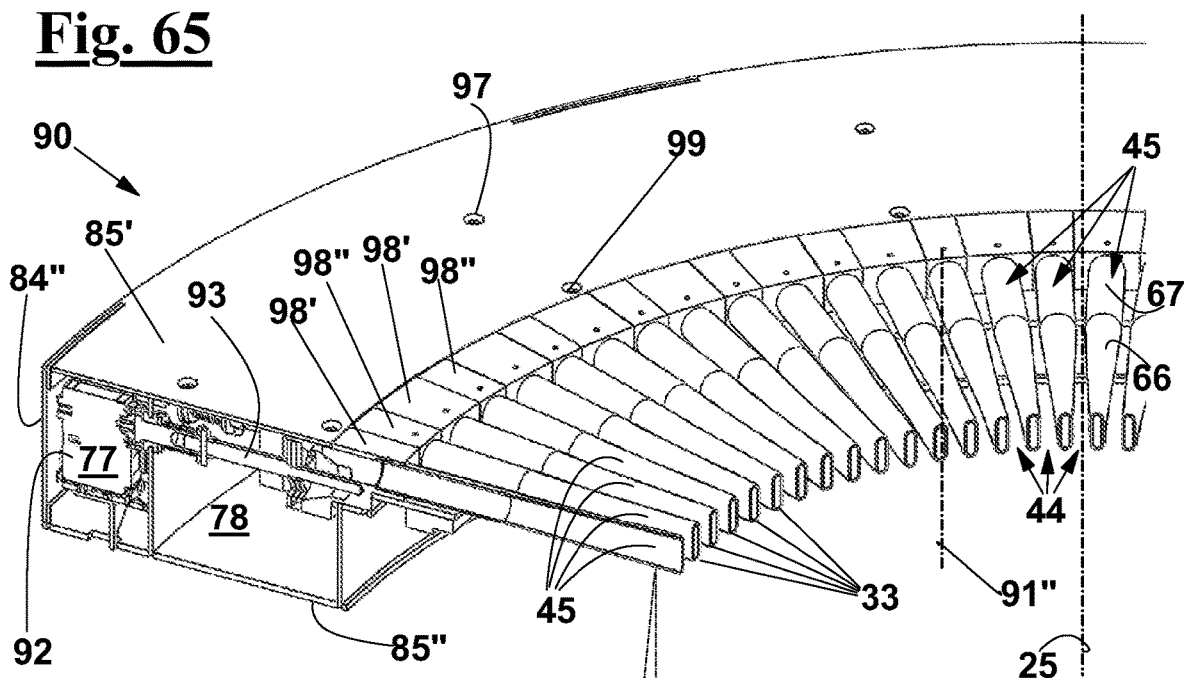
FIG. 65 is a partial perspective sectional view of the delivery device of FIG. 64.
Figure 66:
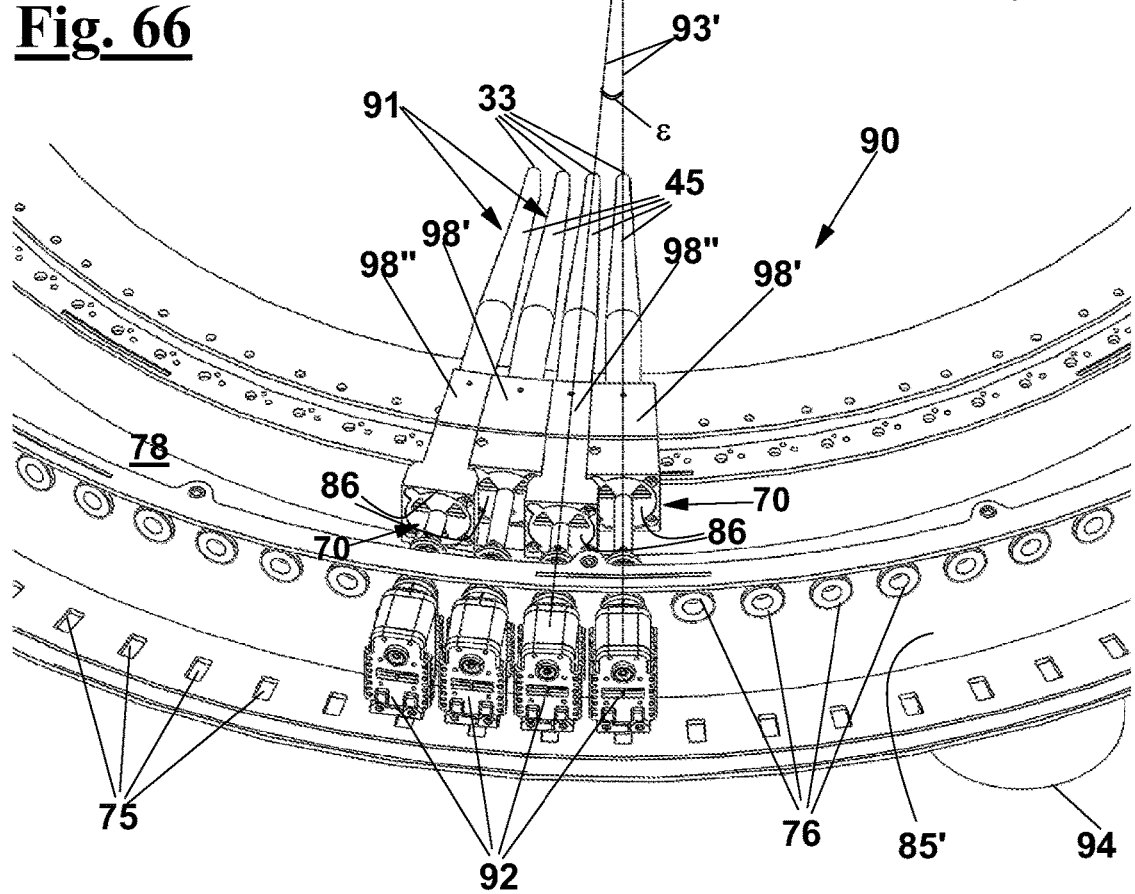
FIG. 66 is a perspective view of the delivery device of FIGS. 64,65, in a partially mounted condition.

In FIGS. 64-66 a delivery device 90 is shown according to a further exemplary embodiment of the invention. In delivery device 90 air delivery members 91 are provided each comprising a duct 45 that has a delivery mouth 33 with an elongated shape. In particular, as shown in FIGS. 69 and 70, each delivery mouth 33 comprises two parallel sides 59' and two end rounded portions 59" joining parallel sides 59'. In the exemplary embodiment of FIGS. 67 and 68, ducts 45 have a root portion 67 with a substantially circular cross section and a connection portion 67' between root portion 67 and delivery mouth 33. Separation spaces 44 between adjacent ducts 45 allow correction air partial streams, which are supplied through delivery mouths 33, to flow away from tubular element 1 being extruded after hitting it, which causes the previously described advantages.

As shown in FIG. 69, air delivery members 91 can be arranged with the longer axis 91" of delivery mouth 33 oriented vertically. This way, a correction height is obtained that is comparable with the height allowed by horizontally arranged delivery members, like the ones shown in FIG. 39, under a same correction air outflow condition. For each air delivery member 91, as shown also in FIG. 65, a montage element 98,98',98" is provided for the montage to correction air collection and distribution chamber 78, which can consist of an annular duct defined by an inner cylindrical wall 84', an outer cylindrical wall 84", an upper annular disc 85' and a lower annular disc 85".

As an alternative, as shown in FIG. 70, longer axis 91" of delivery mouth 33 can be at an angle $\beta$, with respect to the vertical, smaller than 45°, preferably set between 0 and 30°. This makes it possible to obtain, along the outer surface of tubular film 1 being formed, a more uniform correction region, while allowing air to flow away from tubular film 1 being formed after hitting it, as diagrammatically shown in FIG. 6.

As shown in detail in FIGS. 65 and 66, as an alternative, or in addition, two different types of connection elements 98',98" are provided alternately arranged between air delivery members 91 and distribution chamber 78. Connection elements 98' are shorter than connection elements 98". In particular, in the layout of FIG. 66, connection elements 98' have one transversal size only, while connection elements 98" have a front elongated portion more narrow than the transversal dimension of connection elements 98', and a rear portion larger than the front portion. The rear portion encloses passage windows 86 and turning-diaphragm choke member 84 as shown in FIG. 47. The larger and the more narrow size of connecting element 98", and the transversal dimension of connecting element 98' are selected so as to alternatively arrange connection elements 98' and connection elements 98" adjacent to one another, advantageously maintaining a predefined uniform angular pitch c between the longitudinal axes of air delivery members 91. This way, air delivery members 91 can be arranged with the delivery mouths closer to each other than in the case of air delivery members with equal connection elements 98, whose transversal dimension depends upon the size of passage windows 86. This allows a more uniform treatment of tubular film 1 being formed (FIG. 1). Obviously, transmission shafts 93 (FIG. 67,68) for moving diaphragm choke members 84 have different lengths according to whether turning-diaphragm choke member 84 is mounted to a connection element 98', in more advanced radial position, or to a connection element 98", in a more withdrawn radial position.

Advantageously, on an extension 85''' of lower annular disc 85" beyond outer cylindrical wall 84" of annular distribution chamber 78 a number of holes 75 is provided which is the same number as air delivery members 71, at a fixed angular pitch along an intermediate circumference of extension 85''', about axis 25 (FIG. 66). Each hole 75 is configured for fixedly receiving a foot 74' of a support 74 of a respective actuator 92 (FIGS. 67,68), in order to fix actuator 92 and to prevent it from turning about rotation axis 93' of turning-diaphragm choke member 84 (FIG. 66) while the latter is operated. FIG. 66 also shows holes 76 for the passage of shaft 93 of each turning-diaphragm choke member 84, made through outer cylindrical wall 84'' and spaced apart from one another of a same pitch at a predetermined height above lower annular disc 85''.

In a advantageous exemplary embodiment, each actuator 92 comprises a servomotor, preferably configured to be operated and controlled by a serial communication.

Hereinafter a blown-film extrusion method for manufacturing a tubular polymer film 1', with reference to extrusion apparatus 100 of FIG. 1, previously described. As shown in FIGS. 71 and 72, due to the drawing action of cylinders 6, and to the rotation of takeoff device 7' (FIG. 71), a polymer material element 101 of carries out a substantially helical displacement 102 along tubular polymer film 1', from die 4 up to takeoff device 7'. In particular, FIG. 71 relates to the case in which takeoff device 7' is performing a clockwise rotation 16, while FIG. 72 relates to the case in which takeoff device 7' is performing a counterclockwise rotation 16', viewed from the above. Therefore, a material element 101 that is in an angular position described by an angular coordinate ρ with respect to a positive direction of a reference axis x, at a height $z_C$ close to die 4, will be, at measurement height $z_M$, in a position described by an angular coordinate $\psi=\rho+\delta_1$ if the rotation is clockwise, and by a coordinate $\psi=\rho+\delta_2$ if the rotation is counterclockwise, where $\delta_1$ and $\delta_2$ are displacement angles computed with respective signs according to whether the rotation of takeoff device 7' is clockwise or counterclockwise, i.e. according to whether the helix of displacement 102 is left-handed or right-handed. Obviously, helical displacements 102 are also the displacements according to which a film modification propagates, for instance a local thickness modification, caused in a point of the tubular film being formed. In these conditions, if an abnormal thickness is detected at an angular coordinate ψ at height $z_M$, a corrective action must be taken, at correction height $z_C$, in angular position $\psi-\delta_1$ or $\psi-\delta_2$, according to whether rotation 16,16' of takeoff device 7', in that moment, is clockwise or counterclockwise.

Ducts 45 of air delivery member devices 70 (FIGS. 49-56), 80 (FIGS. 57-63) and 90 (FIGS. 64-69) preferably have a rectangular cross section Advantageously, the shorter side of the cross section has a length set between 15 and 25 mm, preferably this length is about 20 mm, while the longer side, compatibly, has a length set between 20 and 30 mm, preferably this length is about 25 mm. Preferably, the shorter side is arranged horizontally and the longer side is arranged vertically.

Figure 73:
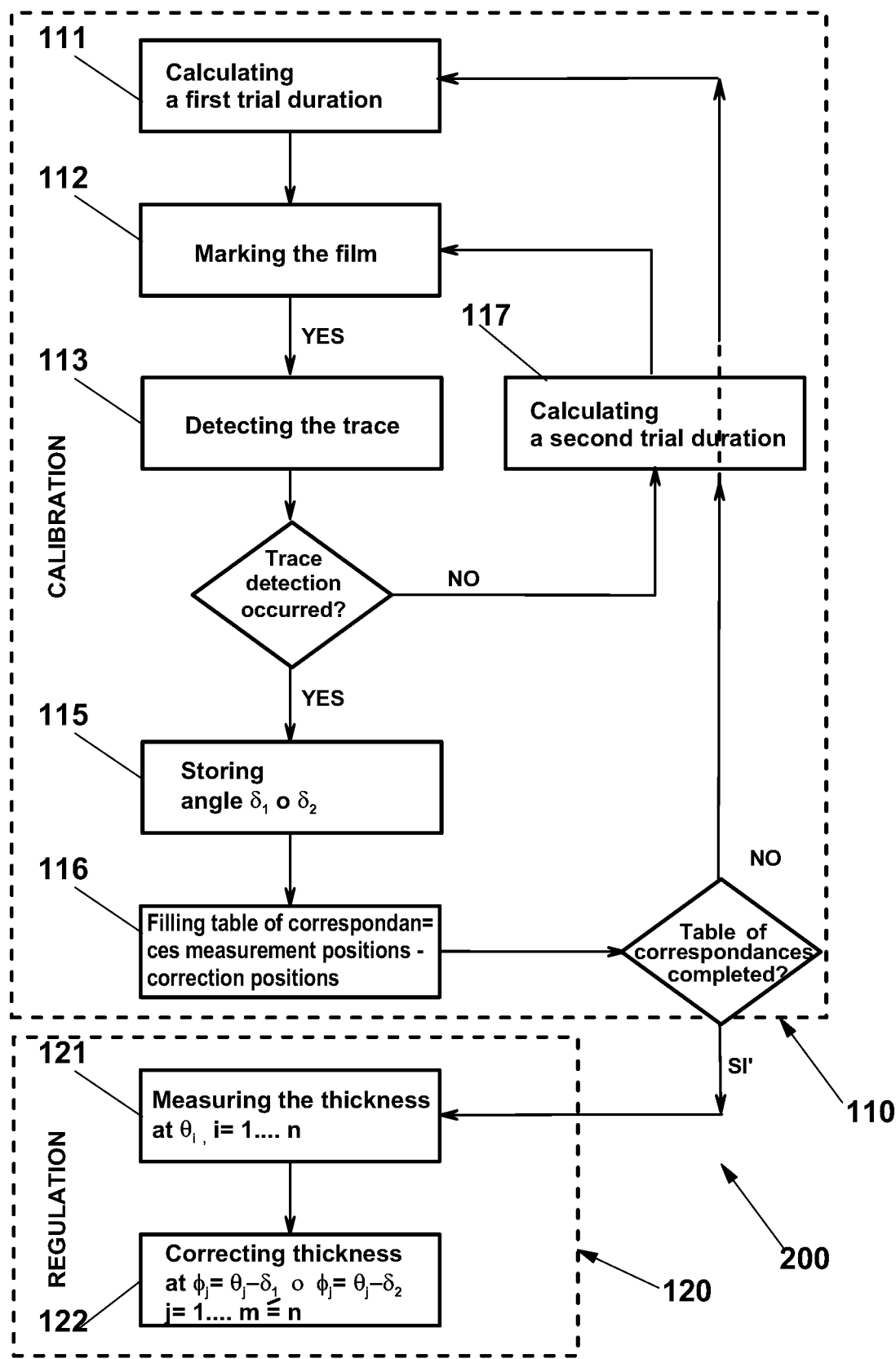
FIG. 73 is a block diagram of the method according to the invention.

A process 200, according to an aspect of the invention, to determine displacement angles $\delta_1,\delta_2$, is shown in the block diagram of FIG. 73. Such process comprises performing a calibration step 110 that consists in causing a modification of a physical property of the material that forms tubular polymer film 1', for example a thickness modification, starting from an angular reference position 26 at a height proximate to correction height $z_C$ (FIGS. 71 and 72). This modification creates a trace 102 that is detected at height $z_M$ by the sensor, in a position displaced by angles $\delta_1$ or $\delta_2$ with respect to reference angular marking position 26.

In the preferred exemplary embodiment to which FIG. 73 relates, process 200 comprises a preliminary step 111 of calculating a first trial duration τ of the modification, which corresponds to a length $L_T$ of the trace 102 long enough to allow a thickness sensor 11 (FIG. 1) to meet and then detect it as a thickness measurement, in an exemplary embodiment, during a rotation about tubular polymer film 1'. This is shown in detail in FIG. 74, where the intersection 104 is shown of trace 102 with trajectory 105 defined at height $z_M$ where the thickness is measured by thickness sensor 11. FIG. 76 shows instead the length of trace 102 (FIG. 75) vs. the duration i.e. time t, and also shows the first trial duration τ that is required for the intersection of FIG. 74 to take place with trace 102 that has predetermined length $L_T$.

Figure 79:
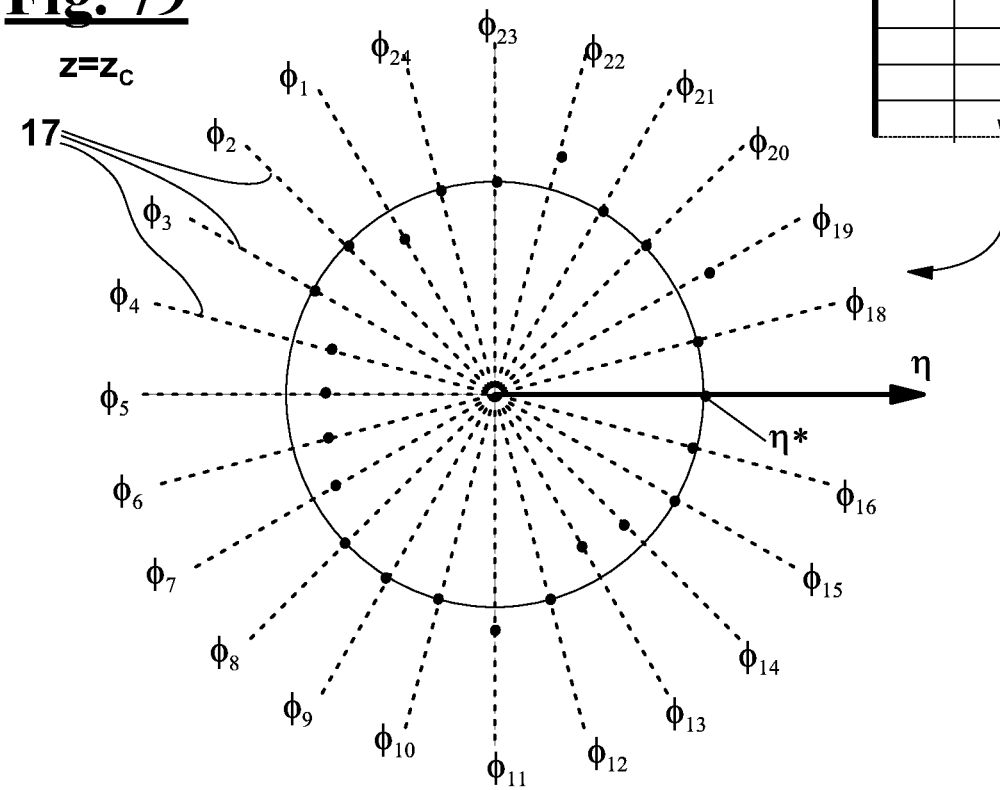
FIG. 79 shows the opening degrees to which the valves of the cooling air delivery members are set in order to correct the thickness profile of FIG. 77.

After step of calculating 111 a step 112 is carried out of marking tubular polymer film 1-1' being formed. In an advantageous exemplary implementation of the method, the marking is carried out by locally changing the thickness, as the selected physical property, of tubular polymer film 1-1' being formed starting from an angular mark position 26 at height $z_C$, immediately outside of die 4, so that a modified thickness trace 102 is formed on tubular polymer film 1-1' being formed, for example an increased thickness trace. On the basis of a preliminary calculation step 111, a detection 113 is provided of the trace at height $z_M$, at a position angularly displaced by angles $\delta_1$ or $\delta_2$ with respect to angular reference position 26. If the intersection occurs as shown in FIG. 74, displacement angle $\delta_1$ or $\delta_2$ is the object of an identification and data storage step 115 and of a step 116 of filling a table 106 (FIG. 80), wherein to each angular measurement position 12 of coordinate $\theta_i$ at measurement height $z_M$, as shown in FIG. 78, for example to 24 angular measurement positions $\theta_0 \ldots \theta_{23}$, two angular correction positions 17 of coordinates $\varphi_i$ or $\varphi_i'$ are associated at correction height $z_C$, in this case i=0 ... 23, which are effective when takeoff device 7' is turning clockwise and when it is turning counterclockwise, respectively. Angular positions 17, relating to the case of clockwise rotation of takeoff device 7', are depicted in FIG. 79, with respective coordinates $\varphi_i$ with respect to an axis oriented like the axis of FIG. 78.

If, on the contrary, the intersection does not take place, and so step 113 of detecting angle $\delta_1$ or $\delta_2$ does not occur as well, a further step 117 is performed of calculating a further trial duration τ' of the marking, longer than first trial duration τ, and then steps 112 to 116 are repeated.

If both columns of table 106 are completed, each relating to one rotation direction of takeoff device 7', a regulation sequence 120 begins, which is the normal operation of the apparatus, during which steps 121 of measuring the thickness of tubular polymer film 1' are permanently carried out at height $z_M$ in various angular coordinates, and steps 122 are permanently carried out of correcting out-of-specification thickness values, i.e. thickness values that deviate from thickness nominal value S* by more than a predetermined range ΔS. Correction step 122 is carried out by adjusting the flowrate of at least one correction air partial stream 19', responsive to a respective adjustment signal 12'' (FIG. 1), by which the temperature is changed in the angular correction positions 17 at height $z_C$ that are associated, according to table 106, to angular positions 12 at height $z_M$ where the thickness is out of specification.

In an exemplary implementation of the method, shown in the block diagram of FIG. 77, calibration 110 is actuated by a circuit of the control unit 13 that controls such actuation, when this circuit receives a command or request for a calibration 195. This request is generated in control unit 13 by a setting 192 of a process parameter of extrusion apparatus 100, in particular:

the upwards-conveying speed $v_T$ imposed by cylinders 6 to tubular polymer film 1';
the speed ω of takeoff device 7';
the flowrate of extruder 2;
the temperature of air 5' of main air cooling system 5.

Control unit 13 of the apparatus according to the invention comprises therefore a program means configured for carrying out above described calibration 110 and sequence 120 of regulation steps, in particular it comprises a means for receiving from the thickness detection means, in particular from same thickness sensor 11, angular detection position 104 of trace 102 created starting from angular mark position 26, as well as a calculation means for calculating:

the two displacement angles $\delta_1$ or $\delta_2$ between angular detection position 104 and angular mark position 26, according to whether takeoff device 7' is turning in a given rotation direction or according to the opposite rotation direction, and therefore according to whether trace 102 extends anticlockwise or clockwise on tubular polymer film 1';
an angular correction position 17 corresponding to each angular measurement positions 12, each angular correction position 17 obtained by adding to each angular measurement position 12 displacement angle $\delta_1$ or $\delta_2$.

Request for a calibration 195 can also be generated on the basis of a user's decision, following a specific command 191 that he/she emits through a conventional interface, not shown, with control unit 13.

Step of marking 112 can be carried out by means of a marker air delivery member arranged at a height close to correction height $z_C$, which projects a compressed air marking jet, preferably at a pressure higher than 3 bar, and/or a cold air marking jet against tubular polymer film 1' being formed, which locally causes the thickness to increase more than the normal local thickness variation of tubular polymer film 1'. This way, the trace is univocally detected by thickness sensor 11, for example by a capacitive thickness sensor of type, i.e. without any possibility to be confused with a thickness defect.

According to another exemplary embodiments of the invention, trace 102 can be made by modifying a property of tubular polymer film 1' different from thickness, in which case a marker device is required that is different from the above mentioned marker air delivery member. For instance, the marker device can be arranged to change an optical property, or an electrostatic property, for example, by a localized electrical discharge. In both described cases, and in other similar cases, a specific sensor is required for detecting trace 102, which is configured for measuring the property, and which is different from sensor 11 required for regulating the optical or electrostatic property, and is positioned as close al possible to height $z_M$.

In the common applications, the method and the apparatus according to the invention makes it possible to attain ΔS values of about ±2% of nominal thickness S.

The foregoing description exemplary specific embodiments will so fully reveal the invention according to the conceptual point of view, so that others, by applying current knowledge, will be able to modify and/or adapt such embodiment for various applications, without further research and without parting from the invention, and, accordingly, it is therefore to be understood that such adaptations and modifications will have to be considered as equivalent to the specific embodiments. The means and the materials to carry out the different functions described herein could have a different nature without, for this reason, departing from the field of the invention. It is to be understood that the phraseology or terminology that is employed herein is for the purpose of description and not of limitation.

The invention claimed is:

1. A blown-film extrusion apparatus (100) for making a tubular polymer film (1') comprising:
   an extruder (2) having an extrusion mouth (4) configured for extruding a molten polymer in the form of a tubular element (1) at a predetermined temperature;
   a solidification ring (5) arranged to harden said tubular element (1) to form said tubular polymer film (1'), and a film conveyor (6) arranged for conveying said tubular polymer film (1') and said tubular element (1) upwards about a substantially vertical axis (25) of said apparatus (100),
   wherein said solidification ring (5) is configured for delivering cooling air (5') out of said tubular element (1) about said axis (25) at a predetermined cooling height ($z_R$) above said extrusion mouth (4),
   said apparatus (100) also comprising a delivery device (30,40,50,60,70,80,90) arranged to deliver correction air to hit externally said tubular element (100), in order to locally modify said temperature and locally correct the thickness of said tubular polymer film (1'),
   said delivery device (30,40,50,60,70,80,90) comprising:
   a distribution chamber (57,78) having an inlet opening (65) and a plurality of distribution outlet ports (62,86) for said correction air;
   a plurality of air delivery members (41,51,71,81,81',91) of said correction air having respective inlet ports (32) and respective delivery channels (37) ending with respective delivery mouths (33,33',33",33'") downstream of said delivery channels (37), said delivery mouths arranged about said axis (25) for delivering correction air partial streams (19'), in order to hit said tubular element (1) at respective angular correction positions (17),
   a plurality of flow control elements (68), each pneumatically connected between:
   a respective distribution outlet port (62,86) of said distribution outlet ports of said distribution chamber (57,78), and
   an inlet port (32) of a respective air delivery member (41,51,71,81,81',91) of said air delivery members,
   wherein each of said flow control elements (68) is configured for receiving a respective adjustment signal (12') and for modifying an own passageway for said correction air responsive to said adjustment signal (12"), in order to adjust the flowrate of a respective correction air partial stream of said correction air partial streams responsive to said respective adjustment signal (12"),
   wherein said delivery device (30,40,50,60,70,80,90) comprises a plurality of separate radial ducts (45,45',45",45'") each defining a respective delivery channel (37) of said delivery channels and having a predetermined length (W), wherein said separate radial ducts (45,45',45",45'") are spaced apart from one another by separation spaces (44), and said delivery mouths (33,33',33",33'") of delivery channels (37) of adjacent separate radial ducts (45,45',45",45'") are arranged at a mutual predetermined distance (B), so that said correction air partial streams, after hitting said tubular element (1) at respective angular correction positions (17), can at least in part return backwards outside of said ducts (1) flowing through said separation spaces (44), wherein said delivery mouths (33,33',33",33''') are arranged at a correction height ($z_C$) set between said cooling height ($z_R$) of said solidification ring (5) and said extrusion mouth (4), wherein an air delivery member (31,51,71,71,81,81') of said air delivery members comprises a plurality of correction air delivery mouths (33',33",33'''), said delivery mouths (33',33",33''') arranged at different heights along the direction of said axis (25) of said delivery device (20,50,60,70,80), and a delivery mouth (33',33") arranged at a lower height than any couple of adjacent delivery mouths of said delivery mouths (33',33",33''') of a same air delivery member (31,51,71,71,81,81') arranged at a position closer to said axis (25) than a delivery mouth (33',33''') of said couple of adjacent delivery mouths arranged at a height higher than said lower height.

2. The apparatus according to claim 1, wherein said distribution chamber (78) is defined by an upper ring (163) and by a lower ring (159,162) connected to each other by a first cylindrical wall (151) and by a second cylindrical wall (154) arranged externally with respect to said first cylindrical wall (151), said separate radial ducts (45) of said air delivery members (81') protruding from said first cylindrical wall (151).

3. The apparatus according to claim 1, wherein said predetermined mutual distance (B) between said delivery mouths (33,33',33",33''') of delivery channels (37) of adjacent separate radial ducts (45,45',45",45''') is set between 0,1 mm and 8 mm.

4. The apparatus according to claim 1, wherein said mutual predetermined distance (B) between said delivery mouths (33,33',33",33''') of delivery channels (37) of adjacent separate radial ducts (45,45',45",45''') is set between 0,5 mm and 6 mm.

5. The apparatus according to claim 1, wherein said mutual predetermined distance (B) between said delivery mouths (33,33',33",33''') of delivery channels (37) of adjacent separate radial ducts (45,45',45",45''') is set between 1 mm and 5 mm.

6. The apparatus according to claim 1, wherein an air delivery member (31,51,71,81,81') of said air delivery members of said delivery device (20,50,60,70) comprises a flow deflection element (35,36,64) arranged at a respective delivery mouth (33,33',33",33''') of said delivery mouths, said flow deflection element (35,36,64) configured for orienting a respective correction air partial stream delivered through said respective delivery mouth (33,33',33",33"), wherein said flow deflection element (35,36,64) is selected from the group consisting of:

a couple of side deflectors (36) arranged out of a respective delivery channel (37) of said delivery channels and at opposite sides with respect to said respective delivery mouth (33',33") of respective said delivery channel (37), extending for a predetermined length towards said axis (25) of said delivery device (20,70);

a lower inner wall (64) of a respective delivery channel (37) of said delivery channels of said air delivery members (51,71) at a predetermined angle ($\alpha',\alpha''$) with respect to the horizontal towards an upper inner wall of said respective delivery channel (37);

a front deflection shield (35) arranged out of a respective delivery channel (37) of said delivery channels (31,81) of said delivery device (70) and extending in front of at least one lower portion of said respective delivery mouth (33") forming a shielded delivery mouth (33""), at a predetermined distance (S) from said respective shielded delivery mouth (33"), said front deflection shield (35) arranged to be hit by said correction air supplied through said respective shielded delivery mouth (33").

7. The apparatus according to claim 6, wherein said respective shielded delivery mouth (33") is a lower delivery mouth of a plurality of delivery mouths (33',33") that are arranged at different heights along the direction of said axis (25) of said delivery device (20,70).

8. The apparatus according to claim 1, wherein, in an end portion of a delivery channel (37) of said delivery channels oriented towards said axis (25) an insertion flow-split member (38) is arranged that divides said delivery channel (37) into an upper delivery channel (37') and a lower delivery channel (37").

9. The apparatus according to claim 1, wherein a flow control element (68) of said flow control elements comprises respective turning-diaphragm choke members (84).

10. The apparatus according to claim 1, wherein a delivery channel (37) of said delivery channels of said air delivery members (81,81') extends straight from said inlet port (32) arranged at a substantially peripheral position of said delivery device (70), up to a position at a longer distance from said axis (25) than the distance of an outlet section (86) of a respective flow control element (68), so that said correction air partial streams (19') can flow within a maximum linear-length channel (37), with respect to the size of said delivery device (70,80).

11. A blown-film extrusion apparatus (100) for making a tubular polymer film (1') comprising:

an extruder (2) having an extrusion mouth (4) configured for extruding a molten polymer in the form of a tubular element (1) at a predetermined temperature;

a solidification ring (5) arranged to harden said tubular element (1) to form said tubular polymer film (1'), and a film conveyor (6) arranged for conveying said tubular polymer film (1') and said tubular element (1) upwards about a substantially vertical axis (25) of said apparatus (100), wherein said solidification ring (5) is configured for delivering cooling air (5') out of said tubular element (1) about said axis (25) at a predetermined cooling height ($z_R$) above said extrusion mouth (4), said apparatus (100) also comprising a delivery device (30,40,50,60,70,80,90) arranged to deliver correction air to hit externally said tubular element (100), in order to locally modify said temperature and locally correct the thickness of said tubular polymer film (1'), said delivery device (30,40,50,60,70,80,90) comprising:

a distribution chamber (57,78) having an inlet opening (65) and a plurality of distribution outlet ports (62,86) for said correction air;

a plurality of air delivery members (41,51,71,81,81',91) of said correction air having respective inlet ports (32) and respective delivery channels (37) ending with respective delivery mouths (33,33',33",33''') downstream of said delivery channels (37), said delivery mouths arranged about said axis (25) for delivering correction air partial streams (19'), in order to hit said tubular element (1) at respective angular correction positions (17), a plurality of flow control elements (68), each pneumatically connected between:

a respective distribution outlet port (62,86) of said distribution outlet ports of said distribution chamber (57,78), and an inlet port (32) of a respective air delivery member (41,51,71,81,81',91) of said air delivery members, wherein each of said flow control elements (68) is configured for receiving a respective adjustment signal (12") and for modifying an own passageway for said correction air responsive to said adjustment signal (12"), in order to adjust the flowrate of a respective correction air partial stream of said correction air partial streams responsive to said respective adjustment signal (12"), wherein said delivery device (30,40,50,60,70,80,90) comprises a plurality of separate radial ducts (45,45',45", 45''') each defining a respective delivery channel (37) of said delivery channels and having a predetermined length (W), wherein said separate radial ducts (45,45' 45",45''') are spaced apart from one another b separation spaces (44) and said delivery mouths (33,33',33", 33''') of delivery channels (37) of adjacent separate radial ducts (45,45',45",45''') are arranged at a mutual predetermined distance (B), so that said correction air partial streams, after hitting said tubular element (1) at respective angular correction positions (17), can at least in part return backwards outside of said ducts (1) flowing through said separation spaces (44), wherein said delivery mouths (33,33',33",33''') are arranged at a correction height ($z_C$) set between said cooling height ($z_R$) of said solidification ring (5) and said extrusion mouth (4), wherein said distribution chamber (78) is defined by an upper ring (163) and by a lower ring (159,162) connected to each other by a first cylindrical wall (151) and by a second cylindrical wall (154) arranged externally with respect to said first cylindrical wall (151), said separate radial ducts (45) of said air delivery members (81') protruding from said first cylindrical wall (151), wherein said upper ring (163), said lower ring (159,162) and said first and second cylindrical walls (151,154) are made of a layered composite material comprising two metal aluminum external layers, and an inner thermoplastic material layer, wherein fixed-joint grooves (175) are made on one face of both said upper and lower rings (163,159), said grooves arranged for receiving in a fixed joint opposite edges of said first and second cylindrical walls (151,154), said fixed-joint grooves (175) containing a residue of said thermoplastic material in such a way that, by inserting said opposite edges of said first and second cylindrical walls (151,154) into said fixed-joint grooves, and by temporarily heating and/or pressing said first and second cylindrical walls (151,154) on said upper and/or lower ring (163,159), a local melting and a subsequent hardening and welding of said thermoplastic material to the edge of said first and second cylindrical walls (151, 154) occurs with said residue of thermoplastic material present in said fixed-joint grooves (175), so as to cause said first and second cylindrical walls (151,154) to become integral to said upper ring and/or lower ring (163,159).

12. A blown-film extrusion apparatus (100) for making a tubular polymer film (1') comprising:

an extruder (2) having an extrusion mouth (4) configured for extruding a molten polymer in the form of a tubular element (1) at a predetermined temperature;

a solidification ring (5) arranged to harden said tubular element (1) to form said tubular polymer film (1'), and a film conveyor (6) arranged for conveying said tubular polymer film (1') and said tubular element (1) upwards about a substantially vertical axis (25) of said apparatus (100), wherein said solidification ring (5) is configured for delivering cooling air (5') out of said tubular element (1) about said axis (25) at a predetermined cooling height ($z_R$) above said extrusion mouth (4), said apparatus (100) also comprising a delivery device (30,40,50,60,70,80,90) arranged to deliver correction air to hit externally said tubular element (100), in order to locally modify said temperature and locally correct the thickness of said tubular polymer film (1'), said delivery device (30,40,50,60,70,80,90) comprising:

a distribution chamber (57,78) having an inlet opening (65) and a plurality of distribution outlet ports (62,86) for said correction air:

a plurality of air delivery members (41,51,71,81,81',91) of said correction air having respective inlet ports (32) and respective delivery channels (37) ending with respective delivery mouths (33,33',33",33''') downstream of said delivery channels (37), said delivery mouths arranged about said axis (25) for delivering correction air partial streams (19'), in order to hit said tubular element (1) at respective angular correction positions (17), a plurality of flow control elements (68), each pneumatically connected between:

a respective distribution outlet port (62,86) of said distribution outlet ports of said distribution chamber (57,78), and an inlet port (32) of a respective air delivery member (41,51,71,81,81',91) of said air delivery members, wherein each of said flow control elements (68) is configured for receiving a respective adjustment signal (12") and for modifying an own passageway for said correction air responsive to said adjustment signal (12"), in order to adjust the flowrate of a respective correction air partial stream of said correction air partial streams responsive to said respective adjustment signal (12"), wherein said delivery device (30,40,50,60,70,80,90) comprises a plurality of separate radial ducts (45,45',45", 45''') each defining a respective delivery channel (37) of said delivery channels and having a predetermined length (W), wherein said separate radial ducts (45,45' 45",45''') are spaced apart from one another by separation spaces (44), and said delivery mouths (33,33', 33",33''') of delivery channels (37) of adjacent separate radial ducts (45,45',45",45''') are arranged at a mutual predetermined distance (B), so that said correction air partial streams, after hitting said tubular element (1) at respective angular correction positions (17), can at least in part return backwards outside of said ducts (1) flowing through said separation spaces (44), wherein said delivery mouths (33,33',33",33''') are arranged at a correction height ($z_C$) set between said cooling height ($z_R$) of said solidification ring (5) and said extrusion mouth (4), wherein said distribution chamber (78) is defined by an upper ring (163) and by a lower ring (159,162) connected to each other by a first cylindrical wall (151) and by a second cylindrical wall (154) arranged externally with respect to said first cylindrical wall (151), said separate radial ducts (45) of said air delivery members (81') protruding from said first cylindrical wall (151), wherein said second cylindrical wall (154) has a passage windows (86) that has a flow section (87) configured for receiving a choke member (84) of a flow control element (68) of said flow control elements, and said delivery device (80) comprises a third substantially cylindrical wall (155), concentrically arranged about said second cylindrical wall (154) and tightly connected between said lower ring (162) and said upper ring (163), wherein two radial walls (157) are tightly arranged between said second cylindrical wall (154) and said third substantially cylindrical wall (155), at opposite sides with respect to said passage window (86), said two radial walls (157) defining, along with said second and said third cylindrical wall (154,155), a plurality of fluid-tight chambers (66), wherein a rear end portion of each of said separate radial ducts (45) protrudes into a respective fluid-tight chamber (66) of said fluid-tight chambers, and has said inlet port (32) arranged in communication with said respective fluid-tight chamber (66), so as to allow an air flowrate of a respective correction air partial stream (19') to flow responsive to a predetermined opening degree of said flow section (87) between said distribution chamber (78) and each of said fluid-tight chambers (66), and between the latter and a respective delivery channel (37) of said delivery channels in a respective duct (45) of said separate radial ducts, through said inlet port (32).

13. A blown-film extrusion apparatus (100) for making a tubular polymer film (1') comprising:

an extruder (2) having an extrusion mouth (4) configured for extruding a molten polymer in the form of a tubular element (1) at a predetermined temperature;

a solidification ring (5) arranged to harden said tubular element (1) to form said tubular polymer film (1'), and a film conveyor (6) arranged for conveying said tubular polymer film (1') and said tubular element (1) upwards about a substantially vertical axis (25) of said apparatus (100), wherein said solidification ring (5) is configured for delivering cooling air (5') out of said tubular element (1) about said axis (25) at a predetermined cooling height ($z_R$) above said extrusion mouth (4), said apparatus (100) also comprising a delivery device (30,40,50,60,70,80,90) arranged to deliver correction air to hit externally said tubular element (100), in order to locally modify said temperature and locally correct the thickness of said tubular polymer film (1'), said delivery device (30,40,50,60,70,80,90) comprising:

a distribution chamber (57,78) having an inlet opening (65) and a plurality of distribution outlet ports (62,86) for said correction air:

a plurality of air delivery members (41,51,71,81,81',91) of said correction air having respective inlet ports (32) and respective delivery channels (37) ending with respective delivery mouths (33,33',33",33''') downstream of said delivery channels (37), said delivery mouths arranged about said axis (25) for delivering correction air partial streams (19'), in order to hit said tubular element (1) at respective angular correction positions (17), a plurality of flow control elements (68), each pneumatically connected between:

a respective distribution outlet port (62,86) of said distribution outlet ports of said distribution chamber (57,78), and an inlet port (32) of a respective air delivery member (41,51,71,81,81',91) of said air delivery members, wherein each of said flow control elements (68) is configured for receiving a respective adjustment signal (12") and for modifying an own passageway for said correction air responsive to said adjustment signal (12"), in order to adjust the flowrate of a respective correction air partial stream of said correction air partial streams responsive to said respective adjustment signal (12"), wherein said delivery device (30,40, 50, 60,70,80,90) comprises a plurality of separate radial ducts (45,45', 45",45''') each defining a respective delivery channel (37) of said delivery channels and having a predetermined length (W), wherein said separate radial ducts (45,45',45",45''') are spaced apart from one another by separation spaces (44), and said delivery mouths (33, 33',33",33''') of delivery channels (37) of adjacent separate radial ducts (45,45',45",45''') are arranged at a mutual predetermined distance (B) so that said correction air partial streams, after hitting said tubular element (1) at respective angular correction positions (17), can at least in part return backwards outside of said ducts (1) flowing through said separation spaces (44), wherein said delivery mouths (33,33',33",33''') are arranged at a correction height ($z_C$) set between said cooling height ($z_R$) of said solidification ring (5) and said extrusion mouth (4), wherein each delivery mouth (33,33',33",33''') of said delivery mouths has an elongated shape with a larger size (L) and a smaller size (H) orthogonal to said larger size (L), wherein said larger size (L) is at least twice said smaller size (H), wherein said larger size (L) is arranged substantially orthogonal to said axis (25) of said delivery device (30,40,50,60,70,80), so that said larger size (L) is arranged horizontally, and said delivery mouths (33, 33',33",33''') have a height increasing between a minimum height (H') at an own central region (49) and a maximum height (H") at an own peripheral region (48).

14. A blown-film extrusion apparatus (100) for making a tubular polymer film (1') comprising:

an extruder (2) having an extrusion mouth (4) configured for extruding a molten polymer in the form of a tubular element (1) at a predetermined temperature;

a solidification ring (5) arranged to harden said tubular element (1) to form said tubular polymer film (1'), and a film conveyor (6) arranged for conveying said tubular polymer film (1') and said tubular element (1) upwards about a substantially vertical axis (25) of said apparatus (100), wherein said solidification ring (5) is configured for delivering cooling air (5') out of said tubular element (1) about said axis (25) at a predetermined cooling height ($z_R$) above said extrusion mouth (4), said apparatus (100) also comprising a delivery device (30,40,50,60,70,80,90) arranged to deliver correction air to hit externally said tubular element (100), in order to locally modify said temperature and locally correct the thickness of said tubular polymer film (1'), said delivery device (30, 40,50,60,70,80,90) comprising:

a distribution chamber (57,78) having an inlet opening (65) and a plurality of distribution outlet ports (62,86) for said correction air;

a plurality of air delivery members (41,51,71,81,81',91) of said correction air having respective inlet ports (32) and respective delivery channels (37) ending with respective delivery mouths (33,33',33",33''') downstream of said delivery channels (37), said delivery mouths arranged about said axis (25) for delivering correction air partial streams (19'), in order to hit said tubular element (1) at respective angular correction positions (17), a plurality of flow control elements (68), each pneumatically connected between:

a respective distribution outlet port (62,86) of said distribution outlet ports of said distribution chamber (57,78), and an inlet port (32) of a respective air delivery member (41,51, 71, 81, 81',91) of said air delivery members, wherein each of said flow control elements (68) is configured for receiving a respective adjustment signal (12") and for modifying an own passageway for said correction air responsive to said adjustment signal (12"), in order to adjust the flowrate of a respective correction air partial stream of said correction air partial streams responsive to said respective adjustment signal (12"), wherein said delivery device (30,40,50,60,70,80,90) comprises a plurality of separate radial ducts (45,45',45", 45''') each defining a respective delivery channel (37) of said delivery channels and having a predetermined length (W), wherein said separate radial ducts (45,45', 45",45''') are spaced apart from one another by separation spaces (44), and said delivery mouths (33,33', 33",33''') of delivery channels (37) of adjacent separate radial ducts (45,45',45",45''') are arranged at a mutual predetermined distance (B), so that said correction air partial streams, after hitting said tubular element (1) at respective angular correction positions (17), can at least in part return backwards outside of said ducts (1) flowing through said separation spaces (44), wherein said delivery mouths (33,33',33",33''') are arranged at a correction height ($z_C$) set between said cooling height ($z_R$) of said solidification ring (5) and said extrusion mouth (4), wherein each delivery mouth (33) of said delivery mouths of said air delivery members (91) of said delivery device (90) has an elongated shape with a larger size (L) and a smaller size (H) orthogonal to said larger size (L), wherein said larger size (L) is at least twice said smaller size (H), wherein said larger size (L) is arranged at an angle (β) set between 0° and 45° with respect to said axis (25) of said delivery device (90), so that said larger size (L) is arranged at said angle (β) with respect to the vertical.

15. The apparatus according to claim 14, wherein said delivery mouth (33) has a shape comprising two parallel sides (59') and two opposite rounded end portions (59") joining said parallel sides (59').

16. The apparatus according to claim 13, wherein said larger size (L) is arranged at an angle (β) set between 15° and 30°.

17. A blown-film extrusion apparatus (100) for making a tubular polymer film (1') comprising:

an extruder (2) having an extrusion mouth (4) configured for extruding a molten polymer in the form of a tubular element (1) at a predetermined temperature;

a solidification ring (5) arranged to harden said tubular element (1) to form said tubular polymer film (1'), and a film conveyor (6) arranged for conveying said tubular polymer film (1') and said tubular element (1) upwards about a substantially vertical axis (25) of said apparatus (100), wherein said solidification ring (5) is configured for delivering cooling air (5') out of said tubular element (1) about said axis (25) at a predetermined cooling height ($z_R$) above said extrusion mouth (4), said apparatus (100) also comprising a delivery device (30,40,50,60,70,80,90) arranged to deliver correction air to hit externally said tubular element (100), in order to locally modify said temperature and locally correct the thickness of said tubular polymer film (1'), said delivery device (30, 40,50,60,70,80,90) comprising:

a distribution chamber (57,78) having an inlet opening (65) and a plurality of distribution outlet ports (62,86) for said correction air;

a plurality of air delivery members (41,51,71,81,81',91) of said correction air having respective inlet ports (32) and respective delivery channels (37) ending with respective delivery mouths (33.33',33",33''') downstream of said delivery channels (37), said delivery mouths arranged about said axis (25) for delivering correction air partial streams (19'), in order to hit said tubular element (1) at respective angular correction positions (17), a plurality of flow control elements (68), each pneumatically connected between:

a respective distribution outlet port (62,86) of said distribution outlet ports of said distribution chamber (57,78), and an inlet port (32) of a respective air delivery member (41,51,71,81,81',91) of said air delivery members, wherein each of said flow control elements (68) is configured for receiving a respective adjustment signal (12") and for modifying an own passageway for said correction air responsive to said adjustment signal (12'), in order to adjust the flowrate of a respective correction air partial stream of said correction air partial streams responsive to said respective adjustment signal (12"), wherein said delivery device (30,40,50,60,70,80,90) comprises a plurality of separate radial ducts (45,45',45', 45''') each defining a respective delivery channel (37) of said delivery channels and having a predetermined length (W), wherein said separate radial ducts (45,45', 45",45''') are spaced apart from one another by separation spaces (44), and said delivery mouths (33,33', 33",33''') of delivery channels (37) of adjacent separate radial ducts (45.45',45",45''') are arranged at a mutual predetermined distance (B), so that said correction air partial streams, after hitting said tubular element (1) at respective angular correction positions (17), can at least in part return backwards outside of said ducts (1) flowing through said separation spaces (44), wherein said delivery mouths (33,33',33",33''') are arranged at a correction height ($z_C$) set between said cooling height ($z_R$) of said solidification ring (5) and said extrusion mouth (4), wherein a flow control element (68) of said flow control elements comprises respective turning-diaphragm choke members (84), wherein said distribution chamber is an annular chamber (78) peripherally arranged with respect to said plurality of air delivery members (71,81,91) of said delivery device (60,70,90) and having a plurality of passage windows (86) at respective inlet ends of respective said air delivery members (71,81,91), and said turning-diaphragm choke members (84) are arranged within respective housings of said passage windows (86).

* * * * *